United States Patent
Huang et al.

(10) Patent No.: US 12,033,369 B2
(45) Date of Patent: Jul. 9, 2024

(54) OBJECT RECOGNITION METHOD AND APPARATUS

(71) Applicant: Huawei Technologies Co., Ltd., Shenzhen (CN)

(72) Inventors: Fei Huang, Shenzhen (CN); Xiaofei Wu, Shenzhen (CN); Zhihao Li, Shenzhen (CN); Songcen Xu, Shenzhen (CN); Jianzhuang Liu, Shenzhen (CN); Youliang Yan, Shenzhen (CN); Li Qian, Shenzhen (CN); Xueyan Huang, Shenzhen (CN)

(73) Assignee: HUAWEI TECHNOLOGIES CO, LTD., Shenzhen (CN)

( * ) Notice: Subject to any disclaimer, the term of this patent is extended or adjusted under 35 U.S.C. 154(b) by 318 days.

(21) Appl. No.: 17/668,101

(22) Filed: Feb. 9, 2022

(65) Prior Publication Data
US 2022/0245926 A1 Aug. 4, 2022

Related U.S. Application Data

(63) Continuation of application No. PCT/CN2020/108286, filed on Aug. 10, 2020.

(30) Foreign Application Priority Data

Aug. 9, 2019 (CN) .......................... 201910736247.2

(51) Int. Cl.
*G06V 10/74* (2022.01)
*G06V 10/40* (2022.01)

(52) U.S. Cl.
CPC ............ *G06V 10/761* (2022.01); *G06V 10/40* (2022.01)

(58) Field of Classification Search
CPC .... G06V 10/761; G06V 10/40; G06V 10/454; G06V 40/103; G06F 16/535; G06F 16/54; G06F 16/583; G06N 3/045; G06N 3/08
See application file for complete search history.

(56) References Cited

U.S. PATENT DOCUMENTS 10,516,830 B2 * 12/2019 Zhang .................... H04N 23/63
10,594,926 B2 * 3/2020 Guo ....................... H04N 23/63
(Continued)

FOREIGN PATENT DOCUMENTS

CN 103929597 A 7/2014
CN 104284092 A 1/2015
(Continued)

OTHER PUBLICATIONS

Fu et al., "Data-driven Suggestions for Portrait Posing", SIGGRAPH Asia 2013, Nov. 19-22, 2013, Hong Kong (Year: 2013).*

*Primary Examiner* — Aaron W Carter
(74) *Attorney, Agent, or Firm* — Conley Rose, P.C.

(57) ABSTRACT

A method for optimizing a photographing pose of a user, where the method is applied to an electronic device, and the method includes: displaying a photographing interface of a camera of the electronic device; obtaining a to-be-taken image in the photographing interface; determining, based on the to-be-taken image, that the photographing interface includes a portrait; entering a pose recommendation mode; and presenting a recommended human pose picture to a user in a predetermined preview manner, where the human pose picture is at least one picture that is selected from a picture library through metric learning and that has a top-ranked similarity to the to-be-taken image, and where the similarity is an overall similarity obtained by fusing a background similarity and a foreground similarity.

20 Claims, 32 Drawing Sheets

(a) User pose before recommendation (b) Recommended human pose picture in this embodiment of the present invention (c) Pose after the user refers to the recommended human pose

(56) References Cited

U.S. PATENT DOCUMENTS

| | | | |
|---|---|---|---|
| 10,630,896 B1* | 4/2020 | Liu | H04N 23/64 |
| 10,898,755 B2* | 1/2021 | Kang | A61B 5/0077 |
| 11,024,060 B1* | 6/2021 | Ma | G06V 20/20 |
| 11,651,540 B2* | 5/2023 | Vo | G06T 13/40 |
| | | | 345/419 |
| 2003/0195883 A1* | 10/2003 | Mojsilovic | G06V 10/40 |
| 2008/0025646 A1 | 1/2008 | Aguera Y Arcas et al. | |
| 2008/0297617 A1* | 12/2008 | Jeong | H04N 23/611 |
| | | | 348/222.1 |
| 2010/0104158 A1* | 4/2010 | Shechtman | G06V 10/40 |
| | | | 382/165 |
| 2010/0245610 A1* | 9/2010 | Ahn | H04N 23/635 |
| | | | 348/222.1 |
| 2015/0207985 A1* | 7/2015 | Uemura | H04N 23/632 |
| | | | 348/333.01 |
| 2016/0117834 A1* | 4/2016 | Wang | G06V 10/993 |
| | | | 382/173 |
| 2019/0371080 A1* | 12/2019 | Sminchisescu | G06T 17/20 |
| 2020/0045165 A1 | 2/2020 | Luo | |
| 2020/0090408 A1* | 3/2020 | Virkar | G06V 10/764 |
| 2021/0001172 A1* | 1/2021 | Namboodiri | G16H 20/30 |
| 2021/0366172 A1* | 11/2021 | Zhang | G06F 18/22 |
| 2022/0232162 A1* | 7/2022 | Gupta | H04N 23/633 |
| 2022/0245876 A1* | 8/2022 | Zhu | G06T 11/001 |
| 2022/0245926 A1* | 8/2022 | Huang | G06V 10/454 |
| 2023/0201696 A1* | 6/2023 | Yoo | G09B 19/0038 |
| | | | 482/4 |
| 2024/0046500 A1* | 2/2024 | Kim | G06V 10/761 |

FOREIGN PATENT DOCUMENTS

| | | |
|---|---|---|
| CN | 105827930 A | 8/2016 |
| CN | 106899794 A | 6/2017 |
| CN | 107911601 A | 4/2018 |
| CN | 108600633 A | 9/2018 |
| CN | 108886574 A | 11/2018 |
| CN | 109660719 A | 4/2019 |
| CN | 109815355 A | 5/2019 |
| CN | 110543578 A | 12/2019 |

* cited by examiner (a) User pose before recommendation (b) Recommended human pose picture in this embodiment of the present invention (c) Pose after the user refers to the recommended human pose (a) Sample picture (b) Similar picture

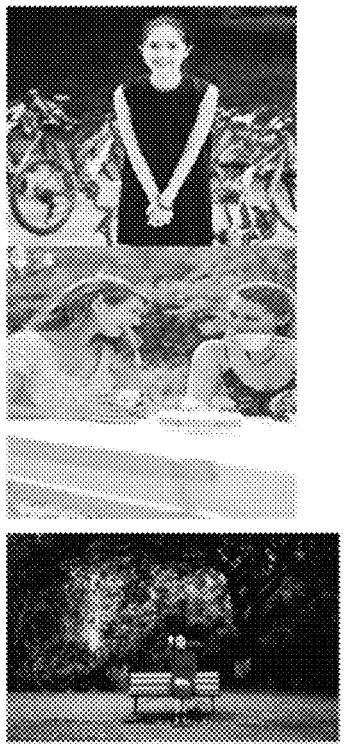 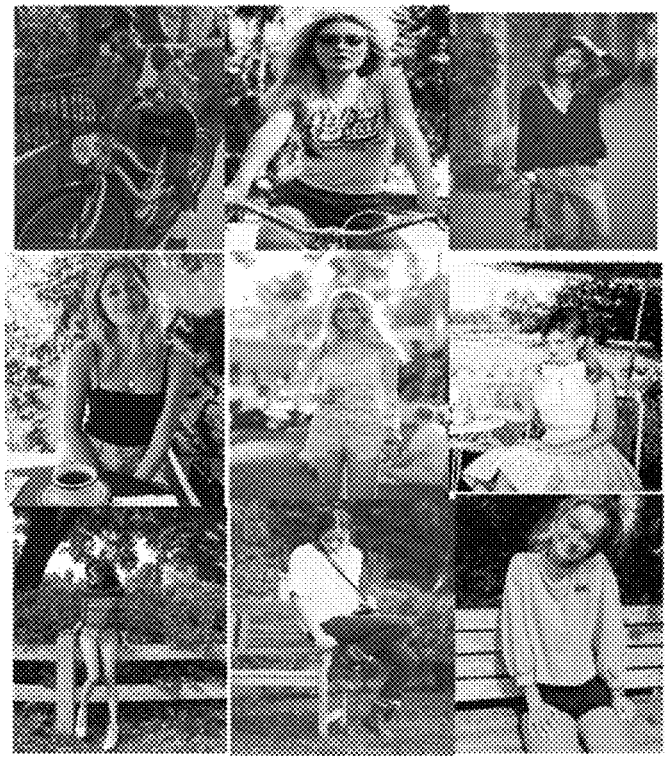
(a) Input picture      (b) Recommended picture in the present invention
FIG. 9A (a) Initial user pose    (b) Recommended picture in the present invention    (c) User pose after reference

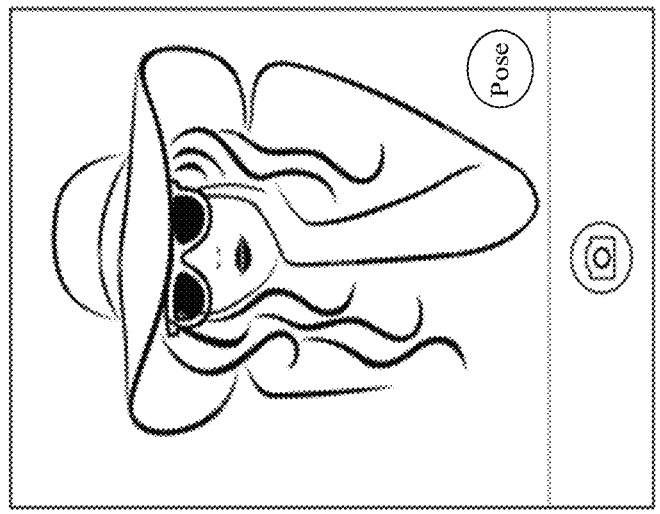

Persons: single, two, more than three
Gender: male, female
Age: child, adolescent, adult, aged
Height: tall, small
Body shape: slim, plump, moderate
Skin color: white, ruddy, tan, healthy black
Hairstyle: long hair, bun, ponytail, short hair
Hair color: black, gray, silver, blonde
Season: spring, summer, autumn, winter
Clothing: formal suit, casual clothes, swimsuit, dress
Shoes: leather shoes, casual shoes, sneakers, slippers, boots
Prop: hat, scarf, backpack, sunglasses, flowers, chair

FIG. 17C

Persons: single, two, more than three
Gender: male, female
Age: child, adolescent, adult, aged
Height: tall, small
Body shape: slim, plump, moderate
Skin color: white, ruddy, tan, healthy black
Hairstyle: long hair, bun, ponytail, short hair
Hair color: black, gray, silver, blonde
Season: spring, summer, autumn, winter
Clothing: formal suit, casual clothes, swimsuit, dress
Shoes: leather shoes, casual shoes, sneakers, slippers, boots
Prop: hat, scarf, backpack, sunglasses, flowers, chair

OBJECT RECOGNITION METHOD AND APPARATUS

CROSS-REFERENCE TO RELATED APPLICATIONS

This application is a continuation of International Patent Application No. PCT/CN2020/108286, filed on Aug. 10, 2020, which claims priority to Chinese Patent Application No. 201910736247.2, filed on Aug. 9, 2019. The disclosures of the aforementioned applications are hereby incorporated by reference in their entireties.

TECHNICAL FIELD

This application relates to the field of artificial intelligence, and in particular, to an object recognition method and apparatus.

BACKGROUND

Computer vision is an integral part of various intelligent/autonomous systems in various application fields, for example, manufacturing, inspection, document analysis, medical diagnosis, and military. Computer vision is about how to use a camera/video camera and a computer to obtain required data and information of a photographed object. Figuratively, computer vision equips the computer with an eye (the camera or the video camera) and a brain (an algorithm) to recognize, track, and measure an object in place of human eyes, such that the computer can perceive an environment. Because perception may be considered as extracting information from a sensory signal, computer vision may also be considered as a science of studying how to enable an artificial system to perform "perception" on an image or multi-dimensional data. Generally, computer vision uses various imaging systems to obtain input information in place of a visual organ and then uses the computer to process and explain the input information in place of a brain. An ultimate research goal of computer vision is to enable the computer to observe and understand the world through a visual sense and have a capability of autonomously adapting to the environment.

Human pose recommendation is a very novel application in the field of computer vision, and is applied to a scenario in which a mobile phone is used to perform portrait photographing. When a user performs portrait photographing in a daily scene, a method for recommending a human pose may be used to recommend, based on information about an environment in which a photographed person is currently located, a series of professional human pose pictures that are highly similar to the current environment. Further, the photographed person may perform selection and reference from these pictures. This further improves a pose feeling and an aesthetic feeling in portrait photographing.

Currently, there are already some methods for recommending a human pose in the industry. However, limited information is used in an existing method, a recommendation result is poor, and it is difficult to meet a requirement in actual application. Alternatively, a used model is very complex, cannot meet a real-time recommendation requirement, and cannot be deployed on a terminal device that has a limited calculation capability, for example, a mobile phone. As a result, an application scenario of the existing method for recommending a human pose is very limited.

SUMMARY

In the present application, disadvantages of a conventional-technology solution are comprehensively considered, and a technical solution for recommending a human pose is proposed. Complex environmental information in a preview picture is extracted using a method such as scene classification, scene parsing, and a human attribute, and information fusion and model training are performed through metric learning. Therefore, a lightweight high-accuracy solution is implemented, and the solution can be deployed on a mobile terminal such as a mobile phone for real-time recommendation.

According to an aspect, an embodiment of this application provides a method for recommending a similar human pose picture, where the method includes: receiving an input picture, where the input picture includes a portrait; selecting, as a recommended human pose picture, at least one picture that has a highest similarity to the input picture from a picture library through metric learning that is based on a multi-level environmental information feature, where the multi-level environmental feature includes a scene feature, an object spatial distribution feature, and a foreground human feature; and presenting the recommended human pose picture to a user in a predetermined preview manner.

Optionally, the method further includes: receiving a recommendation preference setting of the user, where the selecting, as a recommended human pose picture, at least one picture that has a highest similarity to the input picture from a picture library through metric learning that is based on a multi-level environmental information feature includes: selecting, as the recommended human pose picture, at least one picture that has a highest similarity to the input picture from the picture library based on a recommendation preference of the user and through metric learning that is based on the multi-level environmental information feature, where the recommended human pose picture meets the recommendation preference of the user.

Optionally, the selecting, as a recommended human pose picture, at least one picture that has a highest similarity to the input picture from a picture library through metric learning that is based on a multi-level environmental information feature includes: performing feature extraction processing on the input picture to obtain a feature of the input picture; calculating, through metric learning that is based on the multi-level environmental information feature, a similarity between the feature of the input picture and a feature that is of each image and that is in a feature library, where the feature library is obtained by extracting a predetermined quantity of dimensions of features from each picture in the picture library; and selecting at least one picture corresponding to a top-ranked similarity as the recommended human pose picture from the picture library based on a calculation result.

Optionally, the method further includes: receiving the recommendation preference setting of the user; and obtaining, as a final recommended human pose picture by screening the human pose pictures, a picture that meets the recommendation preference.

Optionally, the receiving an input picture includes: receiving a plurality of input pictures that are at different angles and that includes a photographing object. Optionally, another alternative solution is as follows: the receiving an input picture includes: receiving at least one input picture that is at different angles and that includes a photographing object; and the selecting, as a recommended human pose picture, at least one picture that has a highest similarity to the input picture from a picture library through metric learning that is based on a multi-level environmental information feature includes: calculating, through metric learning that is based on the multi-level environmental information feature, a picture that is in the picture library and that is most similar to each of the input pictures; and ranking all most similar pictures, and selecting at least one top-ranked picture as the recommended human pose picture.

Optionally, the method further includes: receiving a user-defined picture uploaded by the user; and updating the user-defined picture to the picture library.

According to an aspect, an embodiment of this application provides an apparatus for recommending a picture, where the apparatus includes: a receiving module configured to receive an input picture, where the input picture includes a portrait; a recommendation module configured to select, as a recommended human pose picture from a picture library through metric learning that is based on a multi-level environmental information feature, at least one picture that has a highest similarity to the input picture received by the receiving module, where the multi-level environmental feature includes a scene feature, an object spatial distribution feature, and a foreground human feature; and an output module configured to present the recommended human pose picture to a user in a predetermined preview manner.

Optionally, the apparatus further includes: a preference setting receiving module configured to receive a recommendation preference setting of the user, where the recommendation module is configured to: select, as the recommended human pose picture, at least one picture that has a highest similarity to the input picture from the picture library based on a recommendation preference of the user and through metric learning that is based on the multi-level environmental information feature, where the recommended human pose picture meets the recommendation preference of the user.

Optionally, the recommendation module includes: a feature extraction unit configured to perform feature extraction processing on the input picture to obtain a feature of the input picture; a similarity calculation unit configured to calculate, through metric learning that is based on the multi-level environmental information feature, a similarity between the feature of the input picture and a feature that is of each image and that is in a feature library, where the feature library is obtained by extracting a predetermined quantity of dimensions of features from each picture in the picture library; and a recommendation unit configured to select at least one picture corresponding to a top-ranked similarity as the recommended human pose picture from the picture library based on a calculation result.

Optionally, the receiving module is further configured to receive a plurality of input pictures that are at different angles and that include a photographing object.

The recommendation module includes: a similarity calculation unit configured to calculate, through metric learning that is based on the multi-level environmental information feature, a picture that is in the picture library and that is most similar to each of the input pictures; and a recommendation unit configured to: rank all most similar pictures, and select at least one top-ranked picture as the recommended human pose picture.

Optionally, the apparatus further includes: a user-defined picture receiving module configured to receive a user-defined picture uploaded by the user; and an update module configured to update the user-defined picture to the picture library.

According to an aspect, an embodiment of this application provides a method for prompting a user to perform photographing through similar image composition, where the method includes: receiving a set of a plurality of original pictures that are taken by a user at a current place, that include a photographing object, and that are at different angles; and recommending at least one target picture and at least one corresponding original picture to the user, where the target picture includes a recommended human pose, and the target picture has similar background image composition to the corresponding original picture.

Optionally, the method further includes: displaying a preview frame in a photographing interface, displaying, in the preview frame, a preview picture corresponding to the target picture and the corresponding original picture, and providing a text prompt.

According to an aspect, an embodiment of this application provides an intelligent terminal capable of prompting a user to perform photographing through similar image composition, where the apparatus includes: a receiving module configured to receive a set of a plurality of original pictures that are taken by a user at a current place, that include a photographing object, and that are at different angles; and a recommendation module configured to recommend at least one target picture and at least one corresponding original picture to the user, where the target picture includes a recommended human pose, and the target picture has similar background image composition to the corresponding original picture.

Optionally, the apparatus further includes a presentation module configured to: display a preview frame in a photographing interface; display, in the preview frame, a preview picture corresponding to the target picture and the corresponding original picture; and provide a text prompt.

According to an aspect, an embodiment of this application provides a method for constructing a human feature library, where the method includes: calculating a similarity between every two human pose pictures in a human pose library; collecting a triplet training sample based on the similarity between every two human pose pictures for all pictures in the human pose library, where each triplet training sample <A, P, N> includes three human pose images, A is a human pose picture in the human pose library, P is a positive sample of the picture A, the positive sample is a human pose picture capable of being directly recommended in a photographing scene of the picture A, N is a negative sample of the picture A, and the negative sample is a human pose picture incapable of being directly recommended in the photographing scene of the picture A; training the triplet training sample through metric learning, to obtain a convolutional neural network (CNN) feature extraction model, where the CNN feature extraction model enables samples capable of being recommended to each other to be close to each other after the samples are mapped to feature space, and enables samples incapable of being recommended to be far away from each other after the samples are mapped to the feature space; and extracting a predetermined quantity of dimensions of features from each picture in the human pose picture library using the CNN feature extraction model, to construct a human pose feature library.

Optionally, the calculating a similarity between every two human pose pictures in a human pose library includes: calculating a background similarity and a foreground similarity between every two human pose pictures in the human pose library; and fusing the background similarity and the foreground similarity between every two human pose pictures in the human pose library, to obtain an overall similarity between every two human pose pictures in the human pose library.

Optionally, the calculating a background similarity and a foreground similarity between every two human pose pictures in the human pose library includes: calculating the background similarity between every two human pose pictures in the human pose library according to a scene classification algorithm and a scene parsing algorithm; and calculating the foreground similarity between every two human pose pictures in the human pose library according to a human attribute extraction algorithm.

Optionally, the collecting a triplet training sample based on the similarity between every two human pose pictures for all pictures in the human pose library includes: for all the pictures in the human pose library, using several pictures that have top-ranked similarities and that are in the human pose library as positive samples, and using all the remaining pictures as negative samples.

According to an aspect, an embodiment of this application provides an apparatus for constructing a human feature library, where the apparatus includes: an image similarity calculation module configured to calculate a similarity between every two human pose pictures in a human pose library; a training sample collection module configured to collect a triplet training sample based on the similarity between every two human pose pictures for all pictures in the human pose library, where each triplet training sample <A, P, N> includes three human pose images, A is a human pose picture in the human pose library, P is a positive sample of the picture A, the positive sample is a human pose picture capable of being directly recommended in a photographing scene of the picture A, N is a negative sample of the picture A, and the negative sample is a human pose picture incapable of being directly recommended in the photographing scene of the picture A; a CNN feature learning module configured to train the triplet training sample through metric learning, to obtain a CNN feature extraction model, where the CNN feature extraction model enables samples capable of being recommended to each other to be close to each other as much as possible after the samples are mapped to feature space, and enables samples incapable of being recommended to be far away from each other as much as possible after the samples are mapped to the feature space; and a human pose feature library construction module configured to extract a predetermined quantity of dimensions of features from each picture in the human pose picture library using the CNN feature extraction model, to construct a human pose feature library.

Optionally, the image similarity calculation module includes: a similarity calculation unit configured to calculate a background similarity and a foreground similarity between every two human pose pictures in the human pose library; and a fusion unit configured to fuse the background similarity and the foreground similarity between every two human pose pictures in the human pose library, to obtain an overall similarity between every two human pose pictures in the human pose library.

Optionally, the training sample collection module is configured to: for all the pictures in the human pose library, use several pictures that have top-ranked similarities and that are in the human pose library as positive samples, and use all the remaining pictures as negative samples.

According to an aspect, an embodiment of this application provides a method for optimizing a photographing pose of a user, applied to an electronic device, where the method includes: displaying a photographing interface of a camera of the electronic device; obtaining a to-be-taken image in the photographing interface, and determining, based on the to-be-taken image, that the photographing interface includes a portrait; and entering a pose recommendation mode, and presenting a recommended human pose picture to a user in a predetermined preview manner, where the human pose picture is at least one picture that is selected from a picture library through metric learning and that has a top-ranked similarity to the to-be-taken image, and the similarity is an overall similarity obtained by fusing a background similarity and a foreground similarity.

Optionally, after the entering a pose recommendation mode, before the presenting a recommended human pose picture to a user in a predetermined preview manner, the method further includes: performing feature extraction processing on the to-be-taken image to obtain a feature of the to-be-taken image; calculating a similarity between the feature of the to-be-taken image and a feature that is of each image and that is in a feature library, where the feature library is obtained by extracting a predetermined quantity of dimensions of features from each picture in the picture library; and ranking similarities, and selecting at least one picture corresponding to a top-ranked similarity as the recommended human pose picture from the picture library.

Optionally, after the entering a pose recommendation mode, before the presenting a recommended human pose picture to a user in a predetermined preview manner, the method further includes: performing feature extraction processing on the to-be-taken image to obtain a feature of the to-be-taken image; after the user correspondingly switches to a cloud intelligent recommendation mode, transmitting the feature of the to-be-taken image to a cloud server; and receiving the recommended human pose picture, where the recommended human pose picture is at least one picture that is selected by the cloud server from the picture library based on the feature of the to-be-taken image and that has a top-ranked similarity to the to-be-taken image.

Optionally, after the entering a pose recommendation mode, before the presenting a recommended human pose picture to a user in a predetermined preview manner, the method further includes: receiving a recommendation preference setting of the user; and selecting, as the recommended human pose picture, at least one picture that has a top-ranked similarity to the input picture from the picture library based on a recommendation preference of the user through metric learning, where the recommended human pose picture meets the recommendation preference of the user.

Optionally, the method further includes: receiving a user-defined picture uploaded by the user; and updating the user-defined picture to the picture library.

According to an aspect, an embodiment of this application provides an electronic device, including: one or more processors; one or more memories; a plurality of application programs; and one or more programs, where the one or more programs are stored in the memory, and when the one or more programs are executed by the processor, the electronic device is enabled to perform the following steps: displaying a photographing interface of a camera of the electronic device; obtaining a to-be-taken image in the photographing interface, and determining, based on the to-be-taken image, that the photographing interface includes a portrait; and entering a pose recommendation mode, and presenting a recommended human pose picture to a user in a predetermined preview manner, where the human pose picture is at least one picture that is selected from a picture library through metric learning and that has a top-ranked similarity to the to-be-taken image, and the similarity is an overall similarity obtained by fusing a background similarity and a foreground similarity.

Optionally, when the one or more programs are executed by the processor, the electronic device is enabled to perform the following steps: performing feature extraction processing on the to-be-taken image to obtain a feature of the to-be-taken image; calculating a similarity between the feature of the to-be-taken image and a feature that is of each image and that is in a feature library, where the feature library is obtained by extracting a predetermined quantity of dimensions of features from each picture in the picture library; and ranking similarities, and selecting at least one picture corresponding to a top-ranked similarity as the recommended human pose picture from the picture library.

Optionally, when the one or more programs are executed by the processor, the electronic device is enabled to perform the following steps: performing feature extraction processing on the to-be-taken image to obtain a feature of the to-be-taken image; after the user correspondingly switches to a cloud intelligent recommendation mode, transmitting the feature of the to-be-taken image to a cloud server; and receiving the recommended human pose picture, where the recommended human pose picture is at least one picture that is selected by the cloud server from the picture library based on the feature of the to-be-taken image and that has a top-ranked similarity to the to-be-taken image.

Optionally, when the one or more programs are executed by the processor, the electronic device is enabled to perform the following steps: receiving a recommendation preference setting of the user; and selecting, as the recommended human pose picture, at least one picture that has a top-ranked similarity to the input picture from the picture library based on a recommendation preference of the user through metric learning, where the recommended human pose picture meets the recommendation preference of the user.

Optionally, when the one or more programs are executed by the processor, the electronic device is enabled to perform the following steps: receiving a user-defined picture uploaded by the user; and updating the user-defined picture to the picture library.

According to an aspect, an embodiment of this application provides a computer storage medium, including computer instructions, where when the computer instructions are run on an electronic device, the electronic device is enabled to perform the method for recommending a similar human pose picture in any one of the foregoing implementations.

According to an aspect, an embodiment of this application provides a computer program product, where when the computer program product runs on a computer, the computer is enabled to perform the method for recommending a similar human pose picture.

In the embodiments of the present application, a multi-level feature of an image is used, beneficial information in human pose recommendation is used, a similarity is defined for human pose recommendation based on the beneficial information, and information fusion and model training are effectively performed through metric learning. Therefore, a lightweight high-accuracy solution is implemented, and the solution can be deployed on a mobile terminal such as a mobile phone for real-time pose recommendation.

Further, the user customizes a recommendation picture library, and may upload a user-defined human pose picture using a sharing mechanism, to continuously update and expand a local picture library and a cloud picture library.

Further, the user may set a user preference option based on a current environment. Then, a human pose picture actually required by the user is recommended based on a personalized setting of the user. This further improves user experience.

These aspects or other aspects of this application are clearer and more comprehensible in descriptions of the following embodiments.

BRIEF DESCRIPTION OF DRAWINGS

To describe the technical solutions in the embodiments of this application more clearly, the following briefly describes the accompanying drawings required for describing the embodiments. It is clear that, the accompanying drawings in the following description show some embodiments of this application, and a person of ordinary skill in the art may still derive other drawings from these accompanying drawings without creative efforts.

FIG. 9A is a schematic diagram of an effect according to an embodiment of this application;

FIG. 17A to FIG. 17C are a schematic diagram of a user interface according to an embodiment of this application;

DESCRIPTION OF EMBODIMENTS

Figure 1:
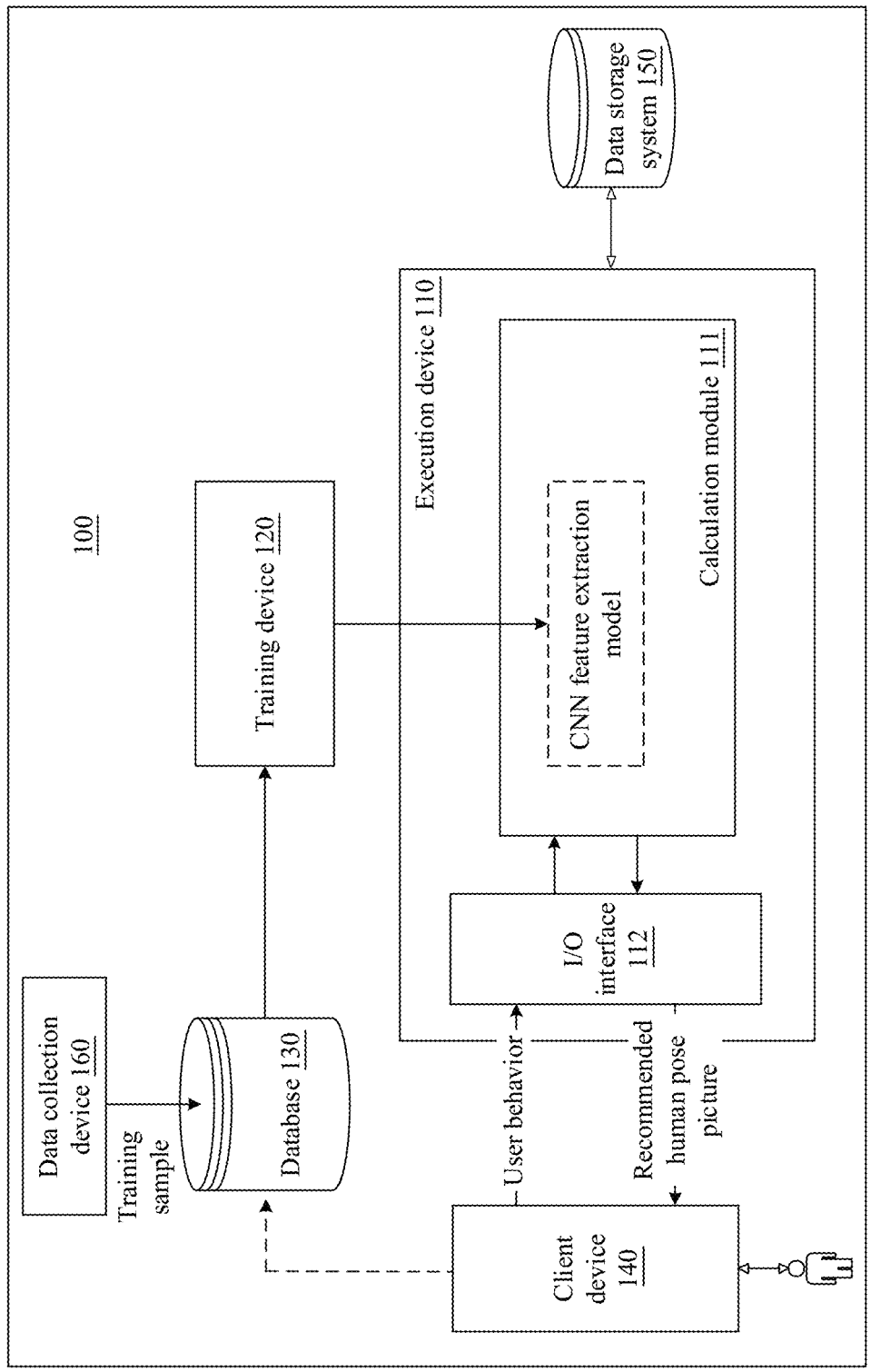
FIG. 1 is a schematic diagram of a structure of a system architecture according to an embodiment of this application.

First, acronyms used in the embodiments of this application are listed in Table 1 as follows.

TABLE 1

| English acronym | Complete English expression | Notes |
| --- | --- | --- |
| SC | Scene Classification | Recognize, using a computer vision technology, a category of a scene in which an image is located |
| SP | Scene Parsing | Perform pixel-level semantic prediction for a complex image scene |
| CNN | Convolutional Neural Network | Deep learning network |
| HAR | Human Attribute Recognition | Recognize human attribute information in an image, including a gender, clothing, and the like |
| 2D | 2-Dimensional | Dimensional presentation manner |
| HD | Human Detection | Mark a location of a human being in an image with a 2D box |
| ML | Metric Learning | Calculate a similarity between two pictures, such that an input picture is classified into a picture category with a large similarity |

The embodiments of this application relate to a large amount of application of a neural network. Therefore, for ease of understanding, the following first describes related concepts such as related terms in the embodiments of this application and the neural network.

(1) Object recognition means determining a category of an object in an image using a related method such as image processing, machine learning, and computer graphics.

(2) Neural network

The neural network may include neurons. The neuron may be an operation unit with $x_s$ and an intercept 1 as input. Output of the operation unit may be as follows:

$$h_{W,b}(x)=f(W^Tx)=f(\Sigma_{s=1}^{n}W_sx_s+b) \quad (1\text{-}1),$$

where s=1, 2, . . . , n, n is a natural number greater than 1, Ws is a weight of xs, b is a bias of the neuron, and f is an activation function of the neuron, and is used to introduce a nonlinear characteristic into the neural network, to convert an input signal in the neuron into an output signal. The output signal of the activation function may be used as input of a next convolutional layer. The activation function may be a sigmoid function. The neural network is a network formed by connecting a plurality of the foregoing single neurons together. In other words, output of a neuron may be input of another neuron. Input of each neuron may be connected to a local receptive field at a previous layer, to extract a feature in the local receptive field. The local receptive field may be an area that includes several neurons.

(3) Deep neural network (DNN)

The deep neural network is also referred to as a multi-layer neural network, and may be understood as a neural network having a plurality of hidden layers. Herein, "a plurality of" has no particular measurement criterion. According to locations of different layers of the DNN, neural networks inside the DNN may be classified into three types: an input layer, a hidden layer, and an output layer. Generally, the first layer is the input layer, the last layer is the output layer, and layers in the middle are hidden layers. The layers are fully connected to each other, that is, any neuron at an $i^{th}$ layer is connected to any neuron at an $(i+1)^{th}$ layer. Although the DNN appears to be complex, the network is not complex in terms of working of each layer. Briefly, the network is the following linear relationship expression: $\vec{y}=a \ (W\vec{x}+\vec{b})$, where $\vec{x}$ is an input vector, $\vec{y}$ is an output vector, $\vec{b}$ is a bias vector, W is a weight matrix (also referred to as a coefficient), and a( ) is an activation function. Each layer performs only such a simple operation on the input vector $\vec{x}$ to obtain the output vector $\vec{y}$. Because the DNN has a large quantity of layers, a quantity of coefficients W and a quantity of bias vectors $\vec{b}$ are also large. These parameters are defined in the DNN as follows: The coefficient W is used as an example, and it is assumed that a linear coefficient from the fourth neuron at the second layer to the second neuron at the third layer is defined as $W_{24}^3$ in a DNN with three layers. A superscript 3 represents a layer at which the coefficient W is located, and a subscript corresponds to an output index 2 at the third layer and an input index 4 at the second layer. In summary, a coefficient from a $k^{th}$ neuron at an $(L-1)^{th}$ layer to a $j^{th}$ neuron at an $L^{th}$ layer is defined as $W_{jk}^L$. It should be noted that the input layer has no parameter W.

In the deep neural network, more hidden layers allow the network to show a complex situation in the real world. Theoretically, a model having more parameters is more complex, and has a larger "capacity". This means that the model can complete a more complex learning task. Training the deep neural network is also a process of learning the weight matrix, and a final purpose thereof is to obtain a weight matrix (a weight matrix including vectors W at a plurality of layers) of each layer of the trained deep neural network.

(4) Convolutional neural network (CNN)

The convolutional neural network is a deep neural network with a convolutional structure. The convolutional neural network includes a feature extractor including a convolutional layer and a sub-sampling layer. The feature extractor may be considered as a filter, and a convolution process may be considered as performing convolution using a trainable filter and an input image or a convolutional feature map. The convolutional layer is a neuron layer that is in the convolutional neural network and at which convolution processing is performed on an input signal. At the convolutional layer of the convolutional neural network, a neuron may be connected only to some neurons at a neighboring layer. One convolutional layer usually includes several feature maps, and each feature map may include some rectangularly arranged neurons. Neurons in a same feature map share a weight, and the shared weight herein is a convolution kernel. Sharing a weight may be understood as a manner of extracting image information being unrelated to a location. An implied principle is that statistical information of a part of an image is the same as that of another part. This means that image information obtained through learning at a part can also be used at another part. Therefore, the same image information obtained through learning can be used for all locations on the image. At a same convolutional layer, a plurality of convolution kernels may be used to extract different image information. Usually, a larger quantity of convolution kernels indicates richer image information reflected by a convolution operation.

The convolution kernel may be initialized in a form of a matrix with a random size. In a process of training the convolutional neural network, the convolution kernel may be used to obtain a proper weight through learning. In addition, sharing a weight reduces connections between layers of the convolutional neural network and also reduces a risk of overfitting.

(5) Loss function

In a process of training the deep neural network, output of the deep neural network is expected to be close to a really desired prediction value as much as possible. Therefore, a current prediction value of the network and a really desired target value may be compared, and then a weight vector of each layer of the neural network may be updated based on a difference between the two values (certainly, an initialization process is usually performed before the first update, that is, a parameter is preconfigured for each layer of the deep neural network). For example, if the prediction value of the network is high, the weight vector is adjusted to obtain a lower prediction value of the network, and is continuously adjusted until the deep neural network can predict the really desired target value or a value very close to the really desired target value. Therefore, "how to compare the prediction value with the target value" needs to be predefined, the difference between the prediction value and the target value is a loss function or an objective function, and the function is an important equation used to measure the difference between the prediction value and the target value. The loss function is used as an example. A higher output value (loss) of the loss function indicates a larger difference. In this case, training of the deep neural network becomes a process of reducing the loss as much as possible.

(6) Back propagation algorithm

The convolutional neural network may correct a value of an initial parameter in a super-resolution model in a training process according to an error back-propagation (BP) algorithm, such that a reconstruction error loss of the super-resolution model becomes increasingly less. For example, an input signal is transferred forward until an error loss occurs in output, and the initial parameter in the super-resolution model is updated by propagating error loss information backward, such that the error loss converges. The back-propagation algorithm includes a backward propagation of errors operation mainly for the error loss, and is intended at least to obtain an optimal parameter in the super-resolution model, for example, a weight matrix.

It should be noted that English descriptions are used in some accompanying drawings in the embodiments of the present application to better comply with term descriptions in the industry. The following describes the embodiments of this application with reference to accompanying drawings.

A technical problem to be resolved in the embodiments of this application is how to recommend a human pose in various daily scenes. When a user uses a terminal device such as a mobile phone to perform portrait photographing in a daily scene, a method for recommending a human pose may be used to recommend, based on information about an environment in which a photographed person is currently located, a series of professional portrait pose pictures that are highly similar to the current environment. Further, the photographed person may perform selection and reference from these pictures. This further improves a pose feeling and an aesthetic feeling in portrait photographing. Therefore, deep understanding needs to be performed on the information about the current environment to ensure a good recommendation effect, and model complexity also needs to be considered, to facilitate deployment on a terminal device such as a mobile phone.

The embodiments of this application are applicable to many scenarios, and in some aspects, one or more embodiments herein may mainly be applied to one or more of the following scenarios. In auxiliary portrait photographing and intelligent image composition, the method in at least one of the embodiments herein may be used to assist a user in posing for photographing a picture, e.g., such that a portrait picture is more interesting and aesthetically pleasing. At least one or more embodiments of this application may be applied to a scenario of a user performing an image search with an image on a mobile device, e.g., to help the user find a highly similar picture. Example scenarios are detailed below.

Application Scenario 1: Auxiliary Portrait Photographing

Figure 3:
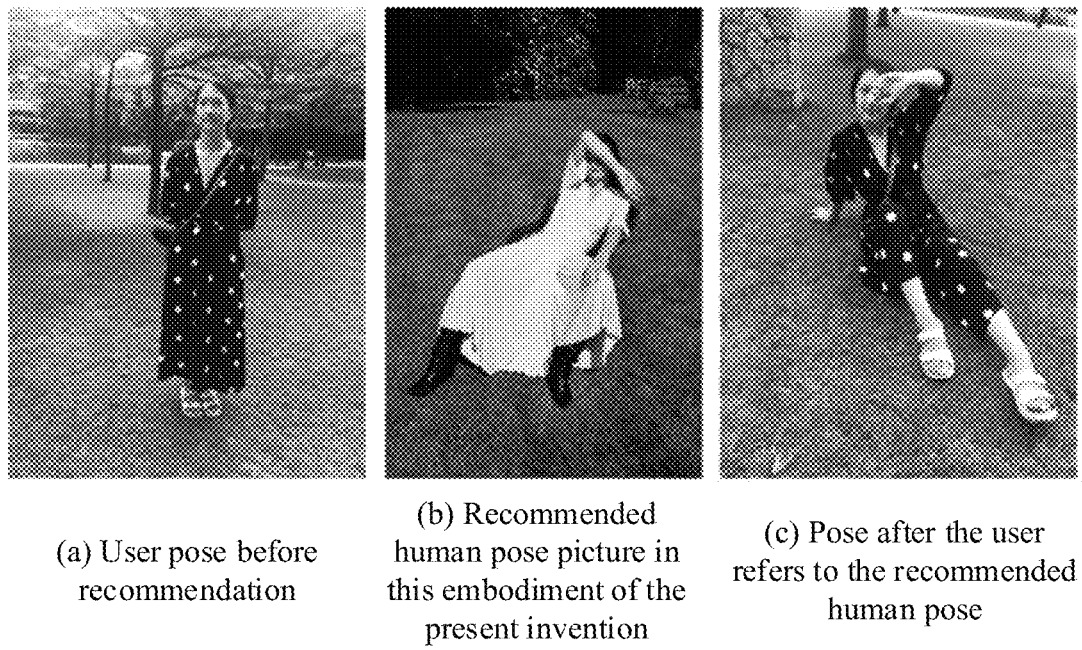
FIG. 3 is a schematic diagram of an effect according to an embodiment of this application.

In different scenes, when the user performs portrait photographing using a terminal device such as a mobile phone, many photographed persons often do not have a very good idea of posing for photographing. Consequently, a photographed portrait pose is monotonous. This affects an overall aesthetic feeling of a portrait picture. In the method of the present application, on the other hand, the terminal device such as a mobile phone is configured to: obtain a current preview picture; analyze environmental information of the current preview picture and subject information of a photographed person; and recommend, from a library of professional portrait pictures obtained through prescreening or a library of user-defined/favorite pictures, a human pose picture that is highly similar to a current scene and an attribute (e.g., a quantity of persons, a gender, clothing, and the like) of the photographed person, for reference or imitation by the photographed person. This further improves a pose feeling in portrait photographing. As shown in FIG. 3, for example, (a) shows a picture that is obtained through photographing a user based on an initial pose of a photographed person when the user poses for photographing in a current scene; (b) shows a human pose picture recommended based on an environment in which the user is located and a subject attribute of the photographed person in the present application; and (c) shows a photographing result obtained after the photographed person adjusts the pose by referring to the recommended human pose picture. It may be clearly found that the recommended human pose picture in the present application is highly similar to the current environment, and a great beneficial effect is produced for the photographed person in posing for photographing.

Application Scenario 2: Image Search with an Image

Figure 4:
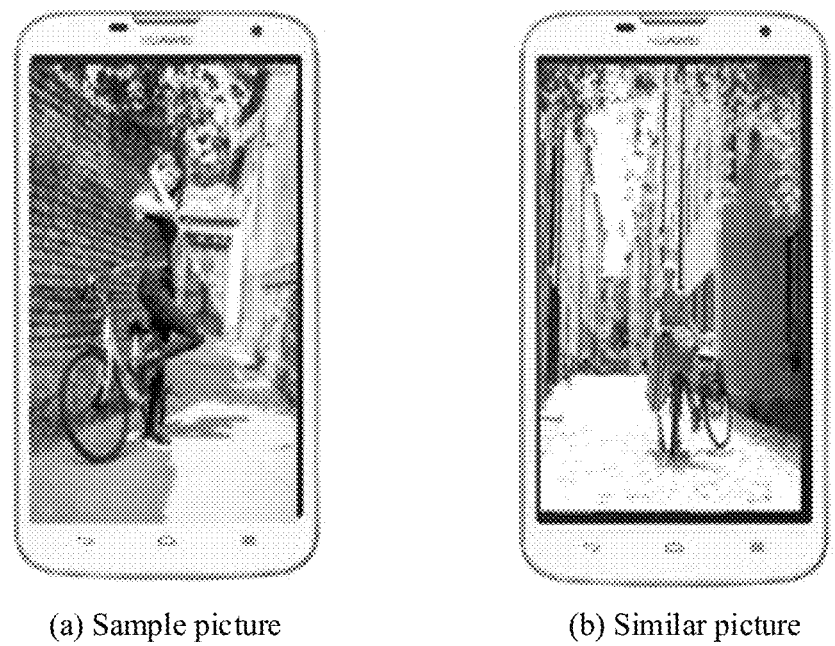
FIG. 4 is a schematic diagram of an effect according to an embodiment of this application.

When the user performs image searching with an image using a terminal device such as a mobile phone, to improve a search effect, a plurality of levels of beneficial information of an image need to be used, and a calculation capability of the mobile device needs to be considered. Therefore, a lightweight high-precision solution is required. According to the method in the present application, the plurality of levels of rich information of the image are fully used, a similarity is obtained based on the information, multi-feature information fusion and mining are performed through metric learning, to implement a very lightweight retrieval or recommendation solution that can run in real time on a mobile device such as a mobile phone. When the user already has a sample image in an environment, and expects to obtain a picture in a similar environment through search or matching using a picture library on a mobile phone of the user or a predefined picture library, a feature of the image may be extracted using the solution in the present application, then similarity matching is performed with an existing image in the picture library, and a most similar picture is displayed to the user in a similarity order. As shown in FIG. 4, for example, (a) shows a sample picture used by the user, and (b) shows a similar picture found using the method in the present application. It may be clearly found that a result found using the method in the present application is very similar to the sample picture.

The following describes a system architecture provided in an embodiment of this application.

Refer to FIG. 1. An embodiment of this application provides a system architecture 100. As shown in the system architecture 100, a data collection device 160 is configured to collect training data, where the training data in this embodiment of this application includes an image or an image block that includes a human being; and store the training data into a database 130. In other words, the database 130 herein stores a human pose picture library.

A training device 120 obtains a CNN feature extraction model 101 through training based on the training data maintained in the database 130. How the training device 120 obtains the CNN feature extraction model 101 based on the training data is described in more detail in the following embodiments of this application. The CNN feature extraction model 101 can be configured to: perform related preprocessing on the image or the image block that includes a human being; and then input the image or the image block into the CNN feature extraction model 101, to obtain a predetermined quantity of dimensions of features of the image or the image block that includes a human being. These features are used to constitute a human pose feature library.

The CNN feature extraction model 101 in this embodiment of this application may be implemented using a CNN convolutional neural network. It should be noted that, in actual application, the training data maintained in the database 130 is not necessarily all collected by the data collection device 160, but may be received from another device. For example, in some cases a user directly uploads the data to the database using an electronic device of the user. In addition, it should be noted that the training device 130 does not necessarily train the CNN feature extraction model 101 fully based on the training data maintained in the database 130, but may train the model by obtaining training data from a cloud or another place. The foregoing descriptions should not be construed as a limitation on this embodiment of this application.

The CNN feature extraction model 101 obtained by the training device 120 through training may be applied to different systems or devices, for example, applied to an execution device 110 shown in FIG. 1. The execution device 110 may be a terminal such as a mobile phone terminal, a tablet computer, a notebook computer, augmented reality (AR)/virtual reality (VR), or an in-vehicle terminal, or may be a server, a cloud, or the like. For example, when the execution device 110 is a mobile phone terminal, the CNN feature extraction model 101 may be packaged into a software development kit (SDK) and directly downloaded to the mobile phone for running. In FIG. 1, an input/output (I/O) interface 112 is configured for the execution device 110 to exchange data with an external device. The user inputs data through the I/O interface 112. Optionally, as shown in FIG. 1, the user may exchange data with the I/O interface 112 using a client device 140. The input data in this embodiment of this application may include an image that includes a human being and that is taken by the user using the electronic device, or an image that includes a human being and that is stored by the user into a local storage device of the execution device.

In a process in which the execution device 110 preprocesses the input data or a calculation module 111 of the execution device 110 performs related processing such as calculation (for example, in a process that is of searching for a similar picture and that is mentioned in this application), the execution device 110 may invoke data, code, and the like in a data storage system 150 for corresponding processing; and the execution device 110 may also store, into the data storage system 150, data, instructions, and the like that are obtained through corresponding processing. For example, in an embodiment, the human pose feature library obtained using the method in the embodiments of this application may be stored into the data storage system 150.

Finally, the I/O interface 112 returns, to the user, a processing result such as a found human pose picture that can be used for recommendation, and presents the result to the user.

In the case shown in FIG. 1, the user may manually specify input data, and the input data may be manually specified using an interface provided by the I/O interface 112. In another case, the client device 140 may automatically send input data to the I/O interface 112. If automatically sending the input data by the client device 140 needs to be authorized by the user, the user may set corresponding permission on the client device 140. The user may view, on the client device 140, a result that is output by the execution device 110. The result may be presented in a specific manner such as display, sound, or an action. The client device 140 may alternatively serve as a data collection end, to collect, as a new sample data, the input data that is input to the I/O interface 112 and the output result that is output from the I/O interface 112 shown in the figure, and store the new sample data into the database 130. Certainly, the client device 140 may not perform collection, but the I/O interface 112 directly stores, as new sample data into the database 130, the input data that is input to the I/O interface 112 and the output result that is output from the I/O interface 112 shown in the figure.

It should be noted that FIG. 1 is merely a schematic diagram of a system architecture according to an embodiment of the present application. A relationship between locations of a device, a component, a module, and the like shown in the figure does not constitute any limitation. For example, in FIG. 1, the data storage system 160 is an external memory relative to the execution device 110. However, in another case, the data storage system 160 may be disposed in the execution device 120. Optionally, in an embodiment, the client device 140 may be located in the execution device 110.

The method and the apparatus provided in the embodiments of this application may be further used to expand a training database. As shown in FIG. 1, the I/O interface 112 of the execution device 120 may send, as training data to the database 130, an image (for example, an image including a portrait, where the image may be obtained through photographing by an electronic device such as a smartphone or a digital camera, or may be uploaded by the user) processed by the execution device, such that the training data maintained in the database 130 is richer, to provide richer training data for training working of the training device 130.

The method for training a CNN feature extraction model provided in the embodiments of this application relates to computer vision processing, and may be applied to a data processing method such as data training, machine learning, and deep learning. A trained CNN feature extraction model is finally obtained by performing symbolic and formal intelligent information modeling, extraction, preprocessing, training, and the like on training data. In addition, in the embodiments of this application, input data (for example, the human pose picture in this application) is input to the trained CNN feature extraction model to obtain output data (for example, a predetermined quantity of dimensions of features extracted from each human pose image in the human pose picture library that are repeatedly mentioned below in the embodiments of this application, where these features constitute the human pose feature library).

As described in the descriptions of the foregoing basic concepts, the convolutional neural network is a deep neural network with a convolutional structure, and is a deep learning architecture. The deep learning architecture means performing multi-level learning at different abstraction layers according to a machine learning algorithm. As a deep learning architecture, the CNN is a feed-forward artificial neural network, and each neuron in the feed-forward artificial neural network may respond to an image that is input into the neuron.

Figure 2:
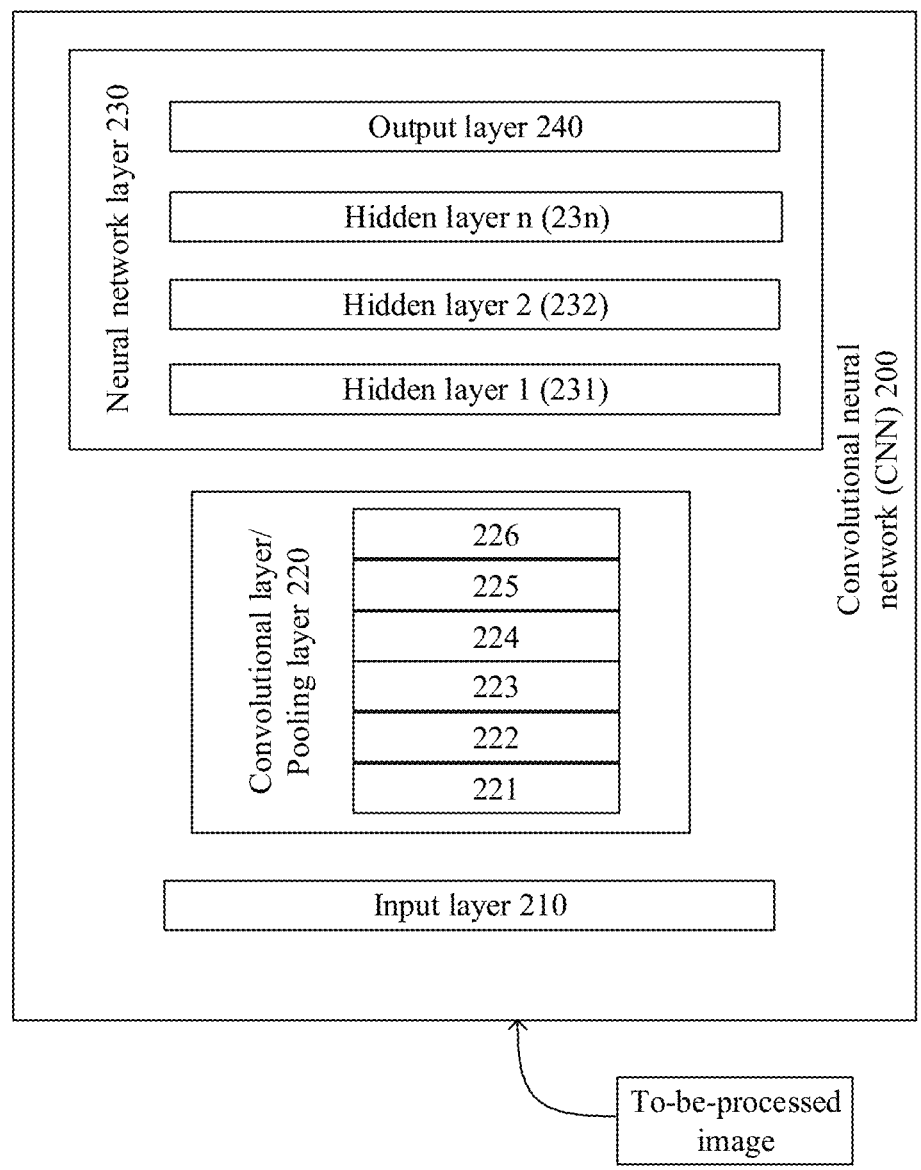
FIG. 2 is a schematic diagram of a CNN feature extraction model according to an embodiment of this application.

As shown in FIG. 2, a convolutional neural network (CNN) 200 may include an input layer 210, a convolutional layer/pooling layer 220 (where the pooling layer is optional), and a neural network layer 230.

Convolutional Layer/Pooling Layer 220.

Convolutional Layer.

As shown in FIG. 2, the convolutional layer/pooling layer 220 may include at least one convolutional and/or pooling layer, such as for example, any one or more of layers 221 to 226. For example, in an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer. In another implementation, the layers 221 and 222 are convolutional layers, the layer 223 is a pooling layer, the layers 224 and 225 are convolutional layers, and the layer 226 is a pooling layer. To be more specific, output of a convolutional layer may be used as input of a subsequent pooling layer, and/or may be used as input of another convolutional layer to continue to perform a convolution operation.

The following uses the convolutional layer 221 as an example to describe internal working principles of the convolutional layer.

The convolutional layer 221 may include a plurality of convolution operators, and the convolution operator is also referred to as a kernel. A function of the convolution operator in image processing is equivalent to a filter for extracting specified information from an input image matrix. The convolution operator may be essentially a weight matrix, and the weight matrix is usually predefined. In a process of performing a convolution operation on an image, the weight matrix is usually used to process pixels on the input image one by one (or two by two . . . which depends on a value of a stride) in a horizontal direction, to complete extracting a specified feature from the image. A size of the weight matrix should be related to a size of the image. It should be noted that a depth dimension of the weight matrix is the same as a depth dimension of the input image. In the process of performing the convolution operation, the weight matrix extends to an entire depth of the input image.

Therefore, after convolution with a single weight matrix is performed, convolutional output in a single depth dimension is generated. However, in most cases, the single weight matrix is not used, but a plurality of weight matrices with a same size (row×column), namely, a plurality of isotypic matrices, are used. Output of all weight matrices is superposed to form a depth dimension of a convolutional image, and it may be understood that the dimension herein depends on the foregoing "plurality of". Different weight matrices may be used to extract different features from the image, for example, a weight matrix is used to extract edge information of the image, another weight matrix is used to extract a specified color of the image, and still another weight matrix is used to blur unneeded noise in the image. The plurality of weight matrices have a same size (row×column), feature maps extracted using the plurality of weight matrices with the same size also have a same size, and then the extracted plurality of feature maps with the same size are combined to form output of the convolution operation.

Weight values in these weight matrices need to be obtained through a large amount of training in actual application. The weight matrices formed using the weight values obtained through training may be used to extract information from an input image, such that the convolutional neural network 220 performs correct prediction.

When the convolutional neural network 220 has a plurality of convolutional layers, an initial convolutional layer (for example, layer 221) usually extracts a large quantity of general features. The general features may also be referred to as low-level features. As the convolutional neural network 210 becomes deeper, features extracted at a more subsequent convolutional layer (for example, layer 226) become more complex, for example, high-level semantic features. Features at a higher semantic level are more applicable to a to-be-resolved problem.

Pooling Layer.

A quantity of training parameters often needs to be reduced. Therefore, the pooling layer often needs to be periodically introduced after the convolutional layer. For the layers 221 to 226 of 220 shown in FIG. 2, one convolutional layer may be followed by one pooling layer, or a plurality of convolutional layers may be followed by one or more pooling layers. In an image processing process, the pooling layer is only used to reduce a space size of an image. The pooling layer may include a mean pooling operator and/or a maximum pooling operator, to sample an input image to obtain an image with a smaller size. The mean pooling operator may perform calculation on pixel values on an image within a specified range to generate a mean value as a mean pooling result. The maximum pooling operator may take a pixel with a maximum value within a specified range as a maximum pooling result. In addition, as the size of the weight matrix at the convolutional layer needs to be related to the size of the image, the operator at the pooling layer also needs to be related to the size of the image. A size of an image that is output after processing is performed at the pooling layer may be less than a size of an image that is input to the pooling layer, and each pixel in the image that is output by the pooling layer represents a mean value or a maximum value of a corresponding sub-area of the image that is input to the pooling layer.

Neural Network Layer 230.

After processing is performed at the convolutional layer/pooling layer 220, the convolutional neural network 200 is not ready to output required output information. A reason is that as described above, the convolutional layer/pooling layer 220 only extracts features and reduces parameters brought by an input image. However, to generate the final output information (required category information or other related information), the convolutional neural network 200 needs to use the neural network layer 230 to generate quantity output of one or a group of required categories. Therefore, the neural network layer 230 may include a plurality of hidden layers (for example, layers 231, 232, and 23n shown in FIG. 2) and an output layer 240. Parameters included at the plurality of hidden layers may be obtained through pre-training based on related training data of a specific task type. For example, the task type may include image recognition, image classification, and image super-resolution reconstruction.

The output layer 240 follows the plurality of hidden layers in the neural network layer 230, in other words, the output layer 240 is the last layer of the entire convolutional neural network 200. The output layer 240 has a loss function similar to a classification cross entropy, and the loss function is used to calculate a prediction error. Once forward propagation (as shown in FIG. 2, propagation in a direction from 210 to 240 is forward propagation) in the entire convolutional neural network 200 is completed, back propagation (as shown in FIG. 2, propagation in a direction from 240 to 210 is back propagation) is started to update a weight value and a deviation at each layer mentioned above, to reduce a loss of the convolutional neural network 200 and an error between an ideal result and a result that is output by the convolutional neural network 200 using the output layer.

It should be noted that the convolutional neural network 200 shown in FIG. 2 is merely an example of a convolutional neural network. In application, the convolutional neural network may alternatively exist in a form of another network model.

The following describes in detail the technical solutions in this application.

Figure 5:
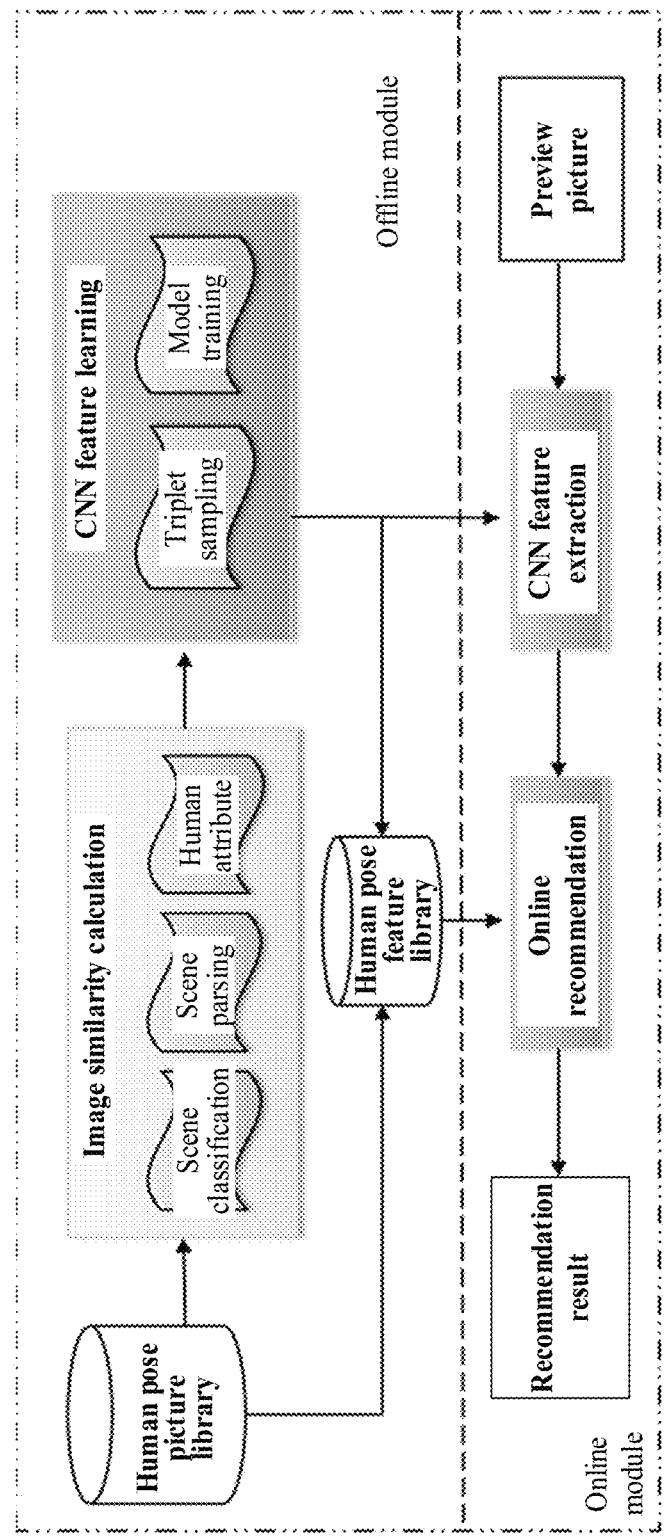
FIG. 5 is a schematic diagram of system implementation according to an embodiment of this application.

FIG. 5 is a schematic diagram of module implementation according to an embodiment of the present application. A form of an implementation product in this embodiment of the present application is a terminal device such as a mobile phone. The product is deployed on a computing node of a related device, to optimize a pose feeling and an aesthetic feeling in portrait photographing and intelligent image composition in a manner of auxiliary photographing through software modification. As shown in FIG. 5, implementation modules in this embodiment of the present application mainly include an offline module and an online module. The offline module is divided into two submodules: an image similarity calculation submodule; and a CNN feature training submodule. The online module is divided into two submodules: a CNN feature extraction submodule; and an online recommendation submodule. A function of each module is described as follows.

(1) Offline Module

The offline module is completed before a model is deployed on a terminal device such as a mobile phone, and may be completed on any server that meets a training capability requirement. A purpose thereof is to obtain a lightweight model capable of understanding environmental information of an image and attribute information of a photographing subject (human being), to support a recommendation capability of the model on a terminal device such as a mobile phone.

Image similarity calculation submodule: Human pose pictures in a human pose library are input to the image similarity calculation module, to obtain a similarity between every two images in the picture library. The similarity includes a background similarity and a foreground similarity. The background similarity represents a scene similarity between environments in which images are located (for example, whether both scenes are beaches), and is obtained through scene classification and scene parsing. The foreground similarity represents a subject attribute similarity between photographed persons (for example, whether the photographed persons have a same gender or similar clothing), and is obtained using a human attribute. An overall similarity of a picture is obtained by fusing the foreground similarity and the background similarity, and the similarity can be used to accurately perform human pose recommendation. Optionally, in an embodiment, the foreground similarity and the background similarity may be fused through metric learning.

It should be noted that in an embodiment, the human pose library is obtained through pre-collection, and may be subsequently expanded through uploading by a user.

A manner of searching for a recommended pose picture on the Internet using an input picture is technically feasible, and it may be useful to combine Internet picture search (for example, search with Baidu Image) with the method in the present patent.

CNN feature learning submodule: The module samples a large quantity of triplets in the human pose library based on image similarity information obtained by the image similarity calculation submodule. Each triplet sample <A, P, N> includes three human pose images. A is a human pose image in the pose library, P is a human pose image (which has a high similarity) capable of being directly recommended in a scene of A, and N is a human pose image (which has a low similarity) incapable of being directly recommended in an environment of A. It should be noted that, A refers to a human pose image in the pose library, P is a human pose image capable of being directly recommended in a photographing scene of the image A, and N is a human pose image incapable of being directly recommended in the photographing scene of the image A.

A lightweight CNN feature extraction model is trained using a large amount of triplet training data through metric learning, such that samples capable of being recommended to each other are close to each other as much as possible after the samples are mapped to feature space, and samples incapable of being recommended are far away from each other as much as possible after the samples are mapped to the feature space. After the CNN feature extraction model is trained, the trained metric learning CNN feature extraction model is used to extract a predetermined quantity of dimensions of features from each human pose image in the human pose picture library (in a possible implementation, extraction is automatically performed using the CNN feature extraction model in background), to constitute a human pose feature library. In an embodiment, the predetermined quantity of dimensions of features may be understood as an array with a fixed length. For example, if a feature dimension is specified to be 10, the 10 dimensions of features [x1, x2, x3, . . . , x10] represent information about this picture.

It should be noted that the human pose picture library is used to store an original picture, and is directly displayed to the user during recommendation. The human pose feature library is used to store a feature of each original picture in the human pose picture library, and is used to calculate a similarity by a background algorithm for recommendation.

(2) Online Module

CNN feature extraction submodule: In an online stage, the metric learning CNN feature extraction model trained offline is deployed on a mobile device such as a mobile phone. Frames are obtained at a fixed interval from a video stream captured by a video camera. A current frame of picture is input to the CNN feature extraction model to extract a predetermined quantity of dimensions of features from the image, and then the features are input to the online recommendation submodule.

Optionally, the CNN feature extraction model may be packaged into an SDK and directly downloaded to the mobile phone for running.

Online recommendation submodule: Input of the module is a feature of a preview picture, the human pose picture library, and the human pose feature library. A similarity between the feature of the preview image and each feature in the feature library is calculated, and then similarities are ranked, to feed back a plurality of most similar pictures in a predetermined preview manner to the user for selection. To accelerate similarity calculation and ranking processes on a device such as a mobile phone, any index manner may be used, and the manner includes but is not limited to a hash index or a decision tree.

Figure 6:
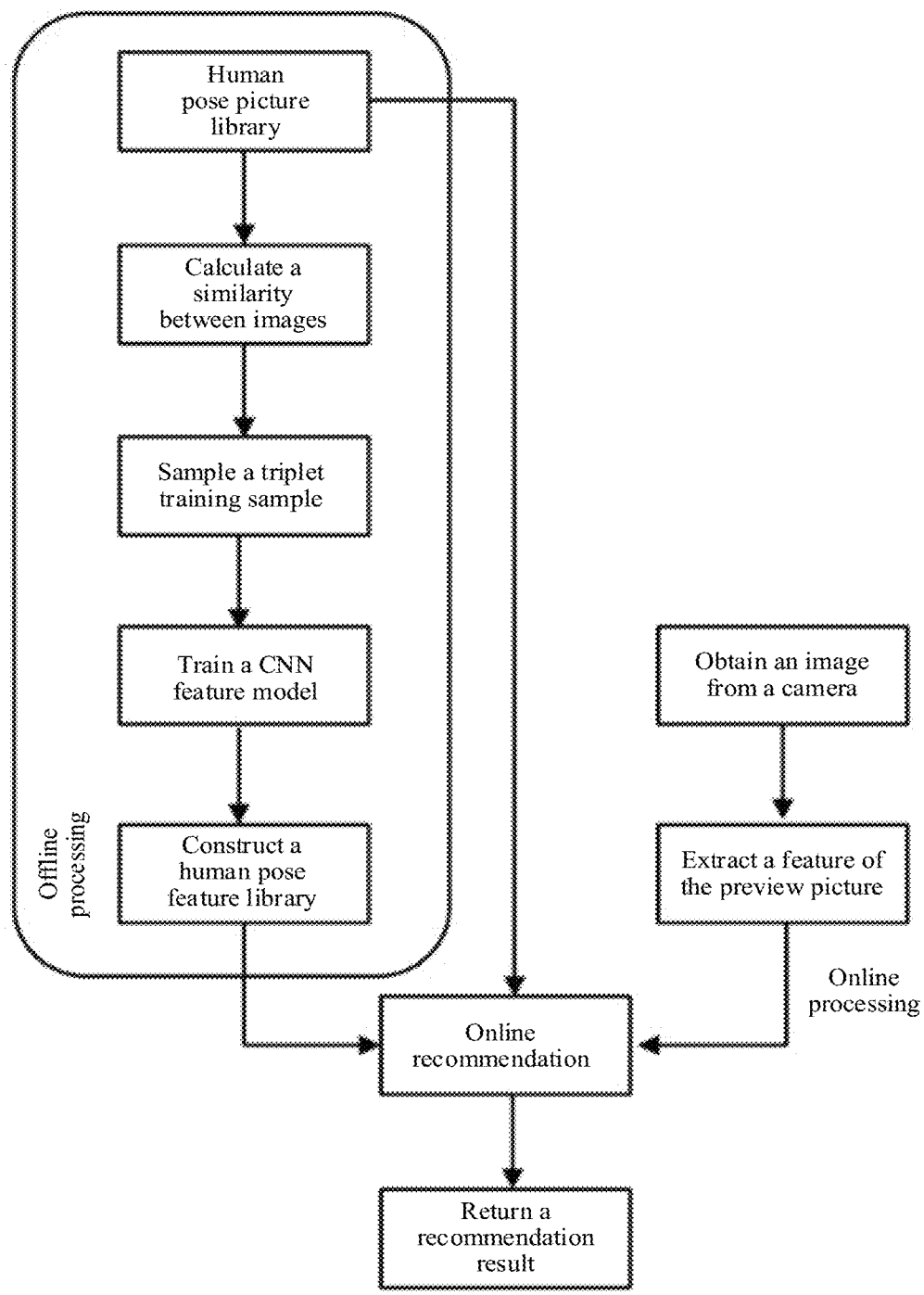
FIG. 6 is a flowchart of a method for recommending a human pose picture according to an embodiment of this application.

A method process in this embodiment of the present application is shown in FIG. 6.

(1) An image similarity is calculated. In this step, a similarity between every two pictures in the human pose picture library is calculated. The similarity includes a background similarity and a foreground similarity. The background similarity represents a scene similarity between environments in which images are located (for example, whether both scenes are beaches), and is obtained through scene classification and scene parsing. The foreground similarity represents a subject attribute similarity between photographed persons (for example, whether the photographed persons have a same gender or similar clothing), and is obtained through human attribute detection. An overall similarity of a picture is obtained by fusing the foreground similarity and the background similarity.

(2) A triplet training sample is sampled. A triplet training sample is collected based on the similarity between every two human pose pictures for all pictures in the human pose library. For all the images in the human pose library, several most similar images in the recommendation picture library are calculated as positive samples (for example, the first K images are obtained in a similarity order), and all the remaining images are used as negative samples. In this way, a large quantity of triplet samples can be collected to support a subsequent training process.

(3) A CNN feature extraction model is trained. A CNN feature network is trained through metric learning using the foregoing sampled triplet training sample. To keep consistency between image scene information, a manner in which metric learning and scene classification are combined with multi-task training is used, and both a rank loss function and a classification loss function are used to optimize a model parameter. The rank loss function label is obtained through triplet sampling, and a scene classification label may be a manually labeled label, or may be a pseudo label obtained by a scene classification network.

(4) A human pose feature library is constructed, and a feature of a preview picture is extracted. In this part, the trained CNN feature extraction model is used to separately extract a feature of an image in the human pose library and a feature of a preview image on a device such as a mobile phone. The former may be completed at any server end and deployed together with the model on a device such as a mobile phone, and the latter needs to be run on a device such as a mobile phone in real time.

(5) Online recommendation is performed. Based on the feature of the preview picture and the feature of the human pose recommendation library, a similarity between the feature of the preview image and a feature that is of each image and that is in the feature library is calculated, and then similarities are ranked, to feed back a plurality of most similar pictures in a predetermined preview manner to a user for selection. To accelerate similarity calculation and ranking processes on a device such as a mobile phone, any index manner may be used, and the manner includes but is not limited to a hash index or a decision tree.

Embodiment 1 of the Present Application

A recommendation method and module in the present application are described in this embodiment of the present application. Main modules in this embodiment of the present application include an offline module and an online module. The offline module is divided into two submodules: an image similarity calculation submodule and a CNN feature learning submodule. The two submodules are configured to obtain, in an unsupervised manner, an image similarity beneficial for human pose recommendation, and then model this similarity relationship through metric learning. The online module is divided into two submodules: a CNN feature extraction submodule and an online recommendation submodule. The two submodules are configured to deploy, on a mobile device such as a mobile phone, a CNN feature extraction model obtained by the offline module, to perform feature extraction and human pose recommendation online in real time. The following describes in detail these modules in this embodiment of the present application.

(1) Offline Module

For offline processing, there are two submodules: the image similarity calculation module and the CNN feature learning submodule. The following separately describes in detail functions of the modules.

Image Similarity Calculation Module.

The image similarity calculation module is configured to: extract a plurality of pieces of beneficial environmental information of an image, and fuse the information to calculate a similarity for human pose recommendation.

In this embodiment of the present application, three levels of environmental information features are used: a scene feature, an object spatial distribution feature, and a foreground human feature. The scene feature is obtained by a pre-trained scene classification network. The scene classification network in this embodiment of the present application may use a plurality of architectures, for example, network structures such as ResNet-152 and DenseNet-161. A data set used to train the scene classification network includes Places365, a SUN database, and the like, and covers most scenes in daily life.

The object spatial distribution feature is obtained by a scene parsing network. The scene parsing network in this embodiment of the present application may use a network architecture that includes but is not limited to PSP-Net or RefineNet, and a training data set may include ADE20K and the like.

Human information is obtained by a human detection network and a human attribute network. The human detection network is configured to detect a human being and obtain a human area as input of the human attribute network. The human attribute network is configured to recognize attribute information of each human being, and the attribute information mainly includes a gender, clothing, and the like. In this embodiment of the present application, the human detection network and the human attribute network may use any high-precision structure. Human detection may be used to train a human detection model using disclosed data such as MS COCO, and a human attribute may be used for model training using a database such as PA-100K.

Figure 7:
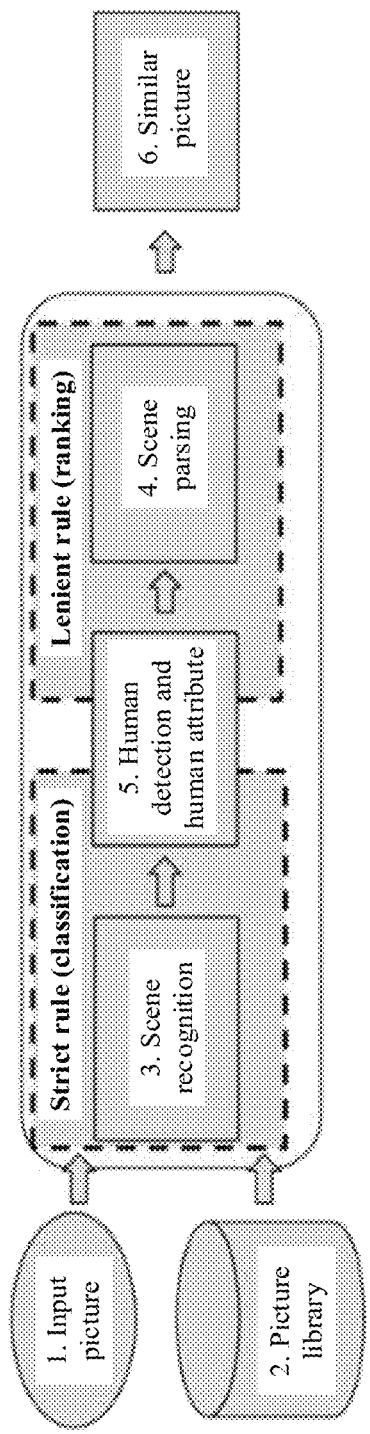
FIG. 7 is a flowchart of a method for recommending a human pose picture according to an embodiment of this application.

Based on the multi-level information, an image similarity is obtained using a multi-stage cascading method, and a schematic process of the method is shown in FIG. 7.

1 and 2: First, any picture (image similarity calculation in this part is used to generate triplet training data, any image herein is any image in a training set, and the training set may include the human pose picture library in FIG. 5) and a picture library (the picture library herein refers to a training set, and the training set may include the human pose picture library in FIG. 5) are specified.

3 and 5: A candidate similar image set that has a similar scene, a similar quantity of persons, and a similar human attribute (optionally, the human attribute includes a gender, clothing, and the like) to a current input image is obtained from the picture library according to strict rules of scene classification, human detection, and human attribute classification.

4: A feature of an image (the image is the "any given picture", or may be understood as the input picture) is obtained based on the scene parsing network.

6: A similarity between object spatial distribution of the input picture and each picture in the candidate similar image set is calculated. Then, ranking is performed. Finally, the first K top-ranked candidate similar images are selected as similar pictures of the input picture, and the remaining pictures are all considered as dissimilar pictures. A feature obtained through scene parsing herein may be directly extracted from a specified layer in a pretrained network, and represents object spatial distribution information of an image.

CNN Feature Learning Submodule.

The module samples a large amount of triplet data based on the image similarity obtained by the image similarity calculation submodule, to perform metric learning training, in order to implement feature fusion. For example, each triplet sample <A, P, N> includes three human pose images. A is a human pose image in a pose library, P is a human pose image capable of being directly recommended in a scene of A and is referred to as a positive sample, and N is a human pose image incapable of being directly recommended in an environment of A and is referred to as a negative sample. For any picture in the image library, a similar image obtained by the image similarity calculation submodule is used as a positive sample, and a dissimilar image is used as a negative sample. For example, A refers to a human pose image in the pose library, P is a human pose image capable of being directly recommended in a photographing scene of the image A, and N is a human pose image incapable of being directly recommended in the photographing scene of the image A. For example, in FIG. 8, A and P are pictures capable of being recommended to each other, and N and A/P are incapable of being recommended to each other because N shows a pose of sitting in a cafe and the pose cannot be used in environments of A and P.

In an embodiment, during model training, each picture corresponds to a plurality of positive samples and a plurality of negative samples. In this case, there are many triplets that are exactly required for training. For example, if there is a training set of 30,000 pictures, millions to tens of millions of triplets may be generated. However, during implementation, some rules may be set to select some important triplets. For example, only K1 most similar positive samples and K2 least similar negative samples are retained for each picture, to limit a quantity of triplets.

Figure 8:
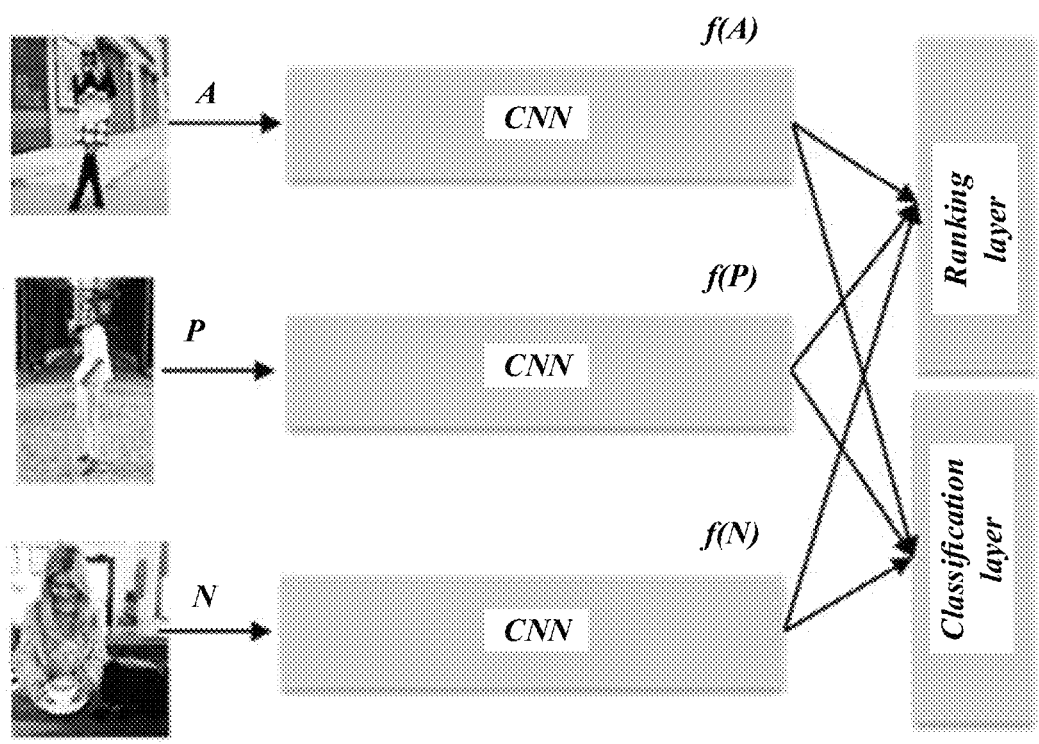
FIG. 8 is a schematic diagram of a network structure of multi-task metric learning according to an embodiment of this application.

The method may be used to obtain a large quantity of triplet samples as training data for metric learning. The metric learning CNN feature extraction model is trained, such that images capable of being recommended to each other are close to each other as much as possible after the images are mapped to feature space, and images incapable of being recommended to each other are far away from each other as much as possible after the images are mapped to the feature space. In this embodiment, the CNN feature extraction model is trained through metric learning. The metric learning model is a triplet network (Triplet Network), and a structure of the triplet network is shown in FIG. 8.

The CNN feature extraction model is obtained through learning based on the triplet network using the network. The triplet network includes three CNN network branches that share a weight. The CNN may be any lightweight CNN basic network that can be deployed at a mobile end, and includes but is not limited to ResNet or MobileNet. The three network branches respectively correspond to three human pose pictures <A, P, N> in a triplet sample, and respective feature vectors f(A), f(P), and f(N) are obtained through forward propagation. In the present application, a mode in which scene classification and metric learning are combined with multi-task training is used, that is, a scene category of a picture is predicted while a predefined similarity relationship is fitted. It is assumed that CNN feature extraction is represented by a function f(*) and an input triplet is represented by <A, P, N>. In this case, a rank loss function of the triplet network is as follows:

$$L_{rank} = \Sigma_i^M [\|f(A)-f(P)\|_2^2 - \|f(A)-f(N)\|_2^2 + \alpha] \quad (1),$$

where $\alpha$ is a parameter and is used to define an optimization distance between a positive sample P and a negative sample N, and M is a quantity of triplet samples. In addition, it is assumed that scene category labels of the three human pose pictures <A, P, N> are respectively $S_A^T$, $S_P^T$, and $S_N^T$, and the label may be a pseudo label obtained by the foregoing scene classification network, or may be a correct label that is manually labeled. A scene classification loss function is introduced as follows:

$$L_{cls} = -\Sigma_i^M S_A^T \log(C(f(A))) + S_P^T \log(C(f(P))) + S_N^T \log(C(f(N))) \quad (2),$$

where C(*) is a shallow multilayer perceptron that is used for classifier modeling. Therefore, two types of loss functions are used at the same time for optimization when the triplet network is trained, and both scene correctness and similarity correctness are ensured. After training is completed, a feature extracted using the CNN may be directly used for human pose recommendation. In addition, a CNN feature needs to be extracted offline from a human pose image in the human pose picture library in advance, to construct a human pose feature library to efficiently perform online matching and recommendation.

(2) Online Module

For online processing, there are two submodules: the CNN feature extraction submodule and the online recommendation submodule. The following separately describes in detail methods of the modules.

CNN Feature Extraction Submodule

In an online stage, the metric learning CNN feature extraction model trained offline is deployed on a mobile device such as a mobile phone. Frames are obtained at a fixed interval from a video stream (in a use scenario of human pose recommendation, a taken picture herein is the video stream, the video stream is used to extract a photographing environmental feature of a current camera, and the feature is used to calculate a similarity for human pose recommendation) captured by a video camera. A frame obtaining manner is directly related to a model running time. It is assumed that a time for extracting a feature by the model is t seconds. In this case, 1/t frames of images can be extracted per second for processing. Then, each frame of picture is input to the CNN feature extraction model to extract a predetermined quantity of dimensions of features of the image. For a feature of a frame of picture, a CNN feature extracted from a current frame of picture may be directly used, or features of several adjacent frames of pictures may be fused. Next, the feature is input to the online recommendation submodule.

Online Recommendation Submodule.

Input of the module is a feature of a preview image, the human pose picture library, and the human pose feature library. A similarity between the feature of the preview image and each feature in the feature library is calculated according to the following formula:

$$S(x, y) = \frac{1}{1 + e^{\|x-y\|_2^2}} \quad (3)$$

Then, ranking is performed based on similarities, to feed back a plurality of most similar pictures in a predetermined preview manner to a user for selection. To accelerate similarity calculation and ranking processes on a device such as a mobile phone, any index manner such as a hash index or a decision tree may be used.

Figure 9B:
FIG. 9B is a schematic diagram of an effect according to an embodiment of this application.

FIG. 9A below is a diagram of a technical effect of Embodiment 1 of the present application. In all rows, the first columns show input pictures in different scenes, and the last three columns respectively show human pose pictures recommended based on the method in the present patent. In addition, an implementation model in this solution may be successfully deployed on a mobile phone to recommend a human pose in real time, and a good effect is obtained through onsite testing. FIG. 9B is an example diagram of using some poses in a system by a user. The first column shows initial pose pictures of the user, the second column shows human pose images recommended using the method, and the third column shows pose pictures obtained after the user adjusts a pose by referring to the recommended pictures. It may be very clearly learned that an aesthetic feeling and a pose feeling of a picture are better after the user poses for photographing based on a recommendation result in the present application.

A major improvement to the conventional technology in this embodiment of the present application is as follows: A multi-level feature of an image is used, beneficial information in human pose recommendation is used in depth, a similarity is defined for human pose recommendation based on the beneficial information, and information fusion and model training are effectively performed through metric learning. Therefore, a lightweight high-accuracy solution is implemented, and the solution can be deployed on a mobile terminal such as a mobile phone for real-time pose recommendation.

Embodiment 2 of the Present Application

Figure 10:
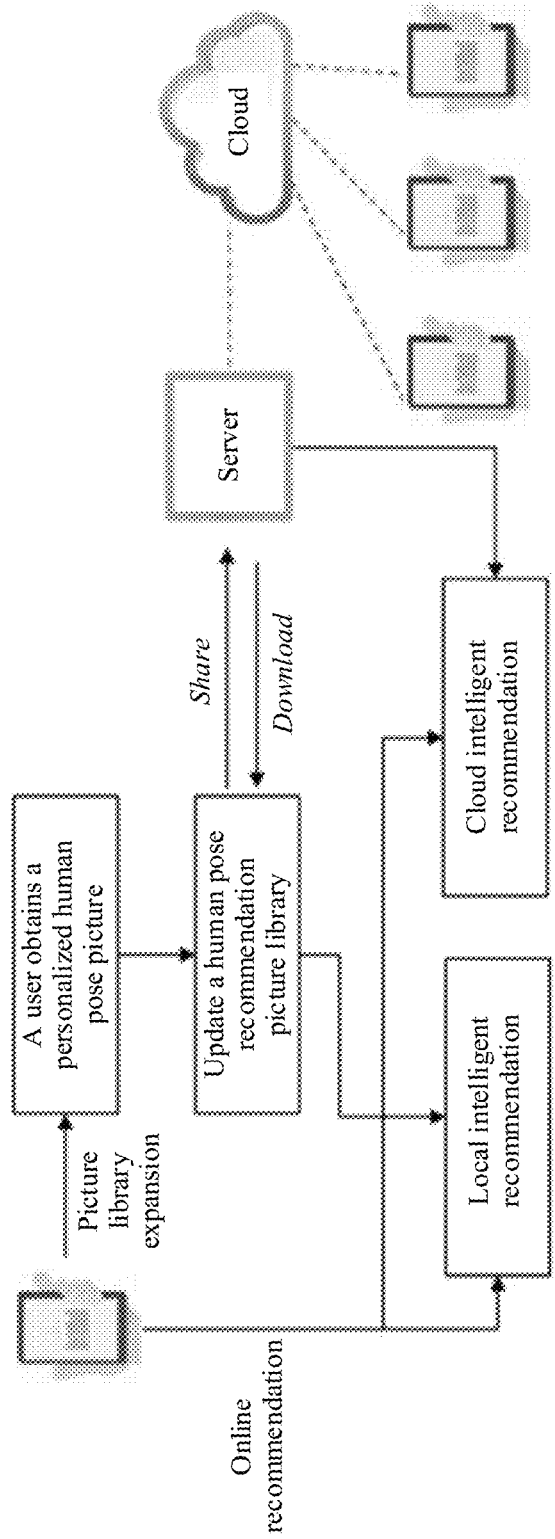
FIG. 10 is a schematic diagram of a method for recommending a human pose picture according to an embodiment of this application.

A method-based recommendation process is described in this embodiment. The method process in Embodiment 2 is shown in FIG. 10. In this embodiment of the present application, an upload mechanism is provided. In an aspect, a user may upload a picture with a personal preference, and add the picture into a local picture library for use by the user in subsequent photographing. The picture may be recommended in a subsequent similar scene. In another aspect, in this embodiment of the present application, an online sharing mechanism is provided for the user, to add a picture into a cloud picture library, and update the human pose recommendation picture library for reference by another person. This further improves user experience. In the two modes, recommended content is automatically updated based on the picture in the picture library, and a pose recommendation service is conveniently provided.

Local intelligent recommendation in this embodiment of the present application is completed on a mobile terminal such as a mobile phone, for example, both image feature extraction logic and online recommendation logic are completed locally. In this case, matching and recommendation are performed only in the local human pose picture library, and a cloud database is not used. In this recommendation scenario, the user does not need to upload any information, such that user privacy is ensured, and recommendation efficiency is high. When the local human pose picture library of the user cannot meet a recommendation requirement, the user may switch to a cloud intelligent recommendation mode.

Optionally, the user may manually perform switching, or may search both the local human pose picture library and the cloud database, or may first search the local human pose picture library and then search the cloud database if no proper picture is found. An algorithm in the present patent may be used to implement all these manners. The user needs to upload data when the user searches the cloud database, and user privacy is involved without knowledge of the user. Therefore, the user may manually switch a recommendation mode.

Image feature extraction in the cloud intelligent recommendation mode is completed locally, then a feature is transmitted to a cloud server, matching and recommendation are performed on a remote server based on the recommendation method in the present application, and then a recommendation result is returned to the user in a predefined preview manner for preview and selection. In this case, the user needs to upload a feature and a return result needs to be transmitted. As a result, recommendation efficiency is affected by network bandwidth. Because the cloud human pose picture library is usually richer than the local picture library, a recommendation result is better.

When the user obtains a personalized human pose picture in a manner, the manner includes but is not limited to the following: The user customizes a human pose picture or collects a human pose picture from an Internet website. The user may share, with the cloud picture library using the sharing mechanism, the personalized human pose picture obtained by the user, to expand the cloud picture library for use and reference by another user. In addition, the user may download a favorite human pose picture to the local picture library from the remote server to expand the local picture library. For a newly added human pose picture, a system directly extracts a feature of the human pose picture automatically based on a metric learning model in the present application, establishes a correspondence between an original picture and a feature (because a human pose similarity is calculated based on a feature vector of each original picture and an original picture with a high similarity is recommended to the user, each original picture corresponds to a predetermined quantity of dimensions of feature vectors, and a similarity of the feature vector directly reflects a similarity of a human poses in the original picture, such that a structure similar to a list (or a dictionary) needs to be established to store an ID of each original picture in the human pose library and the feature vector corresponding to the original picture), and then stores the feature into a human pose feature library and stores the original picture into the human pose picture library. In addition, in this embodiment of the present application, a mechanism for deleting a human pose picture in the local picture library is also provided for the user, and only a corresponding feature and original picture need to be deleted together, to ensure that the picture is not recommended again.

When a quantity of newly added pictures in the cloud picture library reaches a scale, the remote server needs to add, based on the method in the present application, the newly added pictures again into a metric learning training set, and updates the model based on original data and newly added data to further improve robustness and availability of the model. Then, the updated model is deployed on a mobile device of the user again in a system update manner.

FIG. 11A to FIG. 11D show an example in which a user uploads a picture with a personal preference to a local picture library.

Figure 11A:
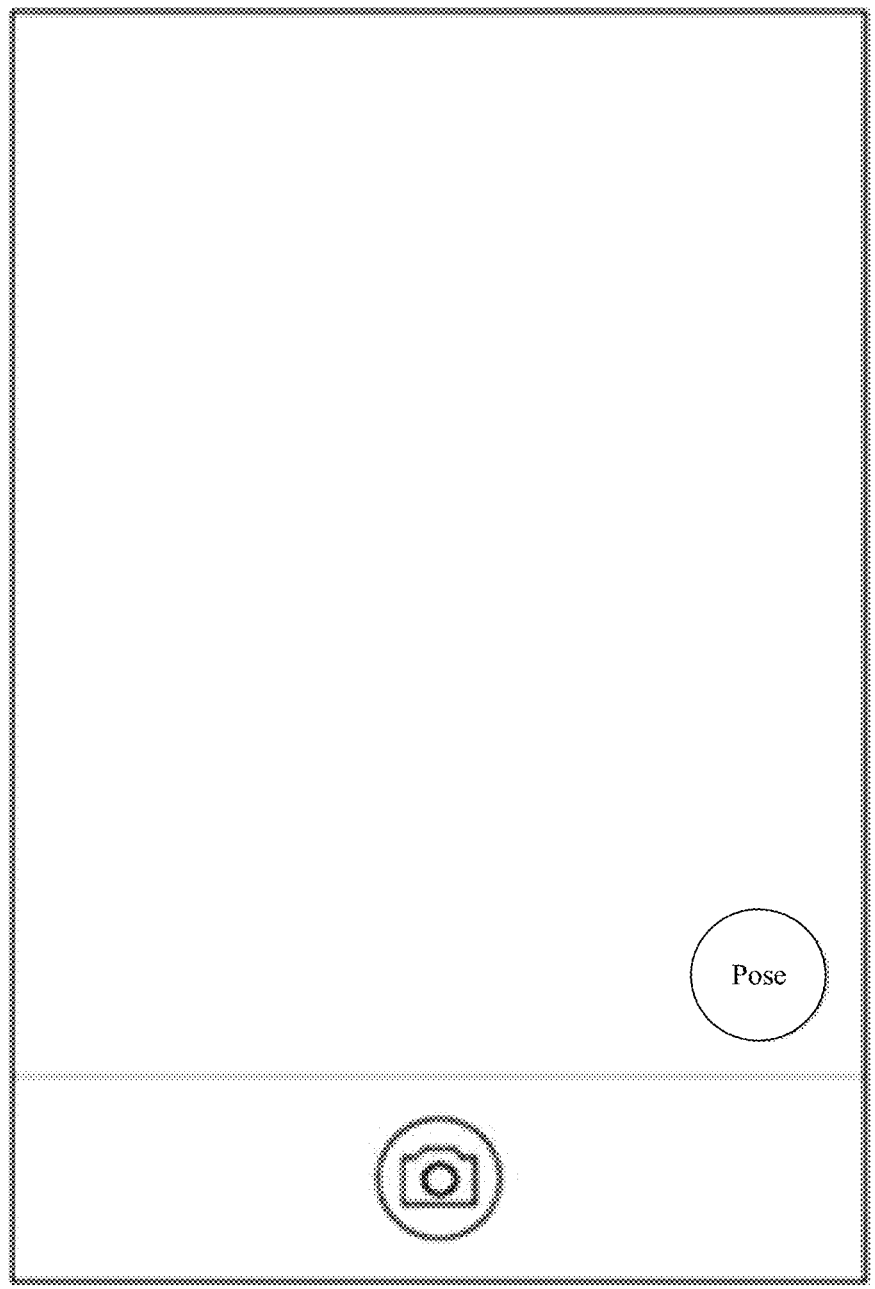
FIG. 11A to FIG. 11D are a schematic diagram of a user interface according to an embodiment of this application.
Figure 11B:
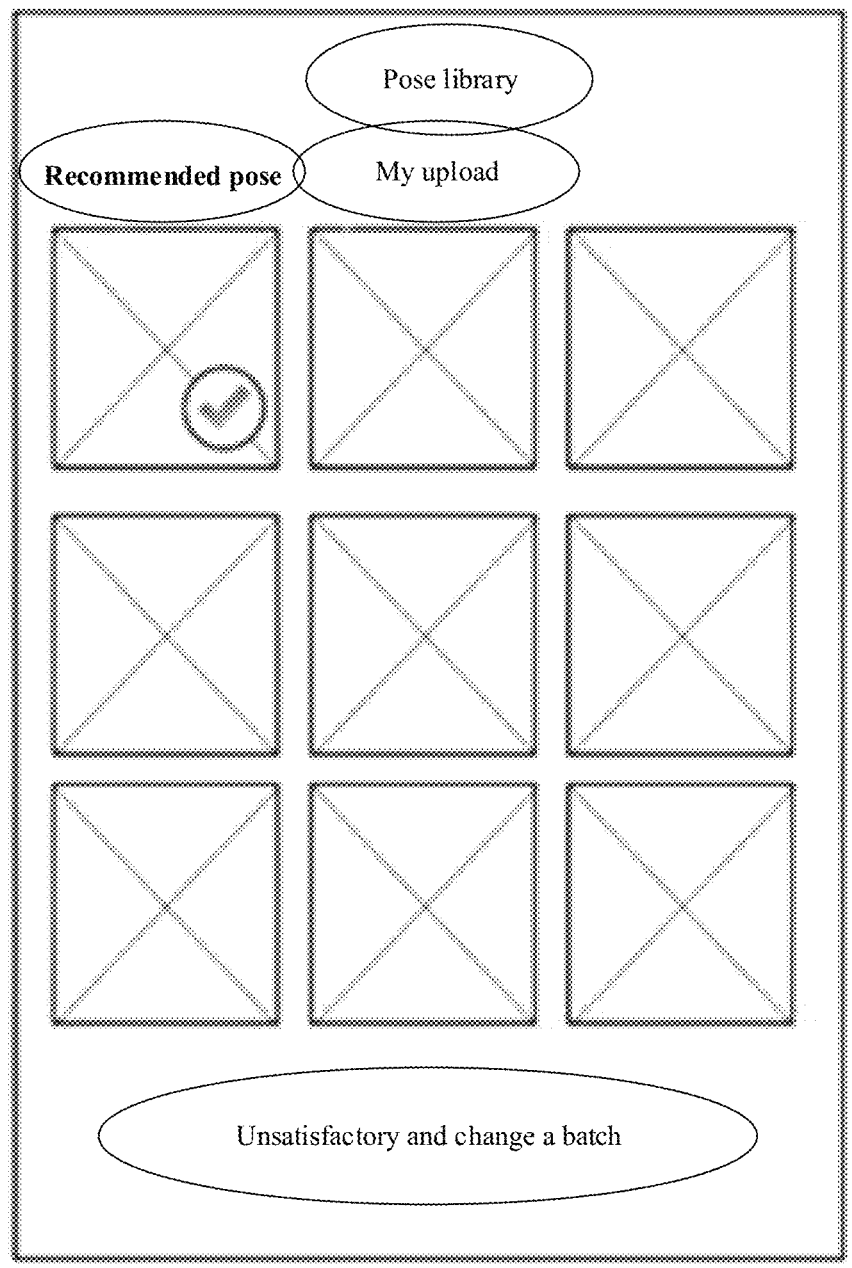
Figure 11C:
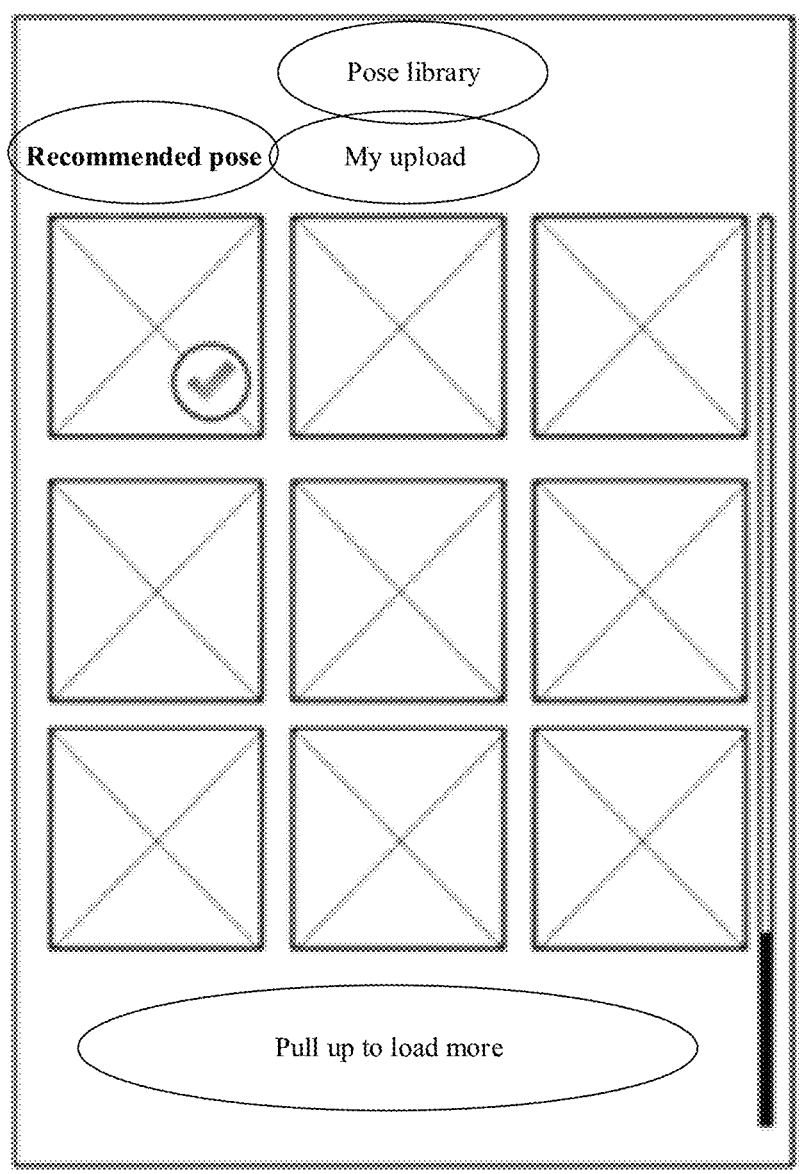
Figure 11D:
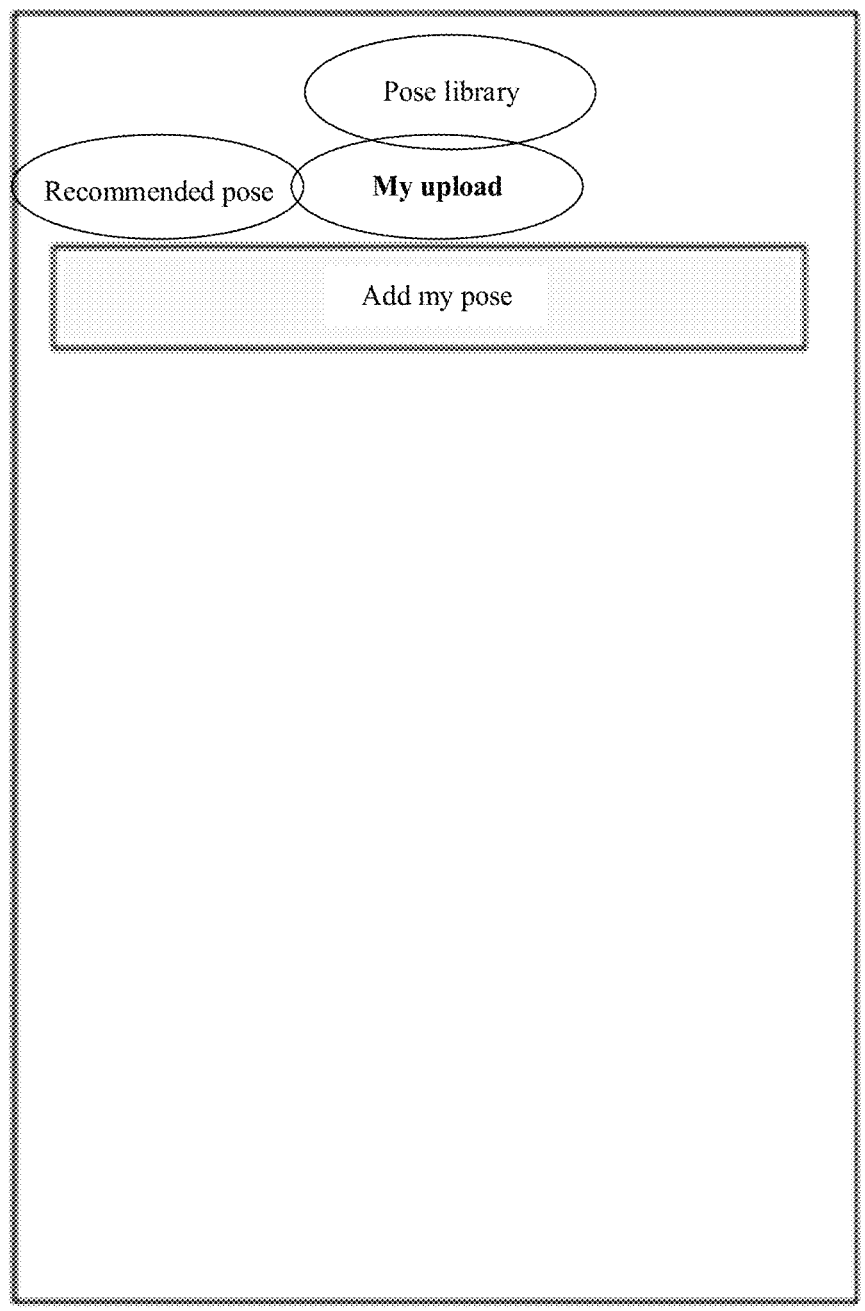

In a photographing interface shown in FIG. 11A, the user taps a pose recommendation icon (shown by a "pose" icon in FIG. 11A to FIG. 11D) in the photographing interface to enter a pose recommendation interface (FIG. 11B, FIG. 11C, and FIG. 11D). A preset quantity (nine pictures are shown in the following figure) of recommended pose pictures are displayed in the interface (FIG. 11B) by default. A most preferred pose picture ranks first, and is marked with a "selected" mark by default (the first recommended picture with a "check" mark shown in FIG. 11B/FIG. 11C). If no currently recommended picture is satisfactory to the user, a manner shown in FIG. 11B may be used to change a batch of pictures or a manner shown in FIG. 11C may be used to load more pictures through pulling up, to present more recommended pictures to the user. The user may tap a picture upload icon (shown by an "add my pose" icon in the following FIG. 11D) to select, as a picture in the pose library, a picture from a picture library on a mobile phone.

Figure 12B:
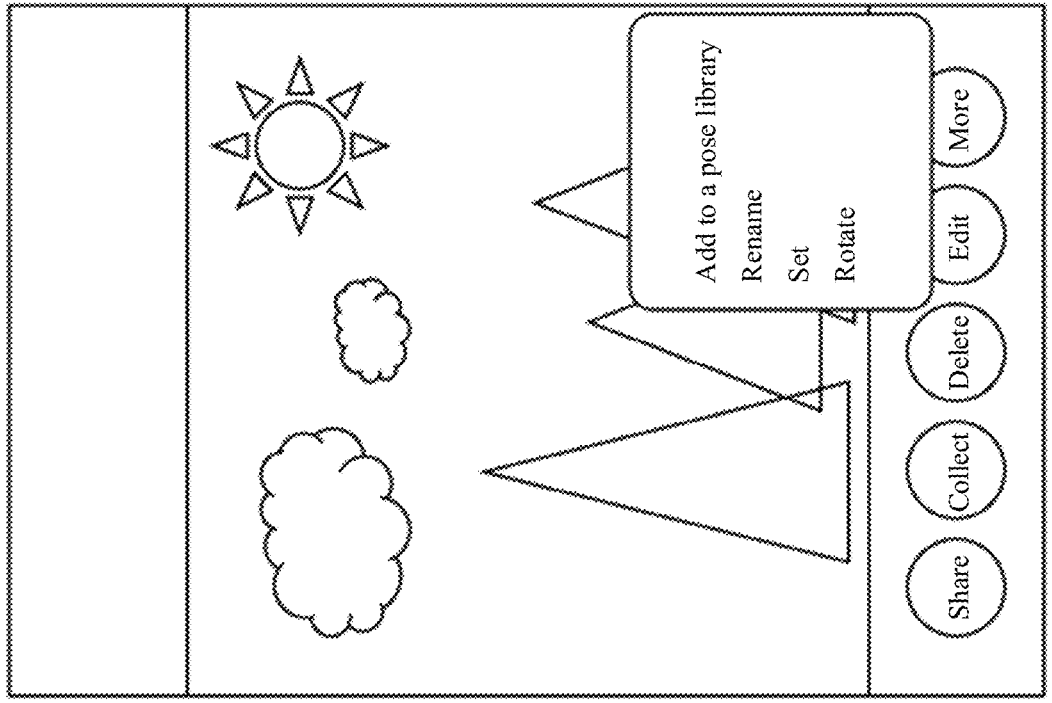
FIG. 12A and FIG. 12B are a schematic diagram of a user interface according to an embodiment of this application.
Figure 12A:
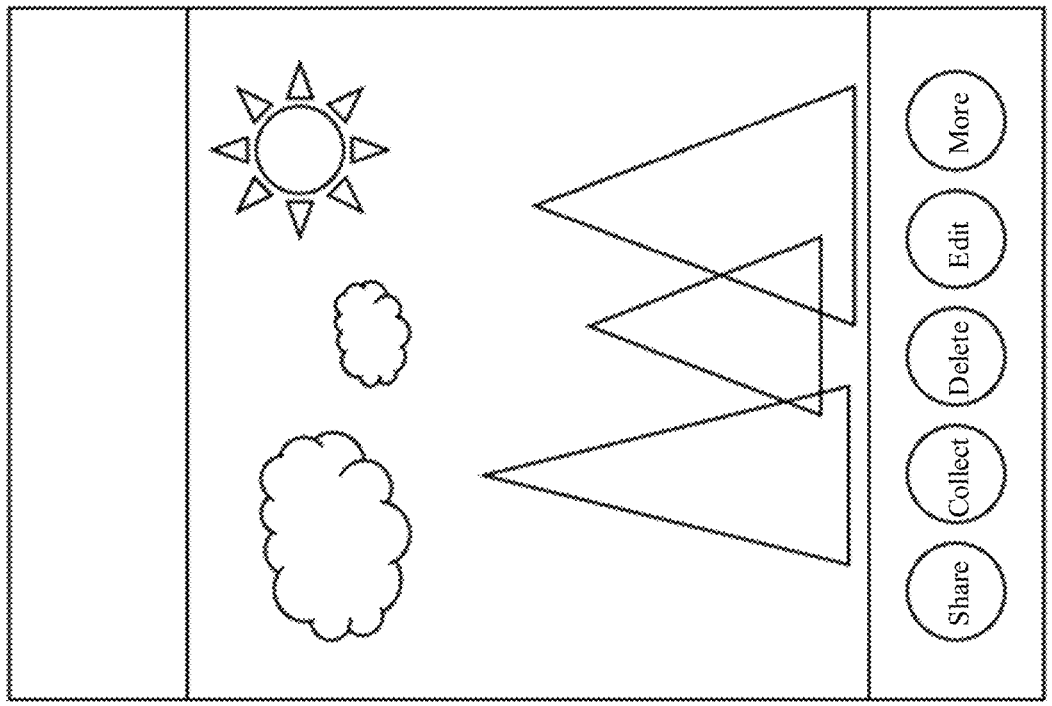

FIG. 12A and FIG. 12B show another example in which a user uploads a picture with a personal preference to a local picture library.

As shown in FIG. 12 a and FIG. 12B, in a picture detail view interface (in the following figure a) of a picture library on a mobile phone, a function menu is selected (for example, an "add to a pose library" menu item shown in figure b is tapped), such that a currently displayed picture can be added to the pose library.

In Embodiment 2, the recommendation method in the present application is combined with the recommendation process in an application scenario, to provide the upload mechanism and the sharing mechanism. In Embodiment 2, the user is supported to customize the recommendation picture library. In addition, the user may upload a customized human pose picture using the sharing mechanism, to continuously update and expand the local picture library and the cloud picture library. The model running on the mobile device is also continuously optimized, thereby further improving recommendation accuracy and system availability. In addition, a combination of local intelligent recommendation and cloud intelligent recommendation also ensures user privacy and recommendation efficiency, and improves system practicality.

Embodiment 2 of the present application has, for example, one or more of the following beneficial effects.

(1) The combination of local intelligent recommendation on the mobile device and cloud intelligent recommendation is supported.

In this embodiment, local intelligent recommendation may be independently performed on the mobile device of the user, and intelligent recommendation may also be performed by connecting to the cloud server, such that both user privacy and a recommendation effect are ensured.

(2) Update and expansion manners of the local picture library and the cloud picture library are provided, and a recommendation model is further optimized based on newly added data.

The local picture library may be updated in real time based on a user-defined human pose picture obtained by the user, and a personalized picture may be uploaded to the cloud picture library using the sharing mechanism for reference and use by another user. The metric learning model is optimized online based on the added data to improve availability of the entire system and user experience.

Embodiment 3 of the Present Application

Figure 13:
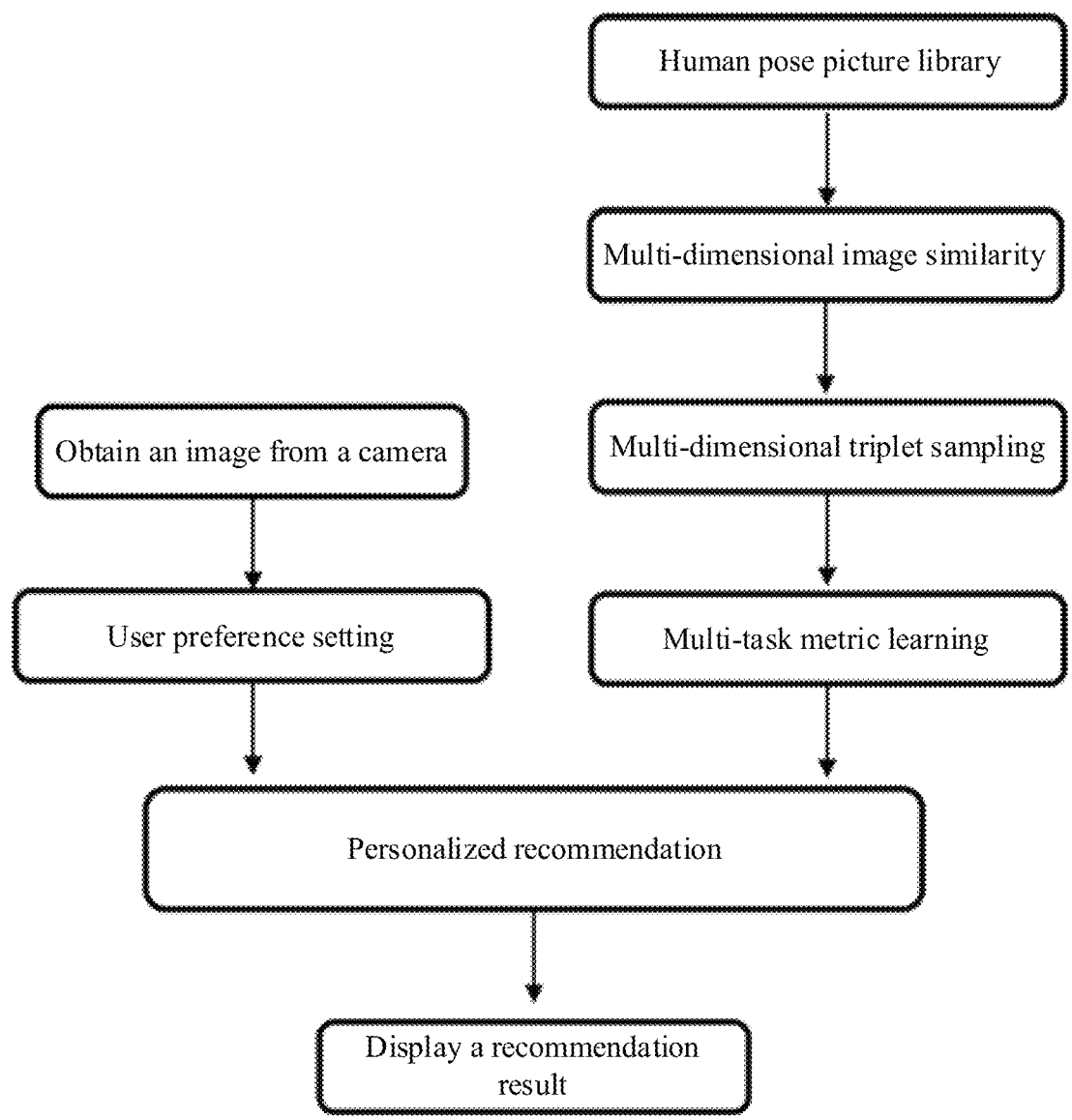
FIG. 13 is a flowchart of a method for recommending a human pose picture according to an embodiment of this application.

A user personalized recommendation process based on the method in the present application is described in this embodiment. The method process in Embodiment 3 is shown in FIG. 13. A user personalized recommendation function is provided in the present application, such that a human pose picture can be recommended based on a user preference. For example, user preference options are predefined in a current system, for example, clothing, a figure, a skin color, an appearance and temperament of a photographed person, or a prop used by a photographing pose. During human pose recommendation, a user may select a preference option, and then recommendation is performed based on the preference option selected by the user. During actual use, the user may choose to enable or disable the personalized recommendation function. When the function is enabled, a user selection interface is provided to set a recommendation preference for recommendation. When the function is disabled, a recommendation preference selected by the user does not affect a human pose recommendation result.

During implementation, a personalized setting provided for the user for selection includes a subject attribute of a photographed person and a photographing prop. The subject attribute includes clothing, a figure, a skin color, an appearance and temperament, and the like. The photographing prop includes a backpack, sunglasses, flowers, a chair, and the like. The user preference option in the present application needs to be defined in advance, and then deployed on a remote server and a mobile device such as a mobile phone. Optionally, the personalized setting is the preference setting described in the previous paragraph.

Optionally, deployment herein actually means directly placing a CNN feature extraction model on each of the mobile phone and the server for running. On the mobile phone and the server, models are the same, recommendation algorithms are the same, and only human pose recommendation picture libraries are different, where a picture library on the server is larger. When the model is deployed on a mobile device such as a mobile phone for personalized recommendation, the user enables a personalized recommendation mode, and selects a predefined preference option in the present application based on a personalized preference selection interface. Then, recommendation is separately performed using different features based on a user preference. If the user chooses recommendation of a human pose image with more similar clothing, an image feature may be directly extracted using a CNN+h1 network, then a similarity between the feature and a corresponding feature in the picture library is calculated, and a result is fed back to the user after ranking. When the user does not select a preference, recommendation is directly performed based on an overall similarity obtained by fusing various dimensions of features.

A multi-task metric learning solution is used for a background algorithm in this embodiment. The solution in this embodiment includes three steps: multi-dimensional image similarity obtaining, multi-task metric learning training, and personalized online recommendation.

The first two steps are offline processing, and may be processed on any server that meets a calculation requirement. The last step needs to be run online on a mobile device such as a mobile phone.

A process is shown in FIG. 13. In an offline stage, in this embodiment, first, a multi-dimensional similarity between images in a human pose picture library is calculated. Next, triplet training data is sampled based on each similarity, to train a multi-task metric learning model. Finally, the model is deployed on a mobile device such as a mobile phone or is placed on a server for dynamic download.

During online recommendation, personalized recommendation is performed based on a preview image obtained by a camera and a preference option that is set by the user, and a recommendation result is finally fed back to the user for selection.

Figure 14:
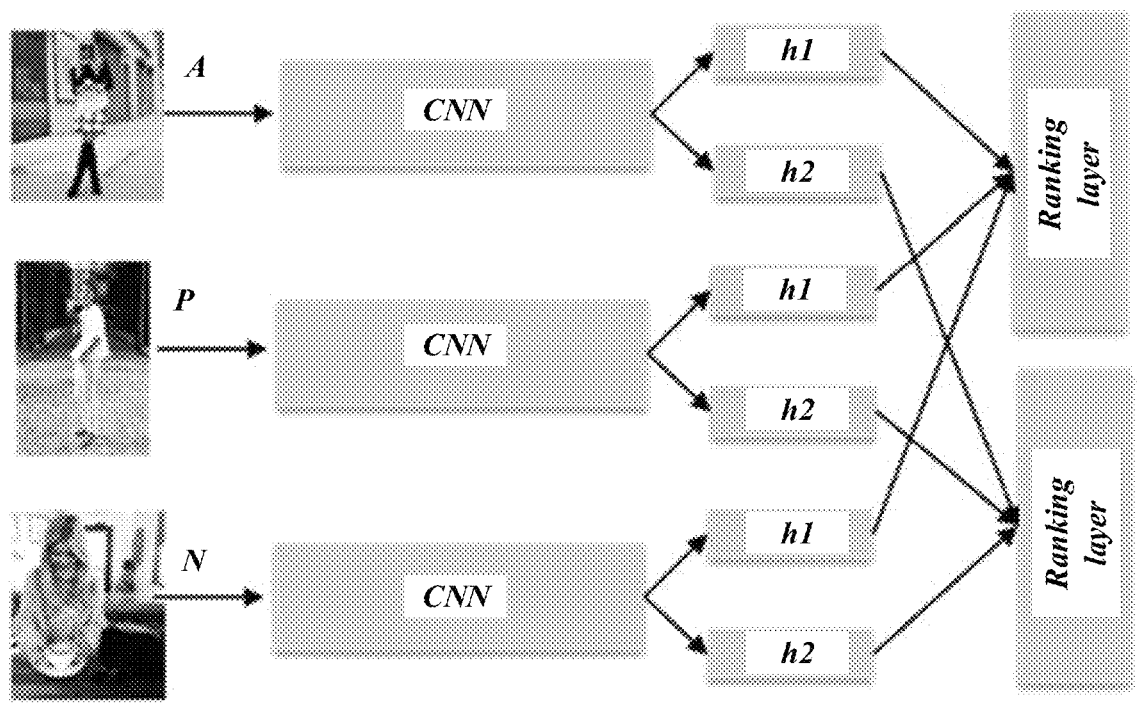
FIG. 14 is a schematic diagram of a network structure of multi-task metric learning according to an embodiment of this application.

In this embodiment, the multi-dimensional image similarity includes a subject similarity such as clothing, a figure, a skin color, and an appearance and temperament of a photographed person, and also includes an object spatial layout similarity and a scene similarity such as a prop used by a photographing pose. These similarities may be obtained using a plurality of methods. The subject similarity such as clothing of the photographed person may be obtained using a method such as human attribute recognition, the object spatial layout similarity may be obtained using a method such as scene parsing, and the scene similarity may be obtained using a method such as scene classification. During implementation, only one of the similarities or all of the similarities may be used for recommendation. After the multi-dimensional similarity between the images in the human pose library is obtained, samples of a large quantity of triplet training samples are sampled for each dimension of similarity. For example, any picture and a picture library are first specified. Then, ranking is performed based on a dimension of similarity. Finally, the first K top-ranked candidate similar images are selected as similar pictures of the input picture, and the remaining pictures are all considered as dissimilar pictures. Therefore, a large quantity of triplet samples <A, P, N> are generated. Each triplet includes three human pose images. A is a human pose image in the pose library, P is a picture that is similar to A in a dimension of similarity and is referred to as a positive sample, and N is a picture that is not similar to A in a dimension of similarity and is referred to as a negative sample. It is assumed that two dimensions of similarities such as the subject attribute similarity and the object spatial layout similarity are used as an example. In this case, a network structure of multi-task metric learning is shown in FIG. 14.

The network structure includes two modules. A first module is a CNN used to extract a feature shared between images. A second part includes different head networks h1 and h2. The two head networks are convolutional neural networks having a same structure but different parameters, and are used to separately extract a subject attribute feature of a photographed person and an object spatial distribution feature. Each dimension of feature is input to a triplet rank loss function layer in a triplet combination manner, and a rank loss function is as follows:

$$L_{rank}=\Sigma_i^M[\|f(A)-f(P)\|_2^2-\|f(A)-f(N)\|_2^2+\alpha] \quad (4),$$

where α is a parameter and is used to define an optimization distance between a positive sample P and a negative sample N, and M is a quantity of triplet samples. The network is trained in an alternate asynchronous update manner. First, triplet data in a subject attribute dimension is input, a parameter of CNN+h1 is updated, and a parameter of h2 remains unchanged. During next iteration, triplet data in an object spatial distribution dimension is input, a parameter of CNN+h2 is updated, and a parameter of h1 remains unchanged. In this manner, cyclic iteration is performed until the model converges. Finally, CNN+h1+h2 is deployed on a mobile device. When an image is input, a feature in the subject attribute dimension may be extracted using the CNN+h1 network, and a feature in the object spatial distribution dimension may be extracted using the CNN+h2 network.

When the model is deployed on the mobile device such as a mobile phone for personalized recommendation, the user enables the personalized recommendation mode, and selects the predefined preference option in the present application based on the personalized preference selection interface. Then, recommendation is separately performed using different features based on the user preference. If the user chooses recommendation of the human pose image with more similar clothing, the image feature may be directly extracted using the CNN+h1 network, then the similarity between the feature and the corresponding feature in the picture library is calculated, and the result is fed back to the user after ranking. When the user does not select the preference, recommendation is directly performed based on the overall similarity obtained by fusing various dimensions of features.

An interface shown in FIG. 15A to FIG. 15D is used as an example for description.

Figure 15A:
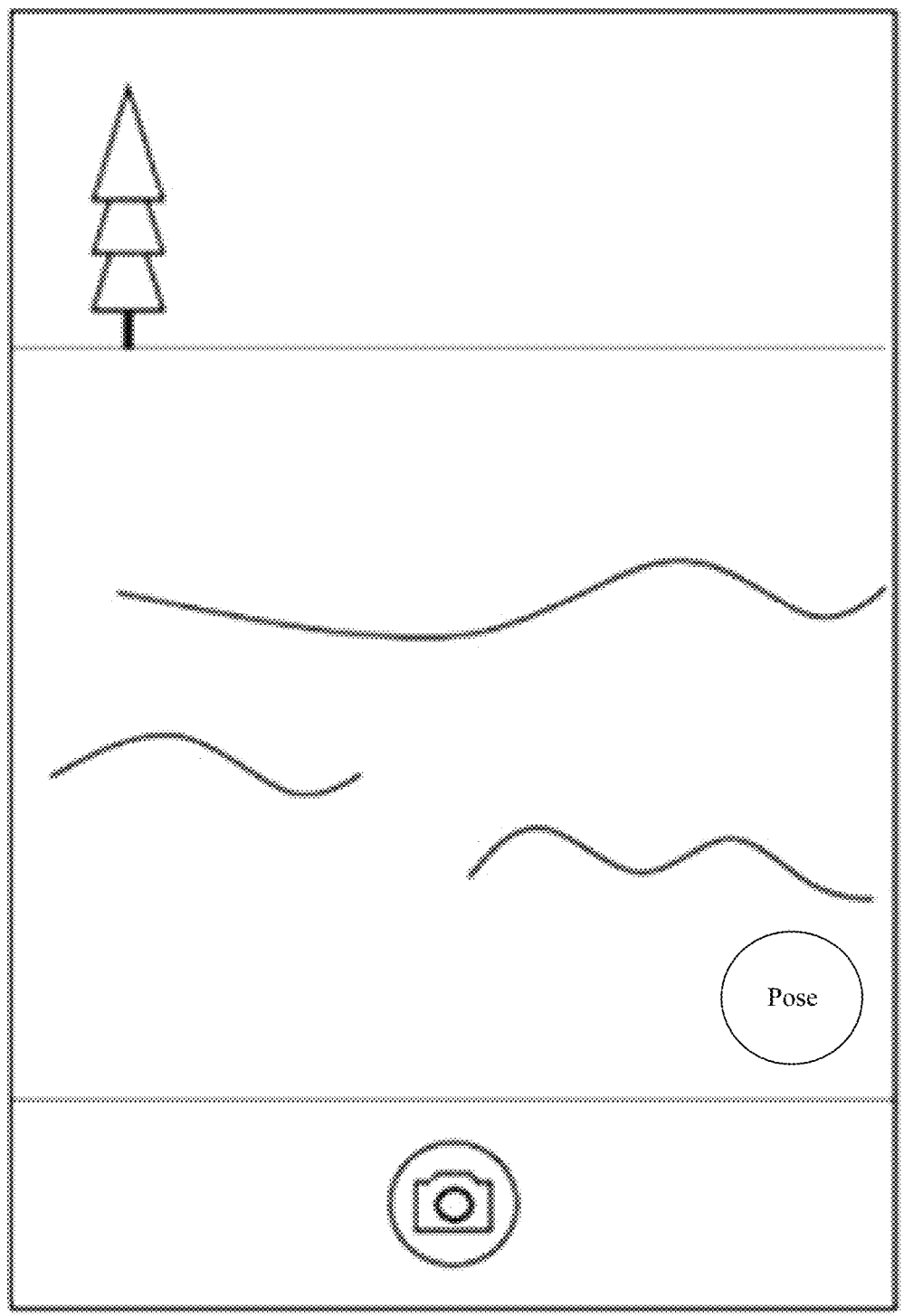
FIG. 15A to FIG. 15D are a schematic diagram of a user interface according to an embodiment of this application.
Figure 15B:
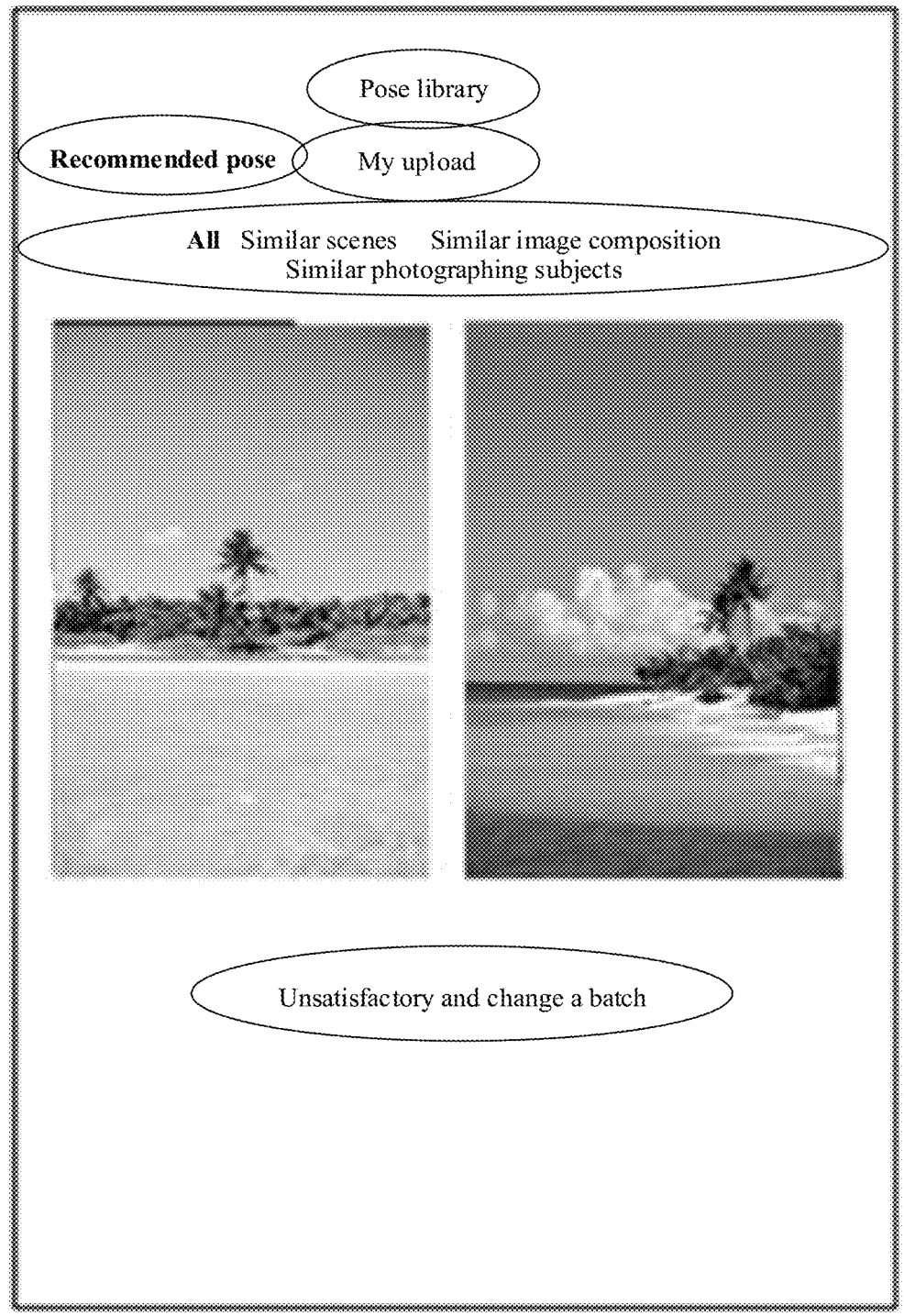
Figure 15C:
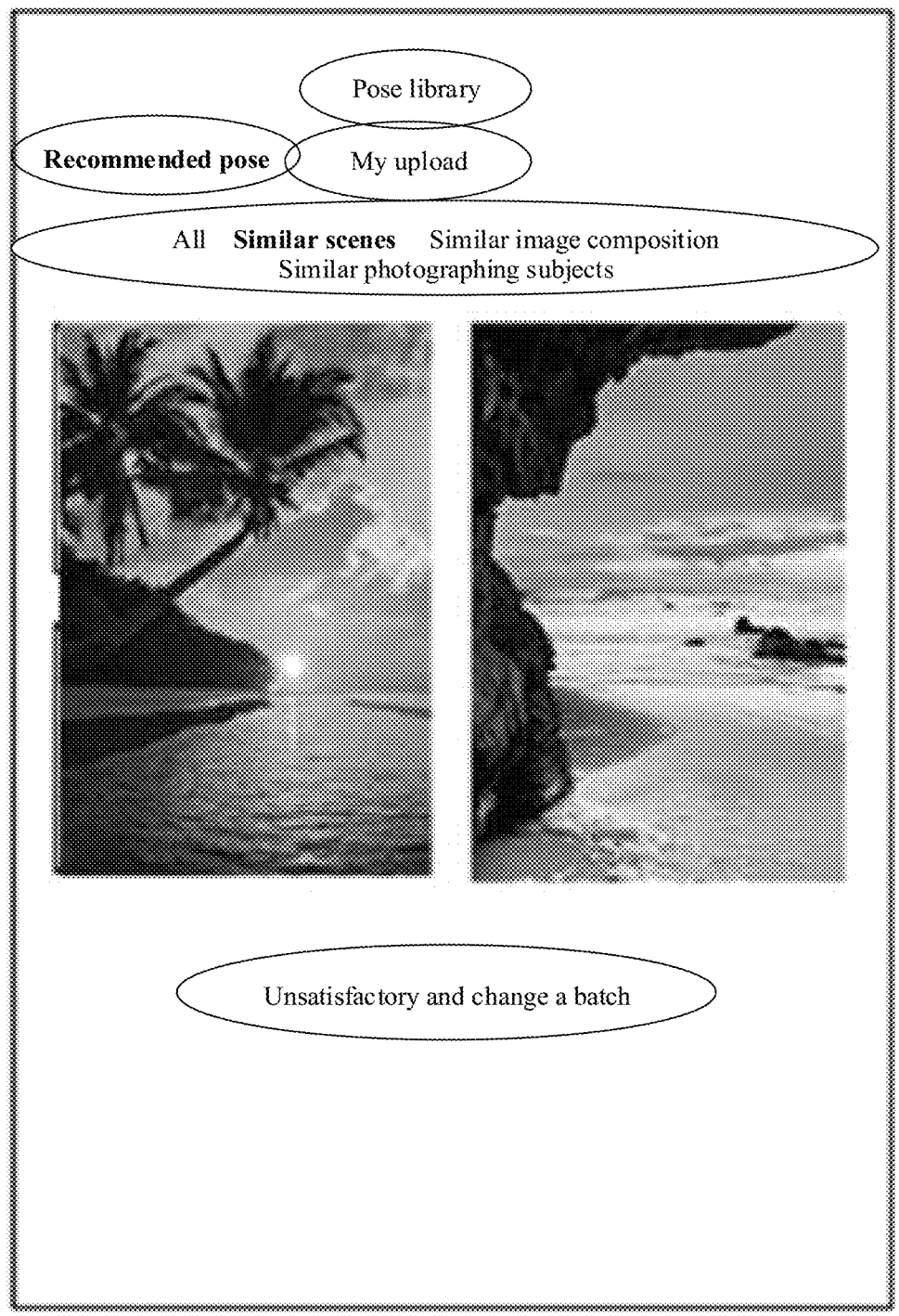
Figure 15D:
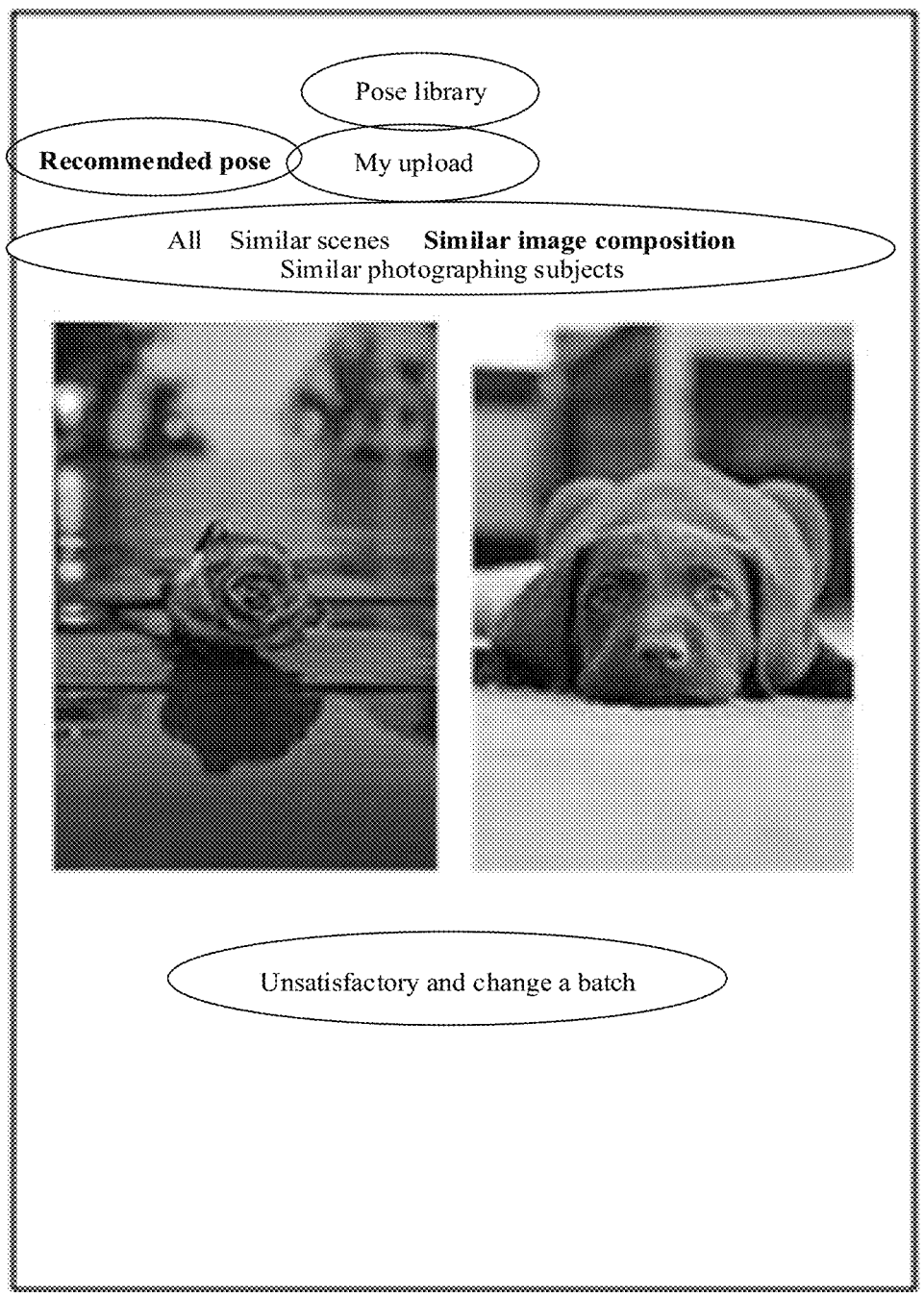

A scene in a current viewfinder frame is seawater, and there is a tree nearby. A picture is basically obtained through dichotomous image composition. After a user selects a pose recommendation function, a preference selection option is displayed in an interface (shown by "all", "similar scenes", "similar image composition", and "similar photographing subjects" in the following figure). The user may choose overall-similarity-based recommendation performed based on the foregoing three dimensions (FIG. 15B), or recommendation performed based on any one or two of the foregoing three dimensions. For example, if the user selects "similar scenes", recommend pictures mainly include similar scenes such as a beach and seawater (FIG. 15C). For another example, if the user selects "similar image composition", recommended pictures are mainly obtained through dichotomous image composition.

In Embodiment 3, the recommendation method in this embodiment of the present application is combined with personalized recommendation in an actual application scenario. In Embodiment 3, personalized recommendation of the user is supported. When the user enables the personalized recommendation function, a personalized setting interface is provided for the user in the present application. The user may set a user preference option based on a current environment. Then, a human pose picture actually required by the user is recommended based on the personalized setting of the user. This further improves user experience. In this embodiment, personalized setting may be performed on the mobile device of the user based on a user requirement, including clothing, a figure, a skin color, an appearance and temperament, and the like of a photographed person, or a prop used by a photographing pose. Then, the human pose picture required by the user is recommended based on the personalized setting of the user. This further ensures system robustness and user friendliness.

Embodiment 4 of the Present Application

A solution that is based on the method in the present application and that supports automatic detection and filtering of an attribute of a photographing object is described in this embodiment. A method process in Embodiment 4 is shown in FIG. 13. When a user takes a picture that includes a photographing object and recommendation is required, in this embodiment, a subject attribute of the photographing object and a photographing auxiliary prop may be directly detected and displayed to the user for selection, and recommendation results are screened and filtered based on the selection of the user, to return a human pose image that better meets a requirement of the user and that is more similar to an appearance and temperament of the photographing object.

Figure 16:
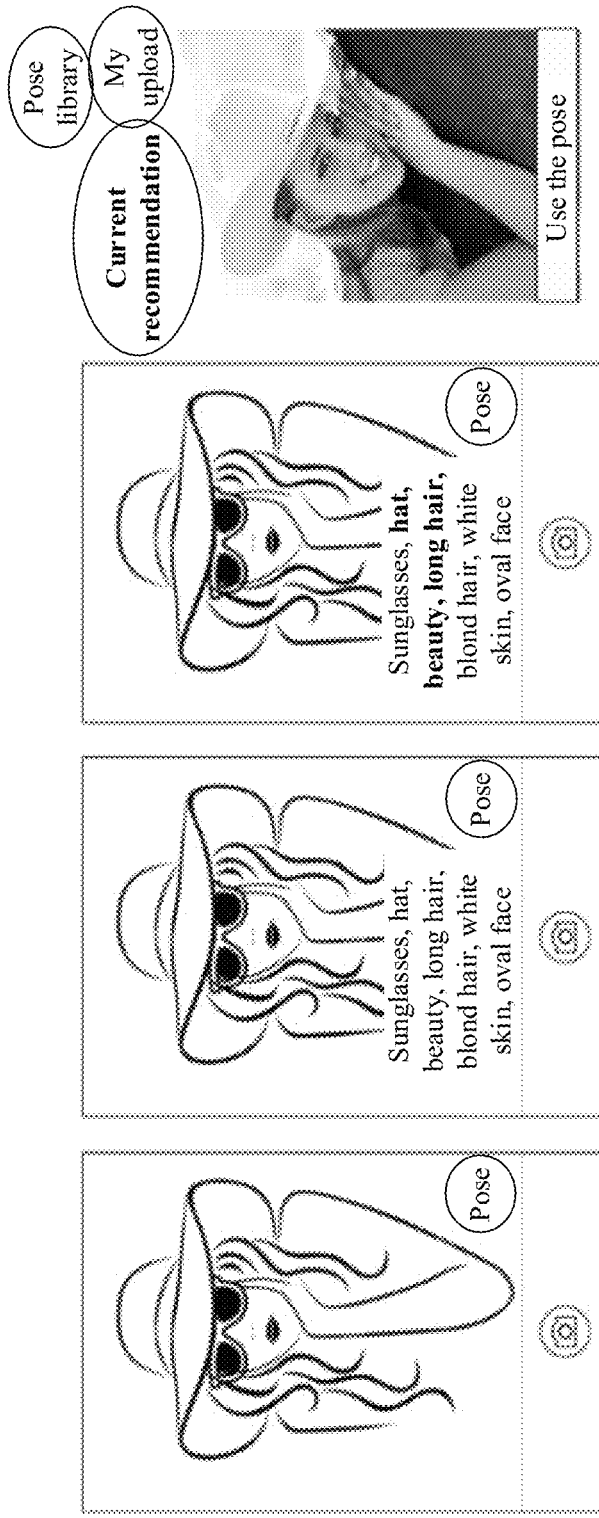
FIG. 16 is a schematic diagram of a user interface according to an embodiment of this application.

For example, a mobile phone of the user currently displays a photographing function interface (figure a in FIG. 16). In the figure, a long hair woman wearing a hat and sunglasses is a photographed object in a current viewfinder frame. A scene in the current viewfinder frame is used as a preview photo for recommendation. A system analyzes a feature of the preview photo, and the feature includes a human attribute label such as a gender (female), a quantity of persons (single), a hairstyle (long hair and blond hair), and a facial shape (an oval face), and a photographing prop label such as sunglasses and a hat. The system displays the analyzed feature labels in the photographing function interface (a preference selection interface shown in figure b in FIG. 16). The user performs a preset gesture (for example, flicks a "pose" icon leftward) to display these labels ("sunglasses, hat, beauty, long hair, blond hair, white skin, and oval face" in figure b). The system receives a recommendation preference option of the user. If the user taps three labels "hat, beauty, and long hair" (as shown in figure c), the system determines a pose library screening condition based on the preference selected by the user.

A meaning of the recommendation preference option of the user is as follows: Because the feature that is of the preview photo and that is analyzed by the system may be excessively limited or does not meet a preference of the user, for example, because the photographed object currently wears the sunglasses, no proper photo is found. However, the user considers that the hat is a largest feature of the photographed object, and whether there are sunglasses does not matter. In this case, a recommended photo found based on the preference option shown in FIG. 16 may be a picture without sunglasses, but meets the label "a long hair beauty wearing a hat" (as shown in figure d). If the user likes the recommended photo, the user confirms use of the photo (for example, confirms use of the photo using a "use the pose" icon shown in figure d).

In this embodiment, the user may obtain a human pose picture through screening and filtering based on the personalized label that is of the photographing object and that is analyzed by the system. In actual use, the user may choose to enable or disable the function. When the function is enabled, after it is detected, using a background algorithm, that a photographing object appears in a preview picture or after a photographer confirms a target, a human attribute detection method may be used to detect a subject attribute of the photographing object, and the attribute includes but is not limited to a gender, an age, a height, a quantity of persons, a body shape, a skin color, a hairstyle, a hair color, clothing, and a prop.

A label category in this embodiment of the present application may be defined in advance, and then deployed on a remote server or a mobile device such as a mobile phone.

Personalized label obtaining includes two aspects: obtaining a personalized label of an image in the human pose picture library and obtaining a personalized label of a preview picture.

The personalized label of the image in the human pose picture library may be automatically obtained at a remote server end based on a method such as human attribute recognition, scene parsing, object detection, and character relationship recognition, or may be implemented on a mobile device such as a mobile phone using a lightweight network.

For obtaining of the personalized label of the preview picture, the picture may be uploaded to a server for processing or the picture is directly processed locally.

A large quantity of computing resources may be consumed when a local system analyzes the feature of the preview photo. Therefore, in another alternative implementation, each label in a preference selection interface (FIG. 17B and FIG. 17C) is preset, and same labels are displayed for all pictures. The labels include a subject attribute such as clothing, a figure, a skin color, and an appearance and temperament, and a photographing prop including a hat, a scarf, a backpack, sunglasses, and the like. In this example, as shown in figure g, the user selects some labels that include a quantity of persons (single), a gender (woman), an age (adult), a body type (moderate), a skin color (white), a hairstyle (long hair), a hair color (blond), a season (summer), a prop (hat), and the like. In this case, the system performs recommendation based on these labels selected by the user.

After the personalized labels of the preview image and the human pose picture library are obtained, a filtering mechanism and a re-ranking mechanism are provided in this embodiment to optimize a recommendation result. First, recommendation is performed for the preview picture based on a metric learning model, to obtain initial results. Then, the initial human pose recommendation results are filtered and re-ranked based on a similarity between these labels, to return a human pose picture that is very similar to a current environment and that meets a personalized requirement of the user. It is assumed that the personalized labels of the preview image and the image in the picture library are respectively $A=\{O_A^1, O_A^2, O_A^3, \ldots, O_A^N\}$ and $B=\{O_B^1, O_B^2, O_B^3, \ldots, O_B^M\}$, where $O_A^i, O_B^j \in R^D$, and $R^D$ is a label table. In this case, a personalized label similarity is defined as a formula (4):

$$Sim_f = \frac{|A \cap B|}{|A \cup B| + \epsilon} \tag{4}$$

During implementation, for the preview image, first, a similarity $Sim_b$ is calculated based on an image feature extracted based on the metric learning method in this embodiment of the present application, to perform initial human pose recommendation, and the first K human pose images are used as a candidate subset for personalized recommendation. Then, a similarity $Sim_f$ between a personalized label that is currently set by the user and a personalized label of an image in the subset is calculated, and the K candidate pictures are re-ranked by fusing the two similarities. A fusion method is shown by a formula (5):

$$Sim = \alpha \cdot Sim_f + (1-\alpha) \cdot Sim_b \qquad (5)$$

Based on the foregoing overall similarity, a human pose image with a high similarity is returned to the user for selection.

In Embodiment 4, a solution for automatically obtaining the personalized label of the photographing object and a solution for performing recommendation based on the personalized label are provided. When the photographing object appears in the preview picture, the system automatically obtains the subject attribute of the photographing object or the photographing auxiliary prop through analysis, then displays the subject attribute or the photographing auxiliary prop to the user for screening, and then invokes the filtering and re-ranking mechanisms based on the personalized label selected by the user, to perform human pose recommendation. In this embodiment, more accurate personalized recommendation may be performed based on a specific attribute of the photographing object. This improves a recommendation result and system operability.

In Embodiment 4, the specific attribute of the photographing object and the photographing prop may be automatically analyzed, including a gender, an age, a height, a quantity of persons, a body shape, a skin color, a hairstyle, a hair color, clothing, a prop, and the like. In addition, specific personalized label options are provided for the user for filtering and re-ranking. The filtering and re-ranking mechanisms ensure that a precise personalized requirement of the user is met, and further ensure system robustness and user friendliness.

Embodiment 5 of the Present Application

A solution for recommending a human pose based on a plurality of preview pictures is described in this embodiment. This embodiment is characterized by a step of "obtaining an image using a camera", and a plurality of images are obtained. A scenario considered in this embodiment is as follows: Because image composition is a very important factor for photographing, if a user has poor photographing skills, and an angle selected by the user is not proper, a good photo may not be recommended. Therefore, when the user has a photographing requirement at a specified place, there may be different framing manners at a plurality of angles in a current environment, and there may be a plurality of different photographing solutions.

In this embodiment, a recommendation mode in which the user selects a plurality of angles is provided. To be more specific, the user needs to move the camera (a mobile phone) (for example, a photographer rotates the camera by 180 degrees) to obtain preview pictures at different angles. These pictures often have a same scene, but have different backgrounds and different object spatial distribution. Therefore, different recommendation results are generated. In this embodiment, an optimal photographing angle at the current place can be effectively found, and a human pose picture at an optimal angle can be also recommended.

During implementation, first, frames are obtained at a fixed interval based on a video stream obtained in the process in which the user moves the mobile phone, to obtain N preview pictures $\{I_1, I_2, I_3, \ldots, I_N\}$ at different angles. Then, recommendation is separately performed for the N preview pictures, to generate N recommendation result lists. Each recommendation result list includes at least one recommended picture. In this case, at least N recommended pictures are generated, and respectively correspond to preview pictures at different angles. Next, at least one picture is recommended to the user by ranking the N recommendation results. The ranking basis may be a plurality of features. For example, ranking may be performed based on an overall aesthetic score of the recommended picture, or ranking may be performed based on an overall similarity between scenes, object spatial distribution, foreground human attributes of the recommended picture and the preview picture. When the user does not select a human pose picture at a current recommendation angle, this function is used to provide a drop-down or change button for the user to select a human pose picture at another photographing angle.

An example of an implementation shown in FIG. 18A to FIG. 18D is described as follows.

Figure 18A:
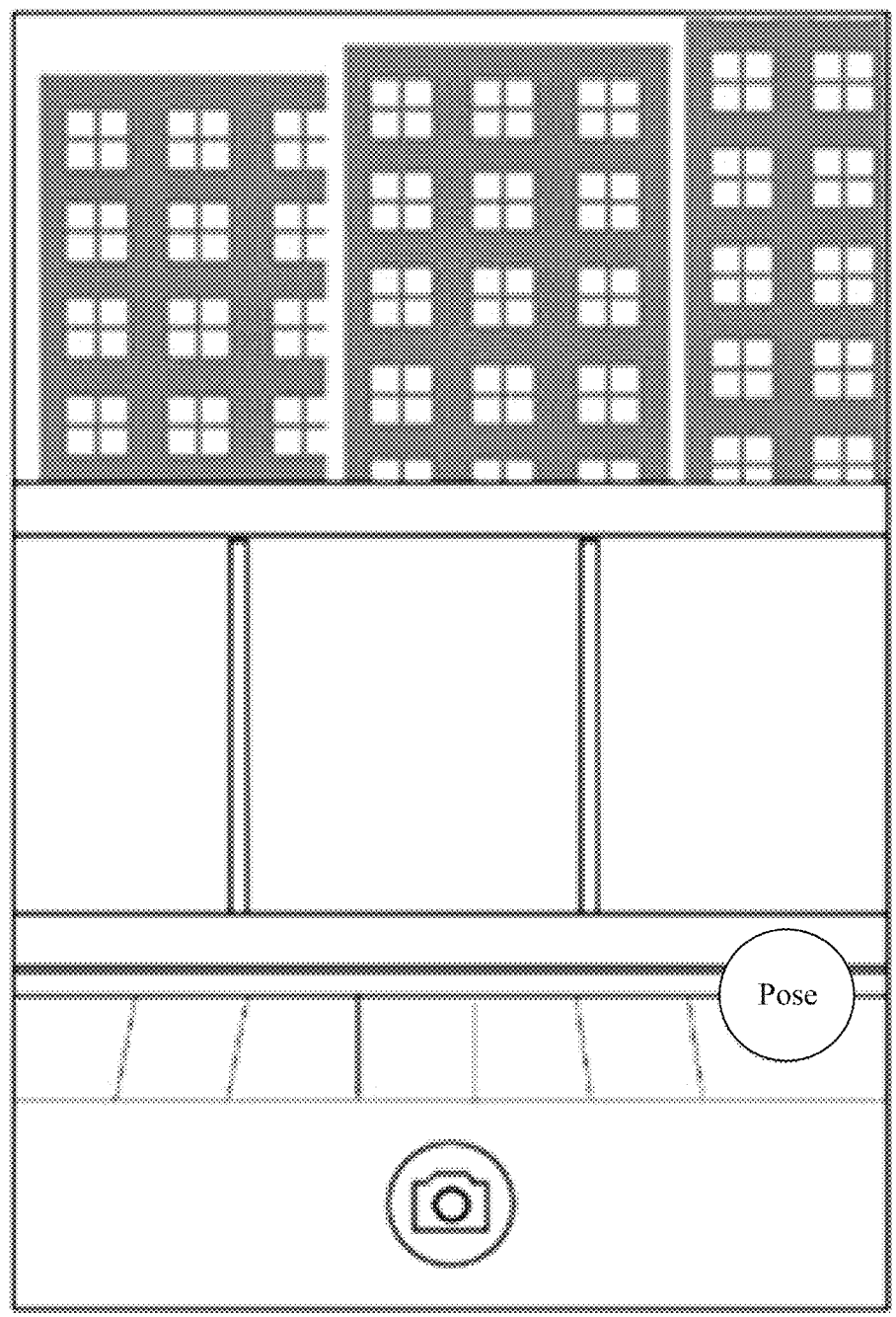
FIG. 18A to FIG. 18D are a schematic diagram of a user interface according to an embodiment of this application.
Figure 18B:
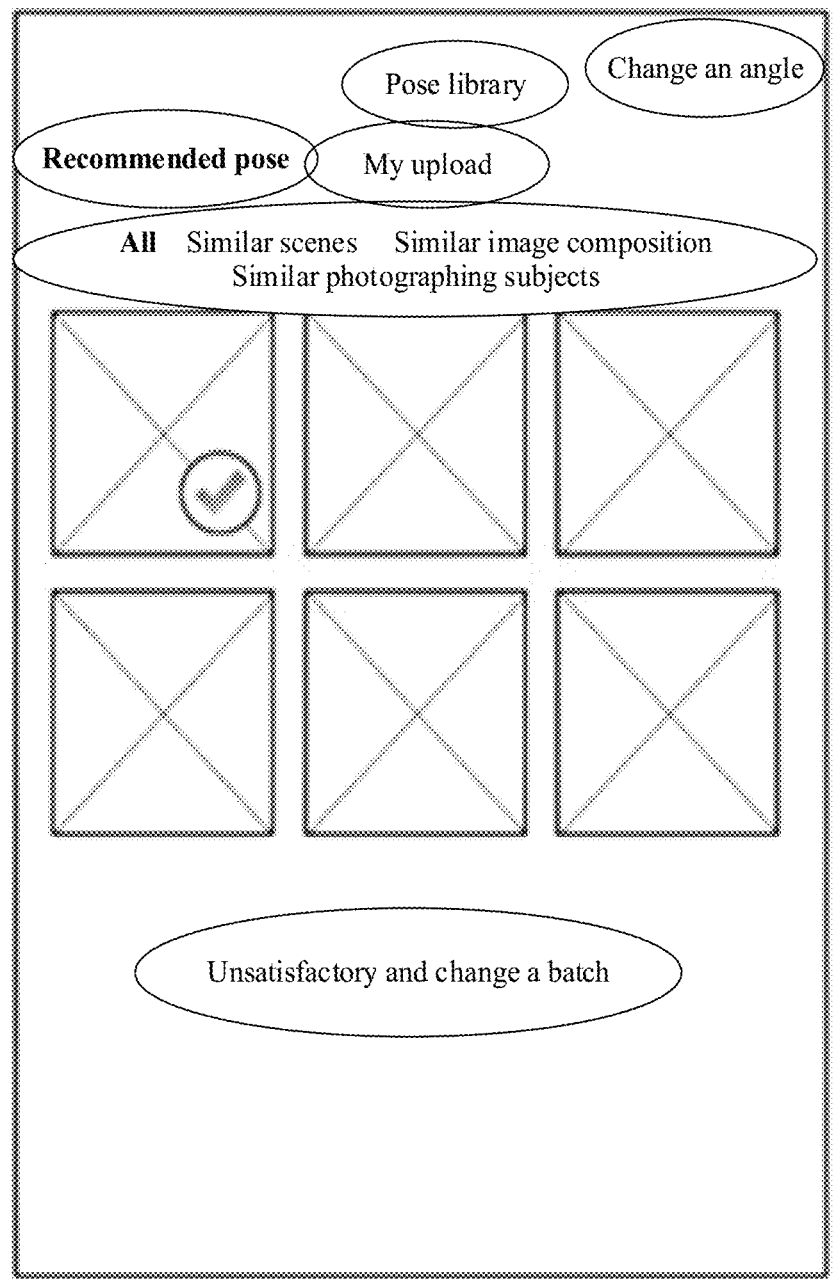
Figure 18C:
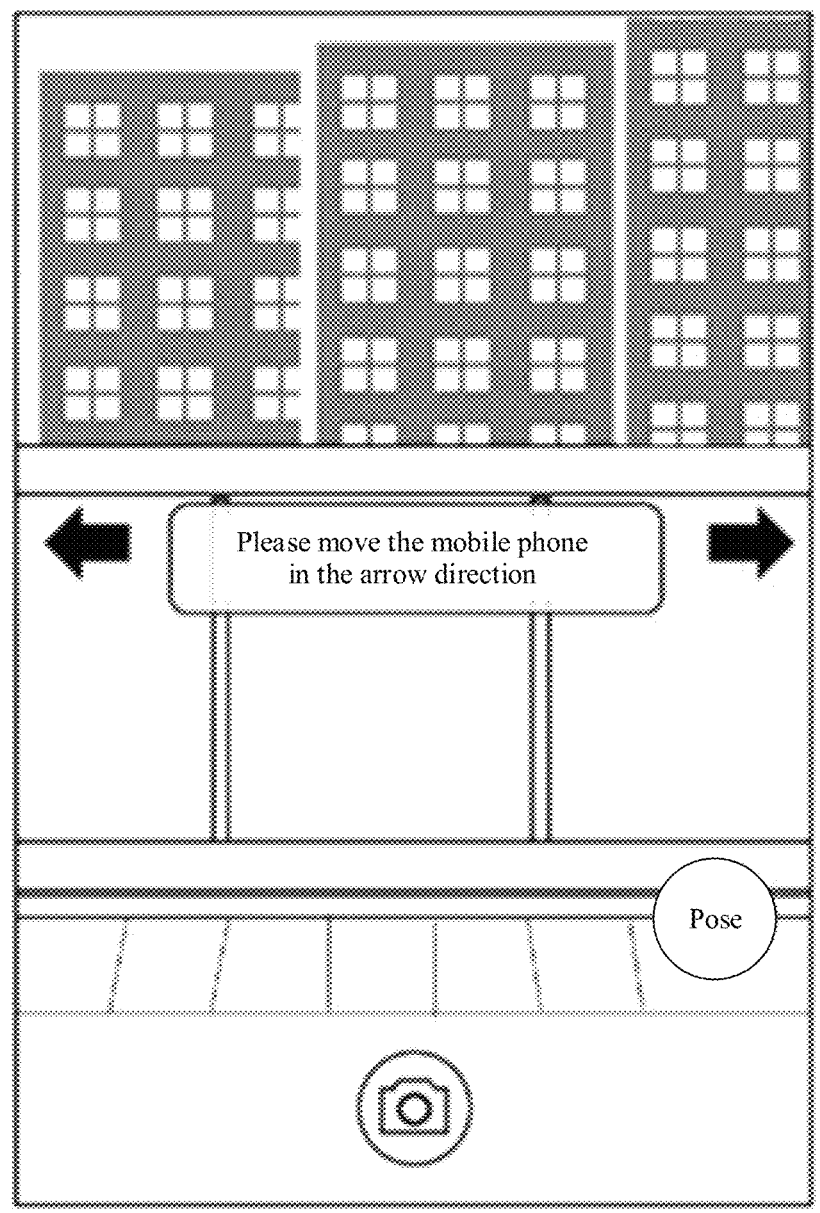
Figure 18D:
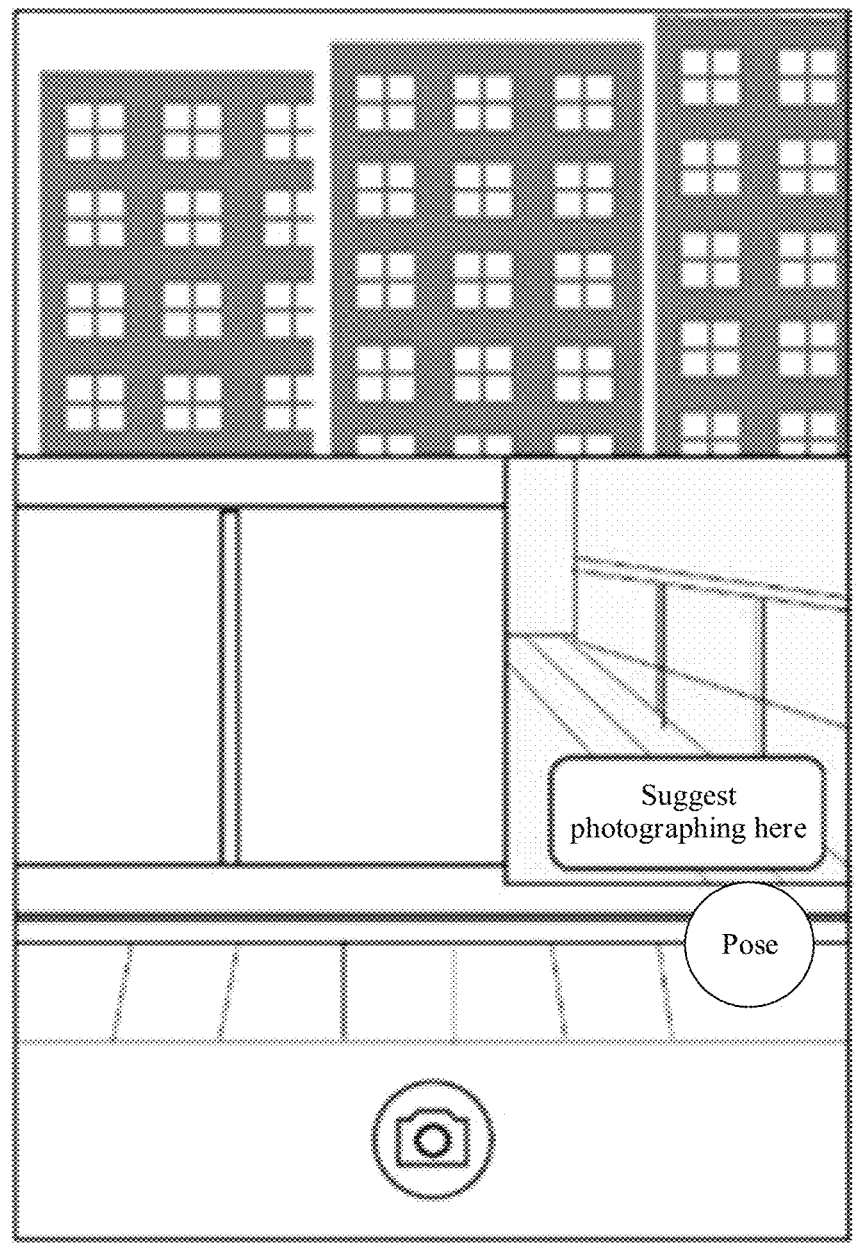

First, an image in a viewfinder frame of the mobile phone of the user is shown in FIG. 18A. The user selects a pose recommendation function, such that after a pose recommendation interface (FIG. 18B) is entered, a function prompt that allows the user to change a photographing angle (shown by "change an angle" in an upper right corner in FIG. 18B) can be displayed in the pose recommendation interface. After the user selects the function, a prompt (an arrow and a prompt text "move the mobile phone in the arrow direction" that are shown in FIG. 18C) that allows the user to change the photographing angle may be displayed in a photographing function interface. The user moves a location of the mobile phone to change the photographing angle. In this process, a system obtains N preview pictures at different angles (for example, the user rotates the mobile phone leftward, and preview pictures are continuously obtained in the process: assuming that the mobile phone is rotated leftward by 30 degrees, a preview picture 1 is obtained; and after the mobile phone continues to be rotated leftward by 30 degrees, a preview picture 2 is obtained) based on a video stream obtained in the process in which the user moves the mobile phone; generates at least N recommendation result lists (for example, a recommendation result list 1 is generated based on the preview picture 1, a recommendation result list 2 is generated based on the preview picture 2, and . . . ); and recommends at least one picture to the user (for example, a final ranking result is a picture in the recommendation result list generated based on the preview picture 2). A recommendation manner may be shown in the following FIG. 18D. In the photographing function interface of the mobile phone, a preview frame (in a lower right corner in FIG. 18D) is first displayed, and a preview picture (the preview picture 2) corresponding to the foregoing recommended picture is displayed in the preview frame, to prompt the user with a photographing place. The user learns, by observing the preview picture 2, that the user should perform photographing at a location obtained after the mobile phone is rotated leftward by 60 degrees). Therefore, the user performs photographing by rotating the mobile phone leftward by 60 degrees to return to the location at which the preview picture 2 is just obtained, and may also view the foregoing recommended picture in the pose recommendation interface.

It may be understood that the foregoing FIG. 18C shows only an example of changing the photographing angle, and a program developer may prompt the user to move the mobile phone in different directions based on a requirement.

The foregoing prompt "change an angle" is only a possible prompt method, and the program developer may display the prompt at a location in the photographing interface based on a requirement.

Figure 19:
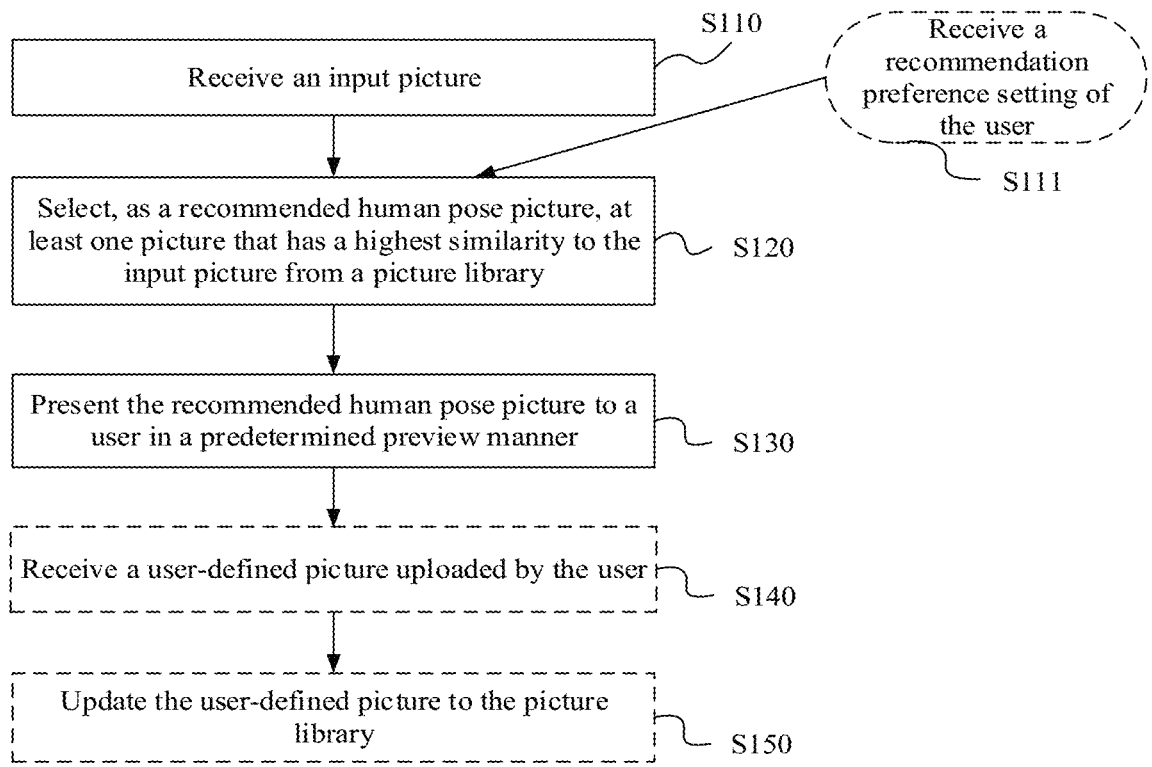
FIG. 19 is a schematic diagram of a method for recommending a similar human pose picture according to an embodiment of this application.

As shown in FIG. 19, an embodiment of the present application provides a method for recommending a similar human pose picture. The method includes the following steps.

S110. Receive an input picture, where the input picture includes a portrait.

S120. Select, as a recommended human pose picture, at least one picture that has a highest similarity to the input picture from a picture library through metric learning that is based on a multi-level environmental information feature, where the multi-level environmental feature includes a scene feature, an object spatial distribution feature, and a foreground human feature.

S130. Present the recommended human pose picture to a user in a predetermined preview manner.

As shown by a dotted-line box in FIG. 19, the method includes the following.

S111. Receive a recommendation preference setting of the user.

A picture that meets the recommendation preference is obtained as a final recommended human pose picture by screening the human pose pictures.

S120 includes: selecting, as the recommended human pose picture, at least one picture that has a highest similarity to the input picture from the picture library based on a recommendation preference of the user and through metric learning that is based on the multi-level environmental information feature, where the recommended human pose picture meets the recommendation preference of the user.

Optionally, the method further includes the following.

In S111, after receiving the recommendation preference setting of the user, a picture that meets the recommendation preference may be obtained as the final recommended human pose picture by screening the recommended human pose pictures.

Optionally, in an embodiment, S120 includes: performing feature extraction processing on the input picture to obtain a feature of the input picture; calculating, through metric learning that is based on the multi-level environmental information feature, a similarity between the feature of the input picture and a feature that is of each image and that is in a feature library, where the feature library is obtained by extracting a predetermined quantity of dimensions of features from each picture in the picture library; and selecting at least one picture corresponding to a top-ranked similarity as the recommended human pose picture from the picture library based on a calculation result.

Optionally, in an embodiment, S110 includes: receiving a plurality of input pictures that are at different angles and that include a photographing object.

In this case, S120 includes: calculating, through metric learning that is based on the multi-level environmental information feature, a picture that is in the picture library and that is most similar to each of the input pictures; and ranking all most similar pictures, and selecting at least one top-ranked picture as the recommended human pose picture.

As shown by dotted-line boxes in the figure, the method further includes the following.

S140. Receive a user-defined picture uploaded by the user.

S150. Update the user-defined picture to the picture library.

Figure 20:
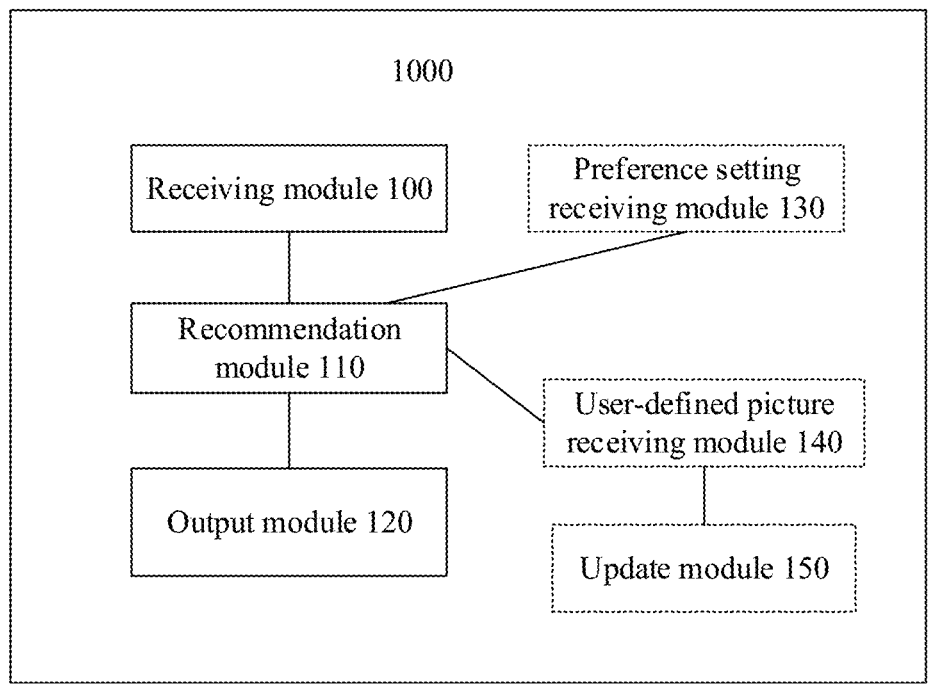
FIG. 20 is a schematic diagram of an apparatus for recommending a human pose picture according to an embodiment of this application.

As shown in FIG. 20, an embodiment of the present application provides an apparatus 1000 for recommending a human pose picture. The apparatus 1000 includes: a receiving module 100 configured to receive an input picture, where the input picture includes a portrait; a recommendation module 110 configured to select, as a recommended human pose picture from a picture library through metric learning that is based on a multi-level environmental information feature, at least one picture that has a highest similarity to the input picture received by the receiving module, where the multi-level environmental feature includes a scene feature, an object spatial distribution feature, and a foreground human feature; and an output module 120 configured to present the recommended human pose picture to a user in a predetermined preview manner.

Optionally, the recommendation module in this embodiment may correspond to the online module in the foregoing embodiment and the accompanying drawings.

As shown by a dotted-line box in FIG. 20, the apparatus further includes: a preference setting receiving module 130 configured to receive a recommendation preference setting of the user, where the recommendation module 110 is configured to: select, as the recommended human pose picture, at least one picture that has a highest similarity to the input picture from the picture library based on a recommendation preference of the user and through metric learning that is based on the multi-level environmental information feature, where the recommended human pose picture meets the recommendation preference of the user.

Optionally, the recommendation module 110 includes: a feature extraction unit 111 configured to perform feature extraction processing on the input picture to obtain a feature of the input picture; a similarity calculation unit 112 configured to calculate, through metric learning that is based on the multi-level environmental information feature, a similarity between the feature of the input picture and a feature that is of each image and that is in a feature library, where the feature library is obtained by extracting a predetermined quantity of dimensions of features from each picture in the picture library; and a recommendation unit 113 configured to select at least one picture corresponding to a top-ranked similarity as the recommended human pose picture from the picture library based on a calculation result.

Optionally, the receiving module is further configured to receive a plurality of input pictures that are at different angles and that include a photographing object.

The recommendation module 110 includes: a similarity calculation unit 112 configured to calculate, through metric learning that is based on the multi-level environmental information feature, a picture that is in the picture library and that is most similar to each of the input pictures; and a recommendation unit 113 configured to: rank all most similar pictures, and select at least one top-ranked picture as the recommended human pose picture.

Optionally, the apparatus further includes: a user-defined picture receiving module 140 configured to receive a user-defined picture uploaded by the user; and an update module 150 configured to update the user-defined picture to the picture library.

Figure 21:
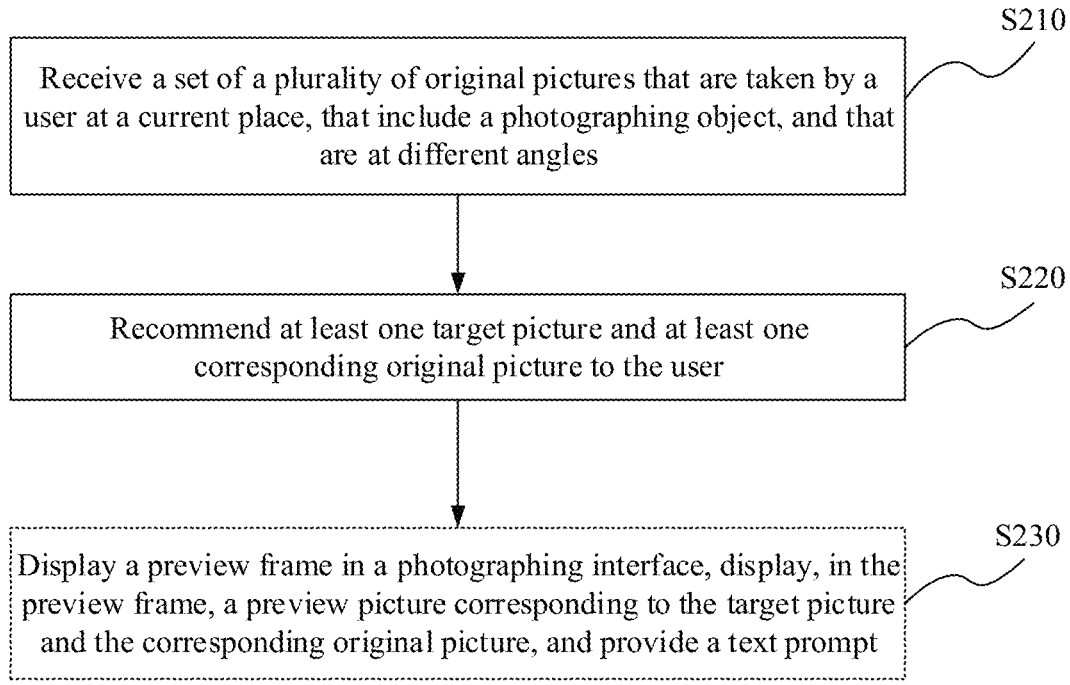
FIG. 21 is a schematic diagram of a method for prompting a user to perform photographing through similar image composition according to an embodiment of this application.

As shown in FIG. 21, an embodiment of the present application provides a method for prompting a user to perform photographing through similar image composition. The method includes the following steps.

S210. Receive a set of a plurality of original pictures that are taken by a user at a current place, that include a photographing object, and that are at different angles.

S220. Recommend at least one target picture and at least one corresponding original picture to the user, where the target picture includes a recommended human pose, and the target picture has similar background image composition to the corresponding original picture.

Optionally, in another alternative implementation, only at least one target picture may be recommended to the user in step S220.

Optionally, the method further includes the following.

S230. Display a preview frame in a photographing interface, display, in the preview frame, a preview picture corresponding to the target picture and the corresponding original picture, and provide a text prompt.

Figure 22:
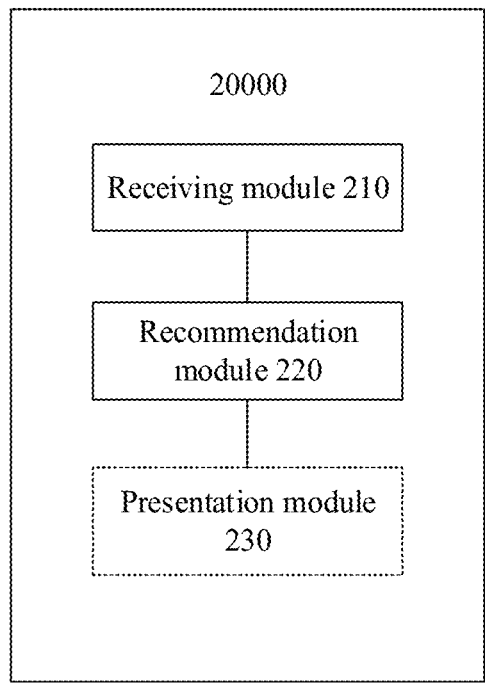
FIG. 22 is a schematic diagram of an intelligent terminal capable of prompting a user to perform photographing through similar image composition according to an embodiment of this application.

As shown in FIG. 22, an embodiment of the present application provides an intelligent terminal 20000 capable of prompting a user to perform photographing through similar image composition. The apparatus includes: a receiving module 210 configured to receive a set of a plurality of original pictures that are taken by a user at a current place, that include a photographing object, and that are at different angles; and a recommendation module 220 configured to recommend at least one target picture and at least one corresponding original picture to the user, where the target picture includes a recommended human pose, and the target picture has similar background image composition to the corresponding original picture.

Optionally, the apparatus further includes: a presentation module 230 configured to: display a preview frame in a photographing interface, display, in the preview frame, a preview picture corresponding to the target picture and the corresponding original picture, and provide a text prompt.

Figure 23:
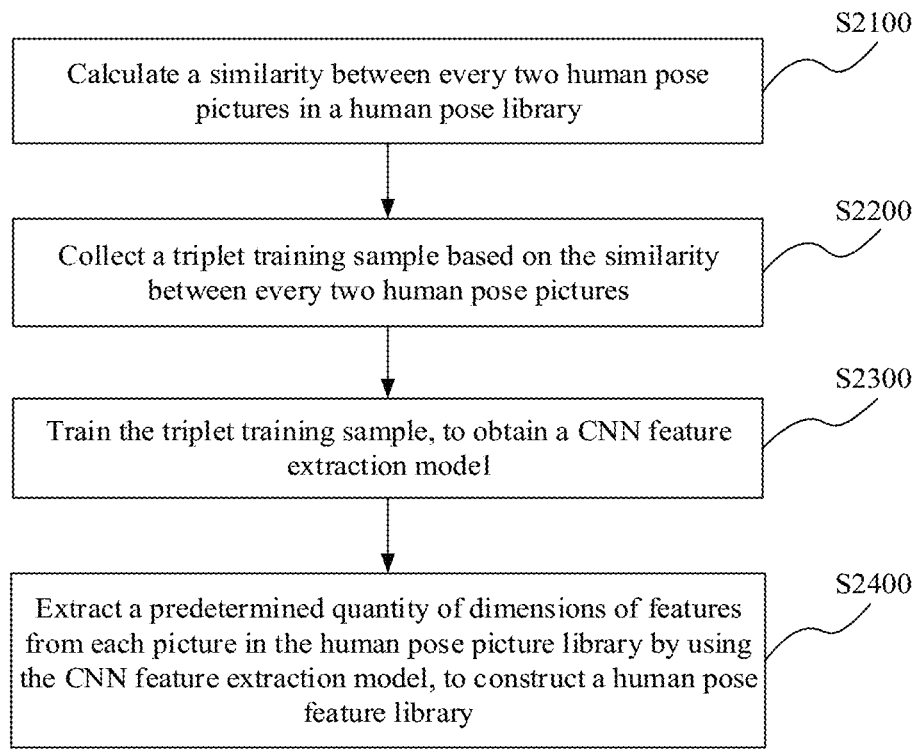
FIG. 23 is a flowchart of a method for constructing a human feature library according to an embodiment of this application.

As shown in FIG. 23, an embodiment of the present application provides a method for constructing a human feature library. The method includes the following steps.

S2100. Calculate a similarity between every two human pose pictures in a human pose library.

S2200. Collect a triplet training sample based on the similarity between every two human pose pictures for all pictures in the human pose library, where each triplet training sample <A, P, N> includes three human pose images, A is a human pose picture in the human pose library, P is a positive sample of the picture A, the positive sample is a human pose picture capable of being directly recommended in a photographing scene of the picture A, N is a negative sample of the picture A, and the negative sample is a human pose picture incapable of being directly recommended in the photographing scene of the picture A.

S2300. Train the triplet training sample through metric learning, to obtain a CNN feature extraction model, where the CNN feature extraction model enables samples capable of being recommended to each other to be close to each other as much as possible after the samples are mapped to feature space, and enables samples incapable of being recommended to be far away from each other as much as possible after the samples are mapped to the feature space.

S2400. Extract a predetermined quantity of dimensions of features from each picture in the human pose picture library using the CNN feature extraction model, to construct a human pose feature library.

Optionally, S2100 includes: calculating a background similarity and a foreground similarity between every two human pose pictures in the human pose library; and fusing the background similarity and the foreground similarity between every two human pose pictures in the human pose library, to obtain an overall similarity between every two human pose pictures in the human pose library.

Optionally, the calculating a background similarity and a foreground similarity between every two human pose pictures in the human pose library includes: calculating the background similarity between every two human pose pictures in the human pose library according to a scene classification algorithm and a scene parsing algorithm; and calculating the foreground similarity between every two human pose pictures in the human pose library according to a human attribute extraction algorithm.

Optionally, S2200 includes: for all the pictures in the human pose library, using several pictures that have top-ranked similarities and that are in the human pose library as positive samples, and using all the remaining pictures as negative samples.

Figure 24:
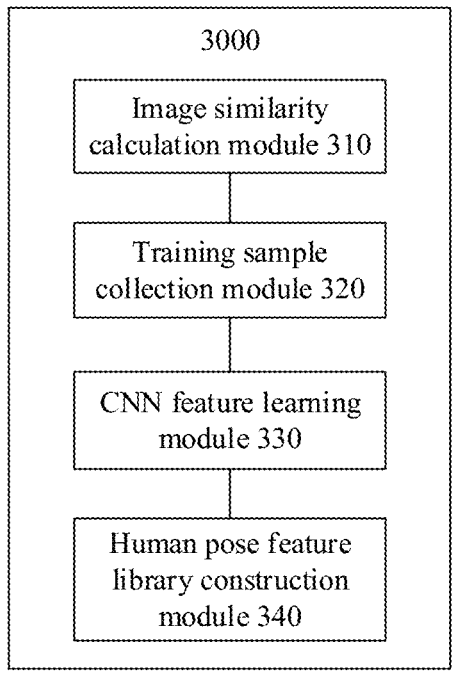
FIG. 24 is a schematic diagram of an apparatus for constructing a human feature library according to an embodiment of this application.

As shown in FIG. 24, an embodiment of the present application provides an apparatus 3000 for constructing a human feature library. The apparatus includes: an image similarity calculation module 310 configured to calculate a similarity between every two human pose pictures in a human pose library; a training sample collection module 320 configured to collect a triplet training sample based on the similarity between every two human pose pictures for all pictures in the human pose library, where each triplet training sample <A, P, N> includes three human pose images, A is a human pose picture in the human pose library, P is a positive sample of the picture A, the positive sample is a human pose picture capable of being directly recommended in a photographing scene of the picture A, N is a negative sample of the picture A, and the negative sample is a human pose picture incapable of being directly recommended in the photographing scene of the picture A, where optionally, for all the pictures in the human pose library, the training sample collection module 320 uses, as positive samples, several pictures that have top-ranked similarities and that are in the human pose library, and uses all the remaining pictures as negative samples; a CNN feature learning module 330 configured to train the triplet training sample through metric learning, to obtain a CNN feature extraction model, where the CNN feature extraction model enables samples capable of being recommended to each other to be close to each other as much as possible after the samples are mapped to feature space, and enables samples incapable of being recommended to be far away from each other as much as possible after the samples are mapped to the feature space; and a human pose feature library construction module 340 configured to extract a predetermined quantity of dimensions of features from each picture in the human pose picture library using the CNN feature extraction model, to construct a human pose feature library.

Optionally, the image similarity calculation module 310 includes: a similarity calculation unit 311 configured to calculate a background similarity and a foreground similarity between every two human pose pictures in the human pose library; and a fusion unit 312 configured to fuse the background similarity and the foreground similarity between every two human pose pictures in the human pose library, to obtain an overall similarity between every two human pose pictures in the human pose library.

Figure 25:
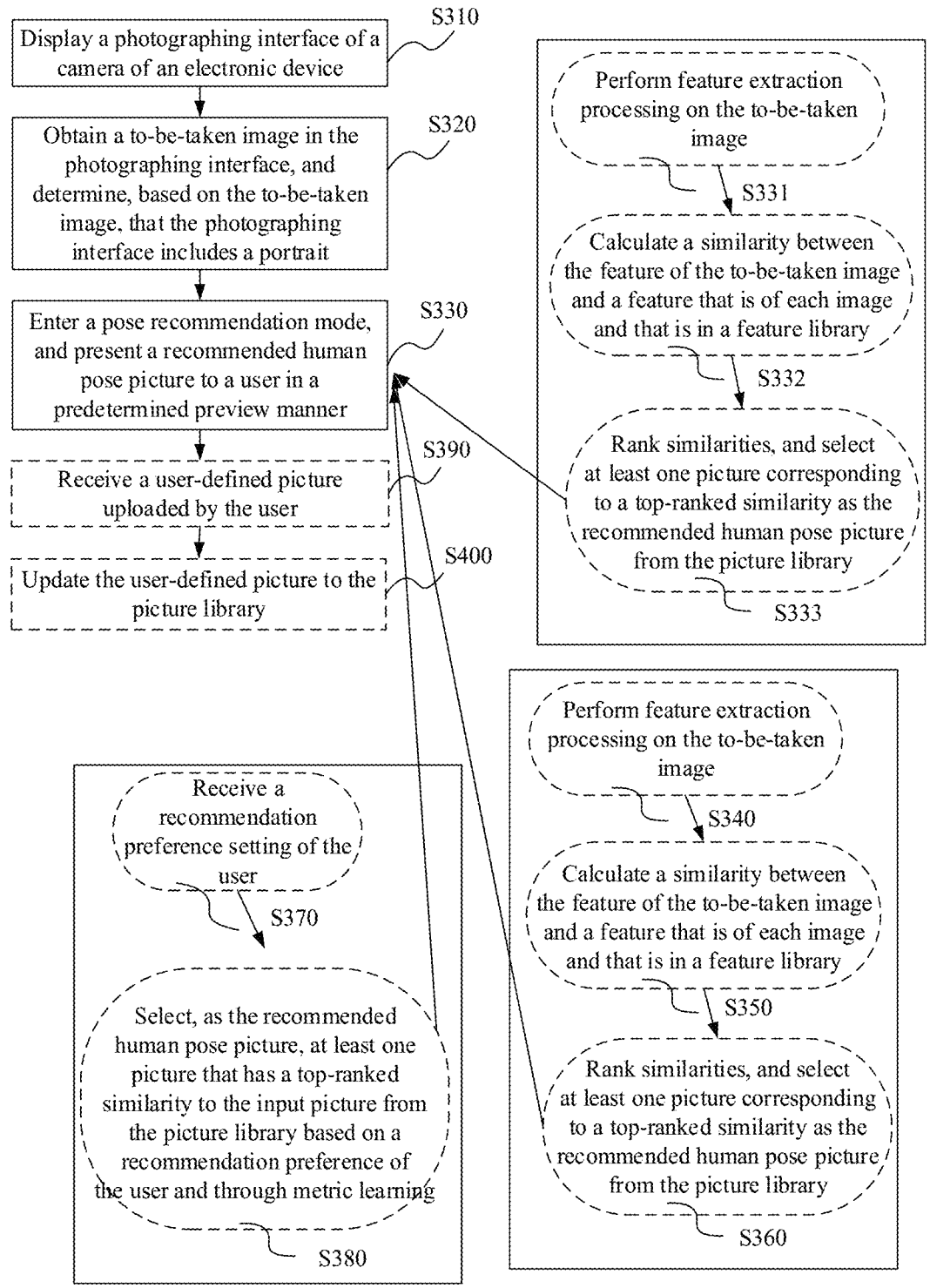
FIG. 25 is a flowchart of a method for optimizing a photographing pose of a user according to an embodiment of this application.

As shown in FIG. 25, an embodiment of the present application provides a method for optimizing a photographing pose of a user, applied to an electronic device. The method includes the following steps.

S310. Display a photographing interface of a camera of the electronic device.

S320. Obtain a to-be-taken image in the photographing interface, and determine, based on the to-be-taken image, that the photographing interface includes a portrait.

S330. Enter a pose recommendation mode, and present a recommended human pose picture to a user in a predetermined preview manner, where the human pose picture is at least one picture that is selected from a picture library through metric learning and that has a top-ranked similarity to the to-be-taken image, and the similarity is an overall similarity obtained by fusing a background similarity and a foreground similarity.

Optionally, after the entering a pose recommendation mode, before the presenting a recommended human pose picture to a user in a predetermined preview manner, the method further includes the following.

S331. Perform feature extraction processing on the to-be-taken image to obtain a feature of the to-be-taken image.

S332. Calculate a similarity between the feature of the to-be-taken image and a feature that is of each image and that is in a feature library, where the feature library is obtained by extracting a predetermined quantity of dimensions of features from each picture in the picture library.

S333. Rank similarities, and select at least one picture corresponding to a top-ranked similarity as the recommended human pose picture from the picture library.

Optionally, after the entering a pose recommendation mode, before the presenting a recommended human pose picture to a user in a predetermined preview manner, the method further includes the following.

S340. Perform feature extraction processing on the to-be-taken image to obtain a feature of the to-be-taken image.

S350. After the user correspondingly switches to a cloud intelligent recommendation mode, transmit the feature of the to-be-taken image to a cloud server.

S360. Receive the recommended human pose picture, where the recommended human pose picture is at least one picture that is selected by the cloud server from the picture library based on the feature of the to-be-taken image and that has a top-ranked similarity to the to-be-taken image.

Optionally, after the entering a pose recommendation mode, before the presenting a recommended human pose picture to a user in a predetermined preview manner, the method further includes the following.

S370. Receive a recommendation preference setting of the user.

S380. Select, as the recommended human pose picture, at least one picture that has a top-ranked similarity to the input picture from the picture library based on a recommendation preference of the user and through metric learning, where the recommended human pose picture meets the recommendation preference of the user.

Optionally, the method further includes the following.

S390. Receive a user-defined picture uploaded by the user.

S400. Update the user-defined picture to the picture library.

In the embodiments of the present application, a multi-level feature of an image is used, beneficial information in human pose recommendation is used, a similarity is defined for human pose recommendation based on the beneficial information, and information fusion and model training are effectively performed through metric learning. Therefore, a lightweight high-accuracy solution is implemented, and the solution can be deployed on a mobile terminal such as a mobile phone for real-time pose recommendation.

Further, the user customizes a recommendation picture library, and may upload a user-defined human pose picture using a sharing mechanism, to continuously update and expand a local picture library and a cloud picture library.

Further, the user may set a user preference option based on a current environment. Then, a human pose picture actually required by the user is recommended based on a personalized setting of the user. This further improves user experience.

Figure 26:
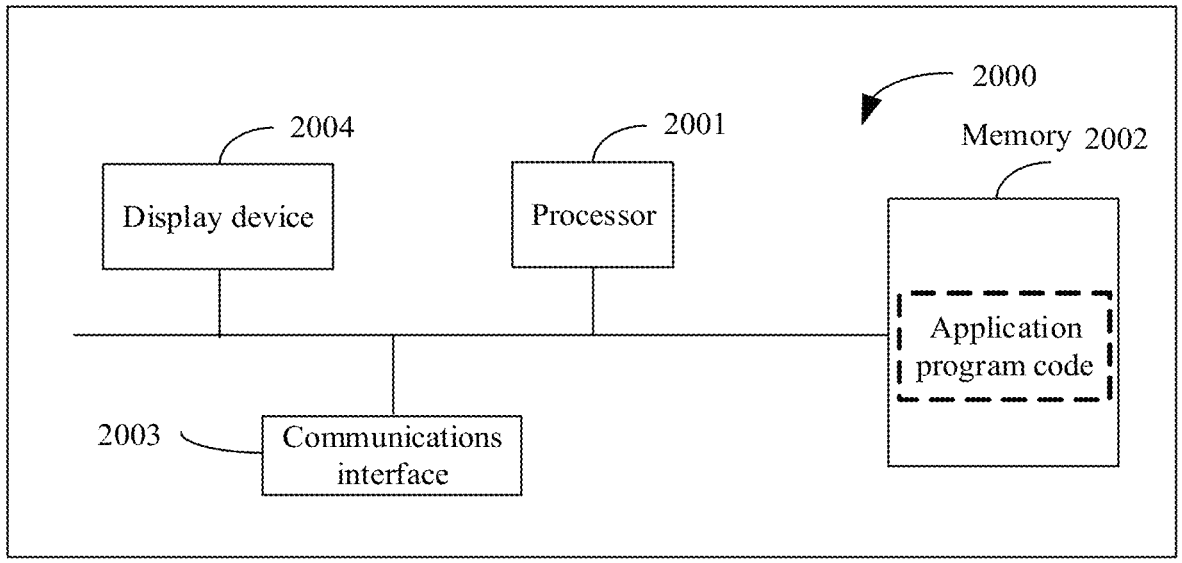
FIG. 26 is a schematic diagram of a structure of an electronic device according to an embodiment of this application.

As shown in FIG. 26, an embodiment of the present application provides an electronic device 2000, including: one or more processors 2001; one or more memories 2002; at least one display device 2004; a plurality of application programs; and one or more programs, where the one or more programs are stored in the memory 400. When the one or more programs are executed by the processor 300, the electronic device is enabled to perform the following steps: displaying a photographing interface of a camera of the electronic device; obtaining a to-be-taken image in the photographing interface; determining, based on the to-be-taken image, that the photographing interface includes a portrait; entering a pose recommendation mode; and presenting a recommended human pose picture to a user in a predetermined preview manner, where the human pose picture is at least one picture that is selected from a picture library through metric learning and that has a top-ranked similarity to the to-be-taken image, and where the similarity is an overall similarity obtained by fusing a background similarity and a foreground similarity.

The display device 2004 is configured to present the recommended human pose picture to the user in the predetermined preview manner.

Optionally, when the one or more programs are executed by the processor, the electronic device is enabled to perform the following steps: performing feature extraction processing on the to-be-taken image to obtain a feature of the to-be-taken image; calculating a similarity between the feature of the to-be-taken image and a feature that is of each image and that is in a feature library, where the feature library is obtained by extracting a predetermined quantity of dimensions of features from each picture in the picture library; and ranking similarities, and selecting at least one picture corresponding to a top-ranked similarity as the recommended human pose picture from the picture library.

Optionally, when the one or more programs are executed by the processor, the electronic device is enabled to perform the following steps: performing feature extraction processing on the to-be-taken image to obtain a feature of the to-be-taken image; after the user correspondingly switches to a cloud intelligent recommendation mode, transmitting the feature of the to-be-taken image to a cloud server; and receiving the recommended human pose picture, where the recommended human pose picture is at least one picture that is selected by the cloud server from the picture library based on the feature of the to-be-taken image and that has a top-ranked similarity to the to-be-taken image.

Optionally, when the one or more programs are executed by the processor, the electronic device is enabled to perform the following steps: receiving a recommendation preference setting of the user; and selecting, as the recommended human pose picture, at least one picture that has a top-ranked similarity to the input picture from the picture library based on a recommendation preference of the user through metric learning, where the recommended human pose picture meets the recommendation preference of the user.

Optionally, when the one or more programs are executed by the processor, the electronic device is enabled to perform the following steps: receiving a user-defined picture uploaded by the user; and updating the user-defined picture to the picture library.

The display device 2004 and a communications interface 2003 are connected to each other and complete mutual communication using a communications bus.

The communications interface 2003 is configured to communicate with another device or communications network, for example, an Ethernet network, a radio access network (RAN), or a wireless local area network (WLAN).

The memory 2002 may be a read-only memory (ROM) or another type of static storage device capable of storing static information and instructions, or a random-access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blue-ray disc, and the like), a magnetic disk storage medium or another magnetic disk storage device, or any other medium that can be used to carry or store expected program code in an instruction or data structure form and that can be accessed by a computer. However, the memory is not limited thereto. The memory may exist independently, and is connected to the processor using the bus. The memory may be alternatively integrated with the processor.

The memory 2002 is configured to store application program code for executing the foregoing solution, and the processor 2001 controls the execution. The processor 2001 is configured to execute the application program code stored in the memory 2002.

The processor 2001 may further use one or more integrated circuits.

The processor 2001 may be an integrated circuit chip and has a signal processing capability. In an implementation process, steps of the recommendation method in this application may be completed using a hardware integrated logic circuit in the processor 2001 or using instructions in a software form. In an implementation process, steps of the training method in this embodiment of this application may be completed using an integrated logic circuit of hardware in the processor 2001 or an instruction in a form of software. The foregoing processor 2001 may be a general purpose processor, a digital signal processor (DSP), an application-specific integrated circuit (ASIC), a field-programmable gate array (FPGA) or another programmable logic device, a discrete gate or transistor logic device, or a discrete hardware component. It may implement or perform the methods, the steps, and logical module diagrams that are disclosed in the embodiments of this application. The general purpose processor may be a microprocessor, or the processor may be any conventional processor or the like. Steps of the methods disclosed with reference to the embodiments of this application may be directly executed and accomplished by means of a hardware decoding processor, or may be executed and accomplished using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 2002. The processor 2001 reads information in the memory 2002, and completes the method in the embodiments of this application based on the hardware of the processor.

The communications interface 2003 uses a transceiver apparatus, for example, including but not limited to a transceiver, to implement communication between the recommendation apparatus or the training apparatus and another device or communications network. For example, a to-be-recognized picture or training data may be obtained through the communications interface 2003.

The bus may include a path for transferring information between components (for example, the memory 2002, the processor 2001, the communications interface 2003, and the display device 2004) of the apparatus.

Figure 27:
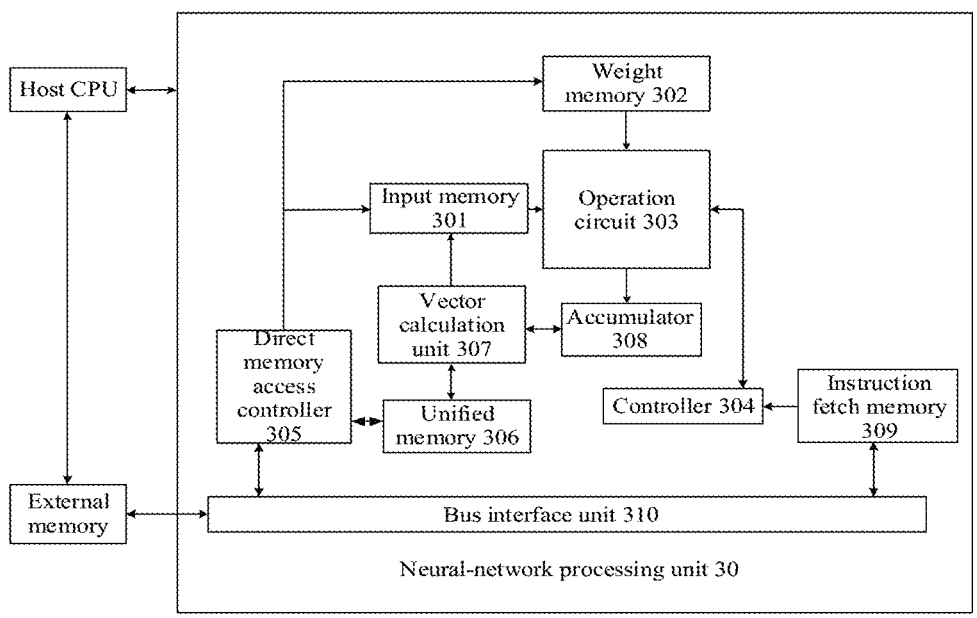
FIG. 27 is a schematic diagram of a structure of a chip according to an embodiment of this application.

FIG. 27 shows a hardware structure of a chip according to an embodiment of the present application. The chip includes a neural-network processing unit 30. The chip may be disposed in the execution device 110 shown in FIG. 1, to complete calculation working of the calculation module 111. The chip may be alternatively disposed in the training device 120 shown in FIG. 1, to complete training working of the training device 120 and output a target model/rule. Algorithms of the layers in the convolutional neural network shown in FIG. 2 may be implemented in the chip shown in FIG. 3.

The neural-network processing unit (NPU) 30 is mounted to a host CPU as a coprocessor. A task is allocated by the host CPU. A core part of the NPU 30 is an operation circuit 303. A controller 304 controls the operation circuit 303 to extract data from a memory (a weight memory or an input memory) and perform an operation.

In some implementations, the operation circuit 303 includes a plurality of processing elements (e.g., a process engine (PE)). In some implementations, the operation circuit 303 is a two-dimensional systolic array. The operation circuit 303 may alternatively be a one-dimensional systolic array or another electronic circuit that can perform a mathematical operation such as multiplication and addition. In some implementations, the operation circuit 303 is a general-purpose matrix processor.

For example, it is assumed that there is an input matrix A, a weight matrix B, and an output matrix C. The operation circuit extracts data corresponding to the matrix B from a weight memory 302, and buffers the data on each PE in the operation circuit. The operation circuit extracts data of the matrix A from an input memory 301, performs a matrix operation on the data of the matrix A and the matrix B, and stores an obtained partial result or final result of a matrix into an accumulator 308.

A vector calculation unit 307 may perform further processing such as vector multiplication, vector addition, an exponent operation, a logarithm operation, or value comparison on an output of the operation circuit. For example, the vector calculation unit 307 may be configured to perform network calculation such as pooling, batch normalization, or local response normalization at a non-convolutional/non-fully connected (FC) layer in the neural network.

In some implementations, the vector calculation unit 307 can store, into a unified buffer 306, an output vector that has been processed. For example, the vector calculation unit 307 may apply a nonlinear function to the output of the operation circuit 303, for example, a vector of accumulated values, to generate an activation value. In some implementations, the vector calculation unit 307 generates a normalized value, a combined value, or both of the two values. In some implementations, the output vector that has been processed can be used as an activation input of the operation circuit 303, for example, to be used at a subsequent layer in the neural network.

A feature extraction operation provided in this embodiment of this application may be performed by 303 or 307.

The unified memory 306 is configured to store input data and output data.

For weight data, a direct memory access controller (DMAC) 305 is directly configured to transfer input data in an external memory into the input memory 301 and/or the unified memory 306, store weight data in the external memory into the weight memory 302, and store the data in the unified memory 306 into the external memory.

A bus interface unit (BIU) 310 is configured to implement interaction between the host CPU, the DMAC 305, and an instruction fetch memory 309 using a bus.

The instruction fetch buffer 309 connected to the controller 304 is configured to store instructions for use by the controller 304.

The controller 304 is configured to invoke the instructions buffered in the instruction fetch memory 309, to implement a working process of controlling an operation accelerator.

Optionally, in this application, the input data herein is a picture, and the output data is 2D information, 3-dimensional (3D) information, mask information, key point information, and other information of an object of interest in the picture.

Generally, the unified memory 306, the input memory 301, the weight memory 302, and the instruction fetch memory 309 each are an on-chip memory. The external memory is a memory outside the NPU 30. The external memory may be a double data rate (DDR) synchronous dynamic random-access memory (SDRAM), a high-bandwidth memory (HBM), or another readable and writable memory.

Optionally, the program algorithms in FIG. 1 and FIG. 2 and the algorithms in the foregoing embodiments are jointly completed by the host CPU and the NPU through cooperation. The operation at each layer of the convolutional neural network shown in FIG. 2 may be performed by the operation circuit 303 or the vector calculation unit 307.

An embodiment of this application further provides a computer storage medium, including computer instructions. When the computer instructions are run on an electronic device, the electronic device is enabled to perform the method for recommending a similar human pose picture mentioned in any one of the foregoing method embodiments.

An embodiment of this application further provides a computer program product. When the computer program product runs on a computer, the computer is enabled to perform the method for recommending a similar human pose picture mentioned in any one of the foregoing method embodiments.

In the embodiments of the present application, a multi-level feature of an image is used, beneficial information in human pose recommendation is used, a similarity is defined for human pose recommendation based on the beneficial information, and information fusion and model training are effectively performed through metric learning. Therefore, a lightweight high-accuracy solution is implemented, and the solution can be deployed on a mobile terminal such as a mobile phone for real-time pose recommendation.

Further, the user customizes a recommendation picture library, and may upload a user-defined human pose picture using a sharing mechanism, to continuously update and expand a local picture library and a cloud picture library.

Further, the user may set a user preference option based on a current environment. Then, a human pose picture actually required by the user is recommended based on a personalized setting of the user. This further improves user experience.

In the several embodiments provided in this application, it should be understood that the disclosed apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage. Based on such an understanding, the technical solutions of the present application essentially, or the part contributing to the conventional technology, or all or some of the technical solutions may be implemented in the form of a software product. The software product is stored in a storage and includes several instructions for instructing a computer device (which may be a personal computer, a server, or a network device) to perform all or some of the steps of the methods described in the embodiments of the present application. The foregoing memory includes: any medium that can store program code, such as a Universal Serial Bus (USB) flash drive, a ROM, a RAM, a removable hard disk, a magnetic disk, or an optical disc.

A person of ordinary skill in the art may understand that all or some of the steps of the methods in the embodiments may be implemented by a program instructing relevant hardware. The program may be stored in a computer readable memory. The memory may include: a flash memory, a ROM, a RAM, a magnetic disk, or an optical disc.

The remote radio unit provided in the embodiments of this application is described in detail above. The principle and implementation of this application are described herein through examples. The description about the embodiments of this application is merely provided to help understand the method and core ideas of this application. In addition, persons of ordinary skill in the art can make variations and modifications to this application in terms of the implementations and application scopes according to the ideas of this application. Therefore, the content of specification shall not be construed as a limit to this application.

What is claimed is:

1. A method for recommending a similar human pose picture, the method comprising:
receiving an input picture, wherein the input picture comprises a first portrait;
selecting, as a recommended human pose picture, at least one picture that has a highest similarity to the input picture from a picture library through metric learning that is based on a multi-level environmental information feature, wherein the recommended human pose picture comprises a second portrait, and wherein the multi-level environmental information feature comprises a scene feature, an object spatial distribution feature, and a foreground human feature; and presenting the recommended human pose picture in a predetermined preview manner.

2. The method of claim 1, further comprising receiving a recommendation preference setting of a user, wherein selecting the at least one picture comprises selecting, as the recommended human pose picture, the at least one picture based on a recommendation preference of the user and through metric learning that is based on the multi-level environmental information feature, and wherein the recommended human pose picture meets the recommendation preference setting of the user.

3. The method of claim 1, wherein selecting the at least one picture comprises:
performing feature extraction processing on the input picture to obtain a first feature of the input picture;
calculating, through metric learning based on the multi-level environmental information feature, a similarity between the first feature and a second feature that is of each image and that is in a feature library, wherein the feature library is obtained by extracting a predetermined quantity of dimensions of features from each picture in the picture library; and
selecting at least one recommended picture corresponding to a top-ranked similarity as the recommended human pose picture from the picture library based on a calculation result of the similarity between the first feature and the second feature.

4. The method of claim 1, further comprising:
receiving a recommendation preference setting of a user; and
screening human pose pictures in the picture library to obtain, as a final recommended human pose picture, a picture that meets the recommendation preference setting of the user.

5. The method of claim 1, wherein the first portrait is a photographing object, wherein receiving the input picture comprises receiving a plurality of input pictures that are at different angles and that comprise the photographing object, and wherein selecting the at least one picture comprises:
calculating, through metric learning that is based on the multi-level environmental information feature, a picture that is in the picture library and that is most similar to each of the input pictures;
ranking all most similar pictures in the picture library; and
selecting, from the most similar pictures, at least one top-ranked picture as the recommended human pose picture.

6. The method of claim 1, further comprising:
receiving a user-defined picture uploaded by a user; and
updating the picture library to include the user-defined picture.

7. An apparatus for recommending a picture, comprising:
a memory configured to store a computer program; and
a processor coupled to the memory and configured to execute the computer program to:
receive an input picture, wherein the input picture comprises a first portrait;
select, as a recommended human pose picture, at least one picture that has a highest similarity to the input picture from a picture library through metric learning that is based on a multi-level environmental information feature, wherein the recommended human pose picture comprises a second portrait, and wherein the multi-level environmental information feature comprises a scene feature, an object spatial distribution feature, and a foreground human feature; and present the recommended human pose picture in a predetermined preview manner.

8. The apparatus of claim 7, wherein the processor is further configured to receive a recommendation preference setting of a user, wherein the processor is configured to select the at least one picture by selecting, as the recommended human pose picture, the at least one picture based on a recommendation preference of the user and through metric learning that is based on the multi-level environmental information feature, and wherein the recommended human pose picture meets the recommendation preference setting of the user.

9. The apparatus of claim 7, wherein the processor is configured to select the at least one picture by:
performing feature extraction processing on the input picture to obtain a first feature of the input picture;
calculating, through metric learning that is based on the multi-level environmental information feature, a similarity between the first feature and a second feature that is of each image and that is in a feature library, wherein the feature library is obtained by extracting a predetermined quantity of dimensions of features from each picture in the picture library; and
selecting at least one recommended picture corresponding to a top-ranked similarity as the recommended human pose picture from the picture library based on a calculation result of the similarity between the first feature and the second feature.

10. The apparatus of claim 7, wherein the processor is further configured to:
receive a recommendation preference setting of the user; and
screen human pose pictures in the picture library to obtain, as a final recommended human pose picture, a picture that meets the recommendation preference setting of the user.

11. The apparatus of claim 7, wherein the first portrait is a photographing object, wherein the processor is configured to receive the input picture by receiving a plurality of input pictures that are at different angles and that comprise the photographing object, and wherein the processor is configured select the at least one picture by:
calculating, through metric learning that is based on the multi-level environmental information feature, a picture that is in the picture library and that is most similar to each of the input pictures;
ranking all most similar pictures in the picture library; and
selecting, from the most similar pictures, at least one top-ranked picture as the recommended human pose picture.

12. The apparatus of claim 7, wherein the processor is further configured to:
receive a user-defined picture uploaded by a user; and
update the picture library to include the user-defined picture.

13. A non-transitory computer storage medium configured to store instructions that, when executed by a processor of an electronic device, cause the electronic device to perform a method for recommending a similar human pose picture, the method comprising:
receiving an input picture, wherein the input picture comprises a first portrait;

selecting, as a recommended human pose picture, at least one picture that has a highest similarity to the input picture from a picture library through metric learning that is based on a multi-level environmental information feature, wherein the recommended human pose picture comprises a second portrait, and wherein the multi-level environmental information feature comprises a scene feature, an object spatial distribution feature, and a foreground human feature; and presenting the recommended human pose picture in a predetermined preview manner.

14. The non-transitory computer storage medium of claim 13, wherein the method further comprises receiving a recommendation preference setting of a user, wherein selecting the at least one picture comprises selecting, as the recommended human pose picture, the at least one picture based on a recommendation preference of the user and through metric learning that is based on the multi-level environmental information feature, and wherein the recommended human pose picture meets the recommendation preference setting of the user.

15. The non-transitory computer storage medium of claim 13, wherein selecting the at least one picture comprises:
performing feature extraction processing on the input picture to obtain a first feature of the input picture;
calculating, through metric learning that is based on the multi-level environmental information feature, a similarity between the first feature and a second feature that is of each image and that is in a feature library, wherein the feature library is obtained by extracting a predetermined quantity of dimensions of features from each picture in the picture library; and
selecting at least one recommended picture corresponding to a top-ranked similarity as the recommended human pose picture from the picture library based on a calculation result of the similarity between the first feature and the second feature.

16. The non-transitory computer storage medium of claim 13, wherein the method comprises:
receiving a recommendation preference setting of a user; and
screening human pose pictures in the picture library to obtain, as a final recommended human pose picture, a picture that meets the recommendation preference setting of the user.

17. The non-transitory computer storage medium of claim 13, wherein the first portrait is a photographing object, and wherein receiving the input picture comprises receiving a plurality of input pictures that are at different angles and that comprise the photographing object.

18. The non-transitory computer storage medium of claim 17 and wherein selecting the at least one picture comprises:
calculating, through metric learning that is based on the multi-level environmental information feature, a picture that is in the picture library and that is most similar to each of the input pictures;
ranking all most similar pictures in the picture library; and
selecting, from the most similar pictures, at least one top-ranked picture as the recommended human pose picture.

19. The non-transitory computer storage medium of claim 13, wherein the method further comprises receiving a user-defined picture uploaded by a user.

20. The non-transitory computer storage medium of claim 19, wherein the method further comprises updating the picture library to include the user-defined picture.

* * * * *